US012261759B1

(12) United States Patent
Vaez-Ghaemi et al.

(10) Patent No.: US 12,261,759 B1
(45) Date of Patent: Mar. 25, 2025

(54) REAL-TIME O-RAN FRONTHAUL ANALYZER AND GRAPHICAL USER INTERFACE

(71) Applicant: VIAVI SOLUTIONS INC., Chandler, AZ (US)

(72) Inventors: Reza Vaez-Ghaemi, Potomac, MD (US); Wei Chen, Potomac, MD (US); Kenneth Trudgeon, Victoria (CA); David Fenstermacher, Mount Airy, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/475,130

(22) Filed: Sep. 26, 2023

(51) Int. Cl.
*H04L 41/22* (2022.01)
*H04L 43/0852* (2022.01)

(52) U.S. Cl.
CPC .......... *H04L 43/0852* (2013.01); *H04L 41/22* (2013.01)

(58) Field of Classification Search
CPC .............................. H04L 43/0852; H04L 41/22
USPC ........................................................ 709/224
See application file for complete search history.

(56) References Cited

U.S. PATENT DOCUMENTS

| 11,751,064 B1* | 9/2023 | Montalvo | H04W 24/02 455/423 |
| 11,784,883 B2* | 10/2023 | Kim | H04L 41/0823 |
| 11,843,953 B1* | 12/2023 | Montalvo | H04W 28/0967 |
| 11,889,508 B1* | 1/2024 | Anderson | H04W 72/21 |
| 2022/0158926 A1* | 5/2022 | Wennerström | H04L 41/0853 |
| 2023/0319610 A1* | 10/2023 | Kasagi | H04W 24/08 455/423 |
| 2023/0362807 A1* | 11/2023 | Kodaypak | H04W 52/0203 |
| 2023/0397031 A1* | 12/2023 | Mehta | H04W 48/18 |
| 2024/0049046 A1* | 2/2024 | Kodaypak | H04W 28/0278 |
| 2024/0179577 A1* | 5/2024 | Porras | H04W 24/00 |

OTHER PUBLICATIONS 2023 5G Challenge Stage Two—RU Test Plan, Mar. 21, 2023, Version: 1.3, CableLabs, 46 pages.
5G; NR; Physical channels and modulation (3GPP TS 38.211 version 15.4.0 Release 15); ETSI TS 138 211 V15.4.0 Apr. 2019, 98 pages.
Abdalla, et al.; Toward Next Generation Open Radio Access Networks—What O-RAN Can and Cannot Do!; IEEE Network Magazine; Mar. 26, 2022; 8 pages.
Accuver, AEGIS-O, O-RAN End-to-End Test & Measurement Platform, 1 page, downloaded from the Internet on Sep. 26, 2023. (https://www.accuver.com/sub/products/view.php?idx=45).

(Continued)

*Primary Examiner* — Karen C Tang
(74) *Attorney, Agent, or Firm* — Mannava & Kang, P.C.

(57) ABSTRACT

Systems, apparatuses, and methods for implementing a real-time Open Radio Access Network (O-RAN) fronthaul analyzer and graphical user interface (FHA/GUI) are provided. In one example, a method describes receiving an O-RAN fronthaul (OFH) packet traffic flow; parsing packet headers of the OFH packet traffic flow; identifying and tracking active flows in the OFH packet traffic flow using the parsing; and presenting a visual representation of the active flows using the tracking of active flows. In some examples, the real-time O-RAN FHA/GUI may be used for testing an OFH link for compliance with the O-RAN standards.

16 Claims, 40 Drawing Sheets

Flow Explorer: C/U-Plane View

(56) References Cited

OTHER PUBLICATIONS eCPRI Specification V2.0, Common Public Radio Interface: eCPRI Interface Specification, May 10, 2015, 109 pages.
O-RAN Alliance Working Group 5 O1 Interface specification for O-DU; O-RAN.WG5.O-DU-O1.0-R003-v07.00; Jun. 2023, 143 pages.
O-RAN Fronthaul Working Group Fronthaul Interoperability Test Specification (IOT); O-RAN.WG4.IOT.0-R003-v10.00; Oct. 2022, 128 pages.
O-RAN Intel® FPGA IP Design Example User Guide; Updated for Intel® Quartus® Prime Design Suite: 23.1; IP Version: 1.9.1; Aug. 15, 2023; pp. 32.
O-RAN Intel® FPGA IP User Guide; Updated for Intel® Quartus® Prime Design Suite: 23.1; IP Version: 1.9.1; Aug. 15, 2023; 54 pages.
O-RAN Open Xhaul Transport WG9 WDM-based Fronthaul Transport; O-RAN.WG9.WDM.0-R003-v03.00; Mar. 2023, 60 pages.
O-RAN Test and Integration Focus Group End-to-end Test Specification; O-RAN.TIFG.E2E-Test.0-v04.00; Oct. 2022, 227 pages.
O-RAN Work Group 1 (Use Cases and Overall Architecture) Use Cases Detailed Specification; O-RAN.WG1.Use-Cases-Detailed-Specification-R003-v11.00; Jun. 2023, 189 pages.
O-RAN Working Group 1 (Use Cases and Overall Architecture) O-RAN Architecture Description; O-RAN.WG1.OAD-R003-v09.00; Jun. 2023, 41 pages.
O-RAN Working Group 4 (Open Fronthaul Interfaces WG) Control, User and Synchronization Plane Specification; O-RAN.WG4.CUS.0-R003-v12.00; Jun. 2023, 395 pages.
O-RAN Working Group 4 (Open Fronthaul Interfaces WG) Management Plane Specification; O-RAN.WG4.MP.0-R003-v12.00; Jun. 2023, 283 pages.
Polese, et al.; Understanding O-RAN: Architecture, Interfaces, Algorithms, Security, and Research Challenges; Aug. 1, 2022; 33 pages.
Publicly Available Specification (PAS); O-RAN Fronthaul Control, User and Synchronization Plane Specification v07.02; (O-RAN-WG4.CUS.0-v07.02); ETSI TS 103 859 V7.0.2; Sep. 2022; 318 pages.
The Evolution of Open Ran; A 5G Americas White Paper; Feb. 2023; 50 pages.
Umesh, et al.; Overview of O-RAN Fronthaul Specifications; NTT DOCOMO Technical Journal vol. 21 No.1; Jul. 2019; 14 pages.
Viavi Solutions; Open Fronthaul Test Applications with T-BERD/MTS-5800; Sep. 2021, 5 pages.
Viavi Solutions; Test Suite for O-RAN Specifications; Updated for 2021 to include learnings from 2020 plugfest; 2021, 14 pages.
Xena, "Test the Resiliency of your 5G RAN Fronthaul Solution"; GSMA | The Mobile Economy—The Mobile Economy; Mar. 2023, 4 pages.

\* cited by examiner

C/U-Plane Timing Relations
DOWNLINK

O-RAN FHA GUI Navigational Map

Home: Analyzer Tab

Home: Side Navigation

Home: Data Manager Tab

Home: Administration Tab

Home: Settings Tab

Flow Explorer: O-DU View

Flow Explorer: O-RU View

Flow Explorer: C/U-Plane View

Flow Explorer: S-Plane View

C/U-Plane Timing Analysis GUI
(O-DU view)

C/U-Plane Timing Analysis GUI
(O-RU view)

C/U-Plane Timing Analysis GUI
(Configuration view)

RE Statistics GUI
(PRB allocation/utilization/
resource analysis view)

RE Statistics — PRB a/u/r view
(Close-up of bar graph 1010A of FIG. 10A)

RE Statistics — PRB a/u/r view
(Close-up of block graph 1072A of FIG. 10A)

S-Plane Analysis GUI

Transport View

M-Plane Analysis GUI

Pop-up screen
From M-Plane Analysis GUI in FIG. 13A

Flow GUI
(Packet Traffic Flows screen)

M-Plane Client GUI:
Device Info View

M-Plane Client GUI:
Software Info View

M-Plane Client GUI:
Hardware Info View

M-Plane Client GUI:
Interfaces View

M-Plane Client GUI:
Delay Profile View

M-Plane Client GUI:
U-Plane Configuration View

M-Plane Client GUI:
Module Capabilities View

M-Plane Client GUI:
Processing Elements View

M-Plane Client GUI: Synchronization View

M-Plane Client GUI:
SFP View

M-Plane Client GUI:
DHCP View

M-Plane Client GUI:
Operational Info View

M-Plane Client GUI:
M-Plane Info View

REAL-TIME O-RAN FRONTHAUL ANALYZER AND GRAPHICAL USER INTERFACE

TECHNICAL FIELD

This patent application is directed to a fronthaul analyzer, and more specifically, to a real-time fronthaul analyzer and graphical user interface (FHA/GUI) of the packet traffic flow on an Open Radio Access Network (O-RAN) fronthaul link between an O-RAN-Distributed Unit (O-DU) and an O-RAN-Radio Unit (O-RU).

BACKGROUND

Presently, cellular telephony technology is developing and adopting the Open Radio Access Network (O-RAN) standards, which may provide interoperability that may enable multiple cellular network/communication protocols/types and the products of multiple vendors to work together in the same network. O-RAN standards focus on openness (open source software, hardware interoperability/open interfaces, flexible deployment in a disaggregated multi-vendor/multi-tech architecture), intelligence (incorporating artificial intelligence (AI) into the deployment, operation, and maintenance of the network and using software-defined implementations of wireless communications and networking functions), and virtualization (in order to decouple legacy entities and layers, thereby enabling the interoperability, flexibility, disaggregation, and heterogeneity of the O-RAN environment).

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
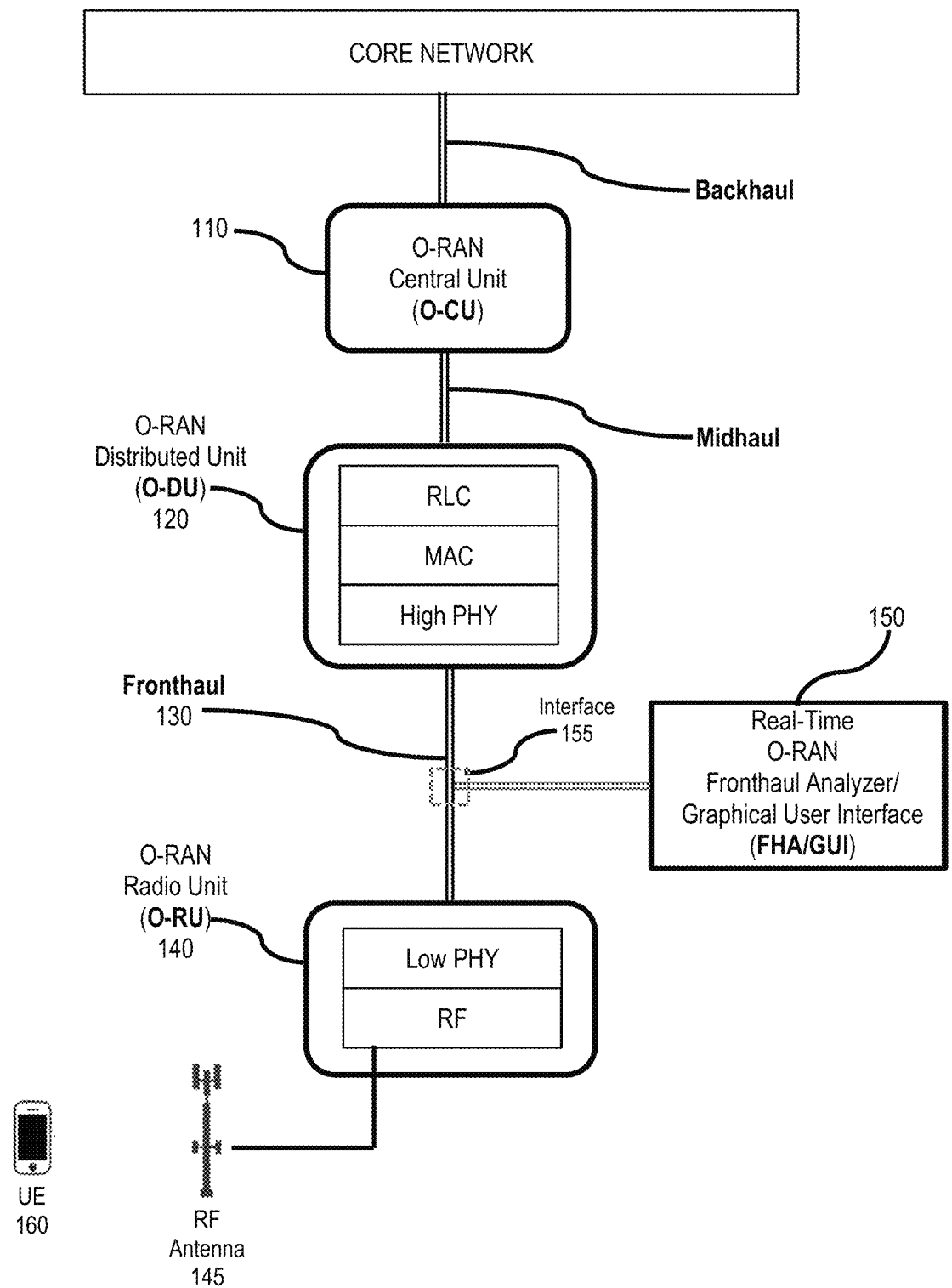
FIG. 1 is a block diagram illustrating relevant units/components of an Open Radio Access Network (O-RAN) fronthaul (FH) link which may be tested/analyzed by a real-time O-RAN Fronthaul Analyzer and Graphical User Interface (FHA/GUI), according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Analyzers/testers may be used to test, analyze, and evaluate both the hardware and the software of the components operating in a cellular communication network that implements the O-RAN standards. In examples of the present disclosure, a real-time O-RAN fronthaul (FH) analyzer (FHA) and Graphical User Interface (GUI), referred to herein as "the real-time O-RAN FHA" or equivalently as "the real-time O-RAN FHA/GUI," provides (1) real-time analysis, processing, and measurement and real-time continuous generation of low-level analysis, measurements, statistics, etc., in hardware of an O-RAN FH link between at least one O-RAN Distributed Unit (O-DU) and at least one O-RAN Radio Unit (O-RU), and (2) higher-level software processing of the real-time hardware data for generating a GUI to present visual representations of higher-level/low-level analysis, measurements, statistics, etc., of the O-RAN FH link. As used herein in reference to an O-RAN FHA/GUI according to examples of the present disclosure, the terms "real-time" or "in real time" refer to an O-RAN FHA/GUI according to examples of the present disclosure performing the processing, functions, and/or actions within roughly a nanosecond of receipt at the O-RAN FHA/GUI of the frame and/or packet upon which the processing, functions, and/or actions performed, i.e., from about 0.5 nanosecond to about 1.5 milliseconds after receipt.

Some advantages and benefits of the systems and methods for a real-time O-RAN FHA/GUI according to examples of the present disclosure are described, while other benefits and advantages may also be apparent to anyone of ordinary skill in the art. In some examples, a real-time O-RAN FHA/GUI according to the present disclosure may perform/implement low-level packet analysis continuously in real-time in hardware, rather than being performed after-the-fact by post-processing in software on captured packets/frames. Accordingly, packet analysis may be faster through implementation of features of the present disclosure.

In some examples, a real-time O-RAN FHA/GUI according to the present disclosure may perform/implement continuous real-time low-level packet analysis in hardware, may perform/implement higher-level processing in software of data generated by the continuous real-time low-level hardware packet analysis, and then may provide a GUI to present visual representations in near-real-time of analyses, timing measurements and parameters (such as, e.g., transmission/reception windows), conditions, tolerances, qualities (such as, e.g., Quality of Service (QOS) and/or Quality of Experience (QoE)), etc., which are being continuously and actively updated. In some examples of a real-time O-RAN FHA/GUI according to the present disclosure, low-level analyses such as counting packets, reading metadata, tracking active packet flows, making timing measurements, etc., may be performed in hardware rather than software (and thus in real-time), while higher-level analysis and generating visual representations of these analyses may be performed in software (and thus be presented to a user in near-real-time). In some examples, a real-time O-RAN FHA/GUI according to the present disclosure may process substantially all packets received over the O-RAN fronthaul link, meaning that almost no packets are dropped. Accordingly, a user may perform "live" analysis in near-real-time on a running O-RAN fronthaul link, i.e., the analysis may be continuously generated and/or updated in real-time as environmental/system changes occur. In some examples, a user of a real-time O-RAN FHA/GUI according to the present disclosure may simultaneously view live data from several sources in addition to the real-time O-RAN FHA (such as, e.g., an O-RU counter, an O-DU counter, a User Equipment (UE) emulator, etc.), allowing the user to more easily correlate live events and/or current data. As used herein in reference to an O-RAN FHA/GUI according to examples of the present disclosure, the terms "near-real-time" or "in near-real time" refer to an O-RAN FHA/GUI according to examples of the present disclosure providing a user with a visual representation of a change in the O-RAN fronthaul link within roughly about 0.25 to about 1.75 seconds after the change occurs. In some examples, the frontend/user interface of the O-RAN FHA/GUI updates roughly every second, while the backend services of the O-RAN FHA/GUI process data from the hardware portions of the O-RAN FHA/GUI (and provide the results to the frontend) roughly every 100 milliseconds.

In some examples, a real-time O-RAN FHA/GUI according to the present disclosure may provide the user with a visual representation of the packet traffic flow on the O-RAN FH link, including identifications and characteristics of individual packet flows. Accordingly, the user may use this information to validate the operability/interoperability of the O-RAN FH link, such as, for example, proving that the O-RAN FH link may support a sufficient number of packet flows. Without the ability of the O-RAN FH link to support a sufficient number of flows, a consumer/user may not be able to call someone, establish a broadband session (e.g., web browsing), achieve sufficient QoS, or—even if a broadband session is possible-receive an adequate QoE.

In some examples, a real-time O-RAN FHA/GUI according to the present disclosure may provide analytical functionalities/applications that generate visual representations in near-real-time via a GUI of analyses of the O-RAN FH link packet traffic flow, such as, e.g., tracking/maintaining a list of one or more individual active packet flows and their characteristics (which is continuously and actively updated), showing the transmission/reception windows of one or more active packet flows, showing the characteristics of one or more communication planes of the O-RAN FH link packet traffic flow, etc. Accordingly, a user of a real-time O-RAN FHA/GUI according to examples of the present disclosure may analyze and determine whether the O-RUs, O-DUs, any other components, any packet flows, etc. of an O-RAN FH link are within the specifications of the O-RAN standard. For instance, when connecting an O-DU of one vendor to an O-RU of another vendor over an O-RAN FH link, a user of a real-time O-RAN FHA/GUI according to examples of the present disclosure may determine if the O-DU and the O-RU are truly interoperable according to the specifications of the O-RAN standard.

FIG. 1 is a block diagram illustrating relevant units/components of an Open Radio Access Network (O-RAN) fronthaul (FH) link being tested/analyzed by a real-time O-RAN Fronthaul Analyzer and Graphical User Interface (FHA/GUI), according to an example. Only the units/components of an O-RAN most relevant to the explanation and description of a real-time fronthaul analyzer according to the examples of the present disclosure are shown and discussed herein. Moreover, less relevant components/units shown and described may not be numbered.

In FIG. 1, a core network is connected by a backhaul link to an O-RAN Central Unit (O-CU) 110, which, in turn, is connected by a midhaul link to an O-RAN Distributed Unit (O-DU) 120, which, in turn, is connected by an O-RAN fronthaul (FH) link 130 to an O-RAN Radio Unit (O-RU) 140 which may include a radiofrequency (RF) antenna 145. A user equipment (UE) 160 communicates via radio interface with the RF antenna 145 of the O-RU 140. A real-time O-RAN FHA/GUI 150 according to examples of the present disclosure may be detachably or permanently connected to the O-RAN FH link 130 by interface 155.

In the design of the O-RAN architecture, which is in harmony with the 5G New Radio (NR) RAN architecture defined by the $3^{rd}$ Generation Partnership Project (3GPP), the O-CU 110, the O-DU 120, and the O-RU 140 may be responsible for delivering the diverse functions of the radio protocol stack associated with the Radio Resource Control (RRC), Service Data Adaption Protocol (SDAP), Packet Data Convergence Protocol (PDCP), Radio Link Protocol (RLC), and the Medium Access Control (MAC) and physical (PHY) layers. See, e.g., 3GPP Technical Specification (TS) 36.141 (Evolved Universal Terrestrial Radio Access (E-UTRA); Base Station (BS) conformance testing); 36.213 (E-UTRA; Physical layer procedures); 38.133 (NR: Requirements for support of radio resource management); 38.211 (NR: Physical Channels and modulation); and 38.323 (Packet Data Convergence Protocol (PDCP) specification), each of which is hereby incorporated by reference in its entirety.

The O-RU 140 may integrate antenna elements with radio processing components, such as transceivers, analog beamformers, and power amplifiers, by which the O-RU 140 may use the RF antenna 145 to establish a PHY layer connection with the UE 160. In addition to the RF processing, the O-RU 140 integrates the lower level PHY layer processing (Low PHY), such as digital and/or analog beamforming, the fast Fourier transform (FFT)/inverse-FFT (i-FFT) processing, Cyclic Prefix (CP) addition, Digital-Analog Conversion, IQ Compression/Decompression, etc. The O-RU 140 communicates with the O-DU 120 over the O-RAN FH link 130.

As would be understood by one of ordinary skill in the art, although labelled a "link" herein, the O-RAN FH link 130 may take any number of forms, including a network or a cloud. Moreover, the O-RAN FH link 130 may use Ethernet as a transport mechanism (i.e., the Institute of Electrical and Electronic Engineers (IEEE) Standard 802.3 (IEEE 802.3)), as it does in the present disclosure, but the O-RAN FH link 130 may also use the Internet Protocol (IP), the Internet Engineering Task Force (IETF) Request for Comments (RFCs) 791 & 2460, and the User Datagram Protocol (UDP), IETF RFC 768, in addition to Ethernet, or in place thereof. When using Ethernet, the payload of the Ethernet frame may contain a further transport header and payload, which encapsulation may be indicated in the EtherType field of the Ethernet frame header. O-RAN allows for multiple different headers within the Ethernet payload to further describe how the data may be handled, including the evolved Common Public Radio Interface (eCPRI) transport header. For further details, see, e.g., Sect. 5 of the Control, User, and Synchronization Plane Specification of O-RAN Working Group 4 (O-RAN.WG4.CUS.0-R003-v12.00), which is hereby incorporated by reference herein in its entirety (hereinafter referred to as "the O-RAN FH C/U/S-Plane standard") and the Common Public Radio Interface: eCPRI Interface Specification V2.0 (2019-05-10), which is hereby incorporated by reference herein in its entirety.

As would be understood by one of ordinary skill in the art, although FIG. 1 shows a single O-DU connected to a single O-RU, a single O-DU may be connected to multiple O-RUs (either in parallel or in cascade mode), or multiple O-DUs may be connected to multiple O-RUs. See, e.g., Sect. 2.1.1 of the Fronthaul Interoperability Test Specification of O-RAN Working Group 4 (O-RAN.WG4.IoT.0-R003-v10.00), which is hereby incorporated by reference herein in its entirety (hereinafter referred to as "the O-RAN FH IoT standard"). Moreover, the O-RAN FH link 130 may include a Fronthaul Transport Node (FTN) or Transport Network Element (TNE), which may be used to manage the Ethernet communications between one or more O-DUs and one or more O-RUs, a Fronthaul Multiplexer (FHM), whereby a single O-DU may connect with a cell comprising multiple O-RUs, or with multiple cells each comprising multiple O-RUs, or a Fronthaul Gateway (FHGW or FHG), whereby one or more O-DUs may connect with a non-O-RAN RU (such as, e.g., a Remote Radio Unit (RRU), a Remote Radio Head (RRH), etc.). See, e.g., Annex A of the O-RAN Architecture Description of O-RAN Working Group 1 (O-RAN.WG1.OAD.R003-v09.00), which is hereby incorporated by reference herein in its entirety.

Referring to FIG. 1, the O-DU 120 is connected to the O-RU 140 via the O-RAN FH link 130, and may be responsible for the higher level processing functions of the PHY layer (High Phy), such as, e.g., channel modulation and coding/decoding, the MAC layer, and the RLC layer. The O-DU 120 is connected via the midhaul link to the O-CU 110, which may be responsible for the upper layers of the radio protocol: the RRC, the PDCP, and the SDAP. The O-CU 110 may be supported by the Network Function Virtualization Infrastructure (NFVI) of the core network, which may enable simultaneous operation with both Long-Term Evolution (LTE)O-DUs and 5G NR O-DUs.

As stated above, the real-time O-RAN FHA/GUI 150 may be detachably or permanently connected to the O-RAN FH link 130 by interface 155. The interface 155 be an inline connection and/or may take the form of a splitter, a tap, and/or any appropriate plug for such a connection, as would be understood by one of ordinary skill in the art. Moreover, as discussed in greater detail below, in various examples of the present disclosure, the real-time O-RAN FHA/GUI 150 may have an intrusive mode, where some or all of the communication traffic on the O-RAN FH link 130 flows through some or all of the analytical components of the real-time O-RAN FHA/GUI 150, and a non-intrusive mode, where the real-time O-RAN FHA/GUI 150 makes copies of traffic packets to analyze in real time, and the real-time O-RAN FHA/GUI 150 may be either connected to the O-RAN FH link 130 by a tap or equivalent interconnection, or the real-time O-RAN FHA/GUI 150 may allow some or all of the packet traffic to flow through a direct channel in the real-time O-RAN FHA/GUI 150 back into/onto the O-RAN FH link 130. In some examples, the real-time O-RAN FHA/GUI 150 may provide bidirectional Synchronous Ethernet (SyncE) clock recovery, which may avoid any break/interrupt of the SyncE line frequency from, e.g., the O-DU 120 to the O-RU 140 (in network configuration LLS-C1), which may be beneficial when in either intrusive mode.

The details of the packet traffic flow of the O-RAN FH link 130, which the real-time O-RAN FHA/GUI 150 according to examples of the present disclosure analyzes, evaluates, and/or otherwise synthesizes/processes, are discussed below in reference to FIGS. 2A-2D. As used herein, "packet traffic flow" may include any packets and/or frames transmitted and/or received over an O-RAN fronthaul link, as defined by the O-RAN standards, i.e., any and all communication carried on an O-RAN fronthaul link. As used herein, a "packet flow" may refer to a multitude of packets that are related by at least one characteristic, which may be identifiable from metadata in the packet headers of the multitude of packets, where such characteristics may include, for example, a source and/or destination (e.g., the O-DU 120, the O-RU 140, the RF antenna 145, the UE 160, the O-CU 110, the core network, etc., indicated by any form/type of identifying indicia, e.g., a MAC address (including, e.g., an Ethernet MAC address), an IP address, a Virtual Local Area Network (VLAN) tag, an extended Antenna-Carrier identification (eAxC ID), etc.), a communication plane (e.g., U-plane, C-Plane, S-Plane, and/or M-Plane), a traffic direction (e.g., downlink or uplink), a type of packet (packet type) and/or frame (either generally, e.g., Ethernet, CPRI, IP/UDP, etc., or more specifically, for example, within a specific protocol, e.g., an EtherType, a type of IP/UDP packet, a type of Precision Timing Protocol (PTP) packet, etc.), a protocol-defined relationship (e.g., a PTP master and slave), a timing parameter (as defined by a user and/or a protocol/standard such as O-RAN, such as, e.g., early, late, or on-time packets as described in reference to FIGS. 2C and 2D below—this information may be derived from more than packet header metadata, such as timing information added to each packet), any other characteristic defined, discussed, or suggested herein, etc., as would be understood by one of ordinary skill in the art. As used herein, an "active packet flow" may refer to a packet flow which currently has packets being carried on the O-RAN fronthaul link, even if such packet traffic is intermittent, such as PTP packets in a PTP packet flow, as would be understood by one of ordinary skill in the art. As used herein, the term "indicia" may refer to any form of identification, whether by characteristic, grouping, etc., or by uniquely identifying a single entity, as would be understood by one of ordinary skill in the art (like in common usage, the term "indicia" as used herein may refer to either or both the singular and the plural, like the terms "agenda," "criteria," and "data"). As used herein, the narrower term "unique indicia" may refer to any indicia which uniquely identifies a single entity (such as, for example, an arbitrarily generated hash value).

Figure 2A:
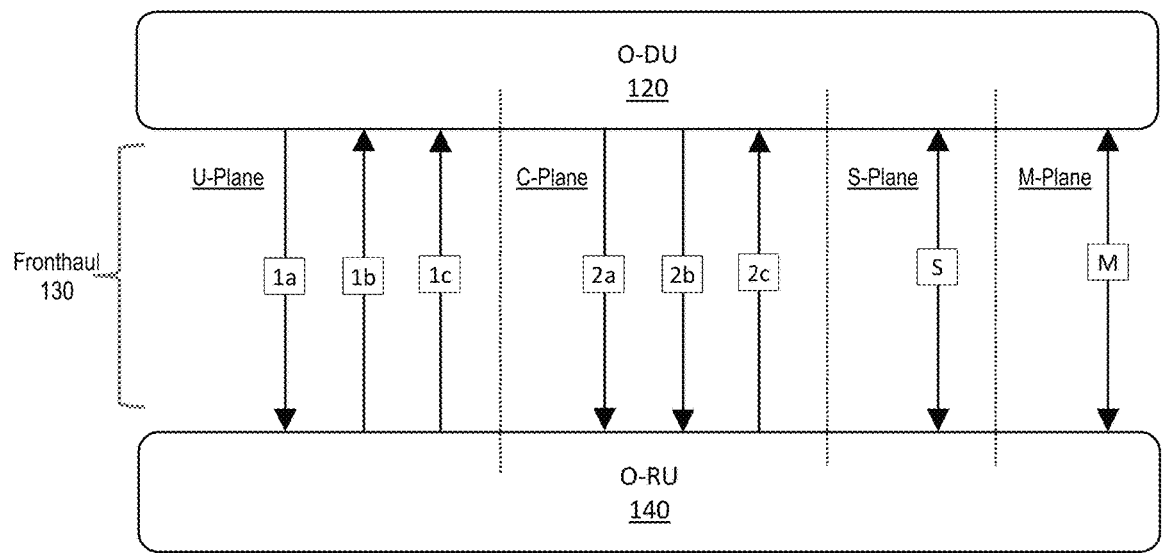
FIG. 2A is a block diagram illustrating the U-, C-, S-, and M-Plane communications of the O-RAN fronthaul (FH) link between the O-RAN Distributed Unit (O-DU) and the O-RAN Radio Unit (O-RU) which may be tested/analyzed by a real-time O-RAN FHA/GUI, according to an example.

FIG. 2A is a block diagram illustrating the U-, C-, S-, and M-Plane communications between the O-DU 120 and O-RU 140 being tested/analyzed by a real-time O-RAN FHA/GUI 150, according to an example. Each arrow represents a packet traffic flow (as defined in the O-RAN standards) and the traffic direction. The User Plane (U-Plane) may carry real-time uplink and downlink I/Q data transferred over eCPRI, while the Control Plane may carry real-time control information to the O-RU over eCPRI to define how the U-Plane traffic should be handled. See, e.g., the O-RAN FH C/U/S-Plane standard. Because of this, some C-Plane packets should arrive before U-Plane packets and, in the O-RAN standard, these timing tolerances may be relatively tight. See, e.g., the O-RAN FH C/U/S-Plane standard. The O-RAN fronthaul C-Plane is separate and distinct from the C-Plane related to UE over-the-air communications and is governed by entirely different and far more stringent requirements, such as, e.g., strict timing parameters and windows for reception and transmission. See, e.g., the O-RAN FH C/U/S-Plane standard. Because of the interconnectedness of the C-Plane and the U-Plane, they may be referred to jointly as the "C/U-Plane" or "C/U Plane" and may be considered as a single communication plane comprising two interconnected planes.

The S-Plane and the M-Plane are so-called "slow protocols," carrying less packet traffic than the C/U-Plane. The S-Plane periodically sends timing and synchronization messages using the Precision Timing Protocol (PTP) to synchronize the O-RU 140 to the rest of the network. See, e.g., the O-RAN FH C/U/S-Plane standard; and PTP (IEEE 1588), which is hereby incorporated by reference in its entirety. The M-Plane contains non-real-time traffic (which, as such, has no especially strict timing parameters), carrying non-real-time management and configuration Network Configuration Protocol (NETCONF) and Yet Another Generation (YANG) (NETCONF/YANG)-based operations. See, e.g. Management Plane Specification of O-RAN Working Group 4 (O-RAN.WG4.MP.0-R003-v12.00), which is hereby incorporated by reference herein in its entirety (hereinafter referred to as "the O-RAN FH M-Plane standard"); IETF RFC 5277, IETF RFC 6241, IETF RFC 6242, IETF RFC 6470, IETF RFC 8071, IETF RFC 7951, and IETF RFC 8639, all of which are hereby incorporated by reference in their entireties.

Although typically contained/encapsulated in Ethernet frames, as mentioned above, the C/U/S/M-Plane packets may have their own typically used protocols. The C/U-Plane packets may use eCPRI/Radio over Ethernet (RoE) headers/messages/protocols; the S-Plane may use PTP; and the M-Plane may use NETCONF/YANG headers/messages/protocols.

As shown in FIG. 2A, each one of the C/U Planes may have individually defined traffic flows. The U-Plane may have traffic flow 1a, Downlink (DL) Frequency Domain IQ Data, containing DL user data (e.g., user data (PDSCH), control channel data (PDCCH), etc.); traffic flow 1b, Uplink (UL) Frequency Domain IQ Data, containing UL user data (e.g., user data (PUSCH), control channel data (PUCCH), etc.); and traffic flow 1c, Physical Random Access Channel (PRACH) Frequency Domain IQ Data. The C-Plane may have traffic flow 2a, DL & UL Scheduling Commands & Beamforming Commands, containing scheduling information, FFT size, CP length, subcarrier spacing, UL PRACH scheduling, beam index, etc.; traffic flow 2b, License Assisted Access (LAA) Listen Before Talk (LBT) configuration parameters and requests, containing LBT configuration parameters (e.g., IbtHandle, IbtDeferFactor, IbtOffset, etc.); and traffic flow 2c, LAA LBT status and responses, containing LBT DL indication parameters (e.g., InitialPartialSFs, bufferError, IbtCWR_Result, etc.). As indicated above, the S-Plane may have traffic flow S, Timing & Synchronization, including PTP (IEEE 1588), and SYNChronous Ethernet (SyncE) Synchronization Status Message (SSM) traffic and packets. Additional details may be found in the O-RAN FH C/U/S-Plane standard. As also indicated above, the M-Plane may have traffic flow M, non-real-time management, and configuration information, which may have NETCONF/YANG headers, messages, packets, and information, which may, in turn, be carried using the IP/TCP stack layers. Additional details may be found in the O-RAN FH M-Plane standard.

As would be understood by one of ordinary skill in the art, the O-RAN standard is continually evolving and changing, and examples of the present disclosure are intended to apply equally to such evolution and changes. For example, in a revision of the O-RAN FH C/U/S-Plane standard presently under consideration, three additional streams are added to the C-Plane in FIG. 2A, i.e., 2d for UE channel information, 2e for ACK/NACK messaging, and 2f for Wake-up Ready Indication messaging upon wake up. As indicated here and elsewhere, examples of the present disclosure are contemplated to expressly include such evolutionary growth and changes, and thus any new and/or changed parameter, measurement, quantity, and/or quality discussed, described, and/or identified in any changes to the O-RAN and/or related standards.

Figure 2B:
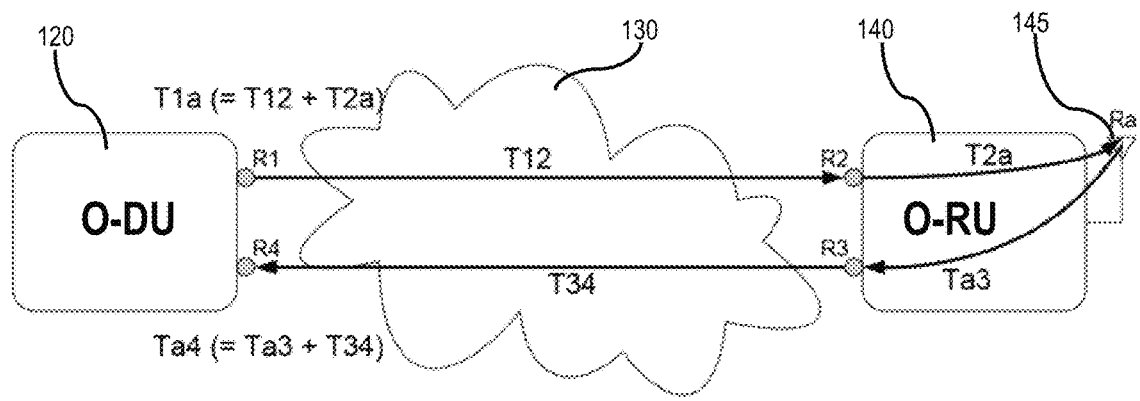
FIG. 2B is a block diagram illustrating the major timing parameters of the O-RAN FH link between the O-DU and O-RU which may be tested/analyzed by a real-time O-RAN FHA/GUI, according to an example.

FIG. 2B is a block diagram illustrating the major timing parameters of the O-RAN fronthaul link between the O-DU 120 and O-RU 140, which the real-time O-RAN FHA/GUI 150 may test/analyze, according to an example. For the most part, these timing parameters may refer to the traffic flow on the C/U-Plane. FIG. 2B shows an O-DU 120 and an O-RU 140 connected by an O-RAN FH link 130, with several reference points for indicating the timing parameters: reference points R1 and R2 on the DL from O-DU 120 to the O-RU 140, where R1 is located at the O-DU 120 and R2 is located at the O-RU 140; reference points R3 and R4 on the UL from O-RU 140 to the O-DU 120, where R3 is located at the O-RU 140 and R4 is located at the O-DU 120; and reference point Ra, located at the physical RF antenna. Most timing parameters may be identified with reference to these reference points, or to the letters and/or numerals of these reference points. For example, the DL delay may be T12, the UL delay may be T34, with further qualifications such as, e.g., T12_min and T12_max indicating the minimum and maximum DL delays. As other examples, T1a may indicate the delay from the DL output (R1) of the O-DU 120 to transmission over the air (Ra); T2a may indicate the delay from the DL input (R2) of the O-RU 140 to transmission over the air (Ra); T3a may indicate the delay from (receiving) the transmission over the air (Ra) to the UL output port (R3) of the O-RU 140; and T4a may indicate the delay from (receiving) the transmission over the air (Ra) to the UL input port (R4) of the O-DU 120. Additional details may be found in the O-RAN FH C/U/S-Plane standard.

It should be noted that FIG. 2B may be considered an approximation/simplification: as noted in Sect. 4.7.1 of the O-RAN FH C/U/S-Plane standard, the latency model of FIG. 2B assumes the antenna-to-O-RU delay is negligible compared to the internal delay of the O-RU 140; however, T2a and Ta3 may be defined differently than as shown in FIG. 2B when the delays between the O-RU 140 and the RF antenna 145 are also introduced. More specifically, two additional points, Rd and Ru (not shown in FIG. 2B), are defined as located on the O-RU 140 at the output to and input from, respectively, the RF antenna 145, thereby defining times Tda from Rd to Ra and Tau from Ra to Ru. T2a and Ta3 remain, but only define the internal delays of the O-RU 140, from R2 to Rd and from Ru to R3, respectively. Accordingly, when such delays are also considered, the overall DL delay T1a=T12+T2a+Tda and the overall uplink delay Ta4=Tau+Ta3+T34 (by contrast to FIG. 2B). See details regarding the RF antenna 145 timing delays in, e.g., FIGS. 4.7-1, Table 4.7.1-1, and the related discussion in the O-RAN FH C/U/S-Plane standard. As would be understood by one of ordinary skill in the art, calculations, measurements, and analyses may need to be adjusted if such external antenna delays are to be considered.

The relationships between the timing parameters on the O-RAN FH link 130 may be particularly stringent, and in some cases may be more important/relevant for the proper operation of the O-RAN FH link 130 than any of the individual parameters themselves. For example, it may be more important that packets in the traffic flow arrive within a particular reception window and transmit within a particular transmission window than whether individual packets arrive and/or depart at specific times. Moreover, because of new complexities and complications in developing 5G/6G cellular communication, such as, e.g., numerology, where the size and shape of any particular symbol in time and frequency may be different among the packet flows, and the use of Multiple Input Multiple Output (MIMO) and beamforming in radio transmission, both the necessity of keeping to precise transmission/reception windows may be more important and the ability to measure the important timing and other parameters may be more difficult.

More specifically, and as an example, it takes some amount of time for the sender to transmit the packets in either direction (DL/UL) over the transmission media. However, the amount of data for any interval (e.g., symbol) can vary thus resulting in differing transmit times. This transmission time can be affected by several factors including (but not limited to) transport media rate, air interface bandwidth, and amount of data compression. The maximum amount of time allowed for the transmitter to send all data for an interval (transmission window) is defined by T1a_max-T1a_min. This is the allowed time, based on transport and O-RU characteristics, and its impacts on O-DU is explained in clause 4.4.1.2 of the O-RAN FH C/U/S-Plane standard.

To account for transport variation and transmission time, the receiver similarly implements a reception window. This allows packets containing samples for a specific symbol to be received within the window and still be transmitted at Ra at the time specified in the O-RAN standards. The size of the reception window shall account for both the maximum transmission time at the sender and the transport variation through the O-RAN fronthaul network. The result is the first of the delay relationships in the O-RAN FH C/U/S-Plane standard which shall be met to ensure a working delay solution (see Table 4.4.2.1-1 et seq.), where T2a_max-T2a_min is the DL reception window, T1a_max-T1a_min is the DL transmission window, T3a_max-T3a_min is the UL reception window, T4a_max-T4a_min is the UL transmission window, while T12_max-T12_min is the allowed DL transport variation and T34_max-T34_min is the allowed UL transport variation. A detailed example of such O-RAN timing parameters and relationships in the C/U-Plane is described below in reference to FIGS. 2C and 2D.

Figure 2C:
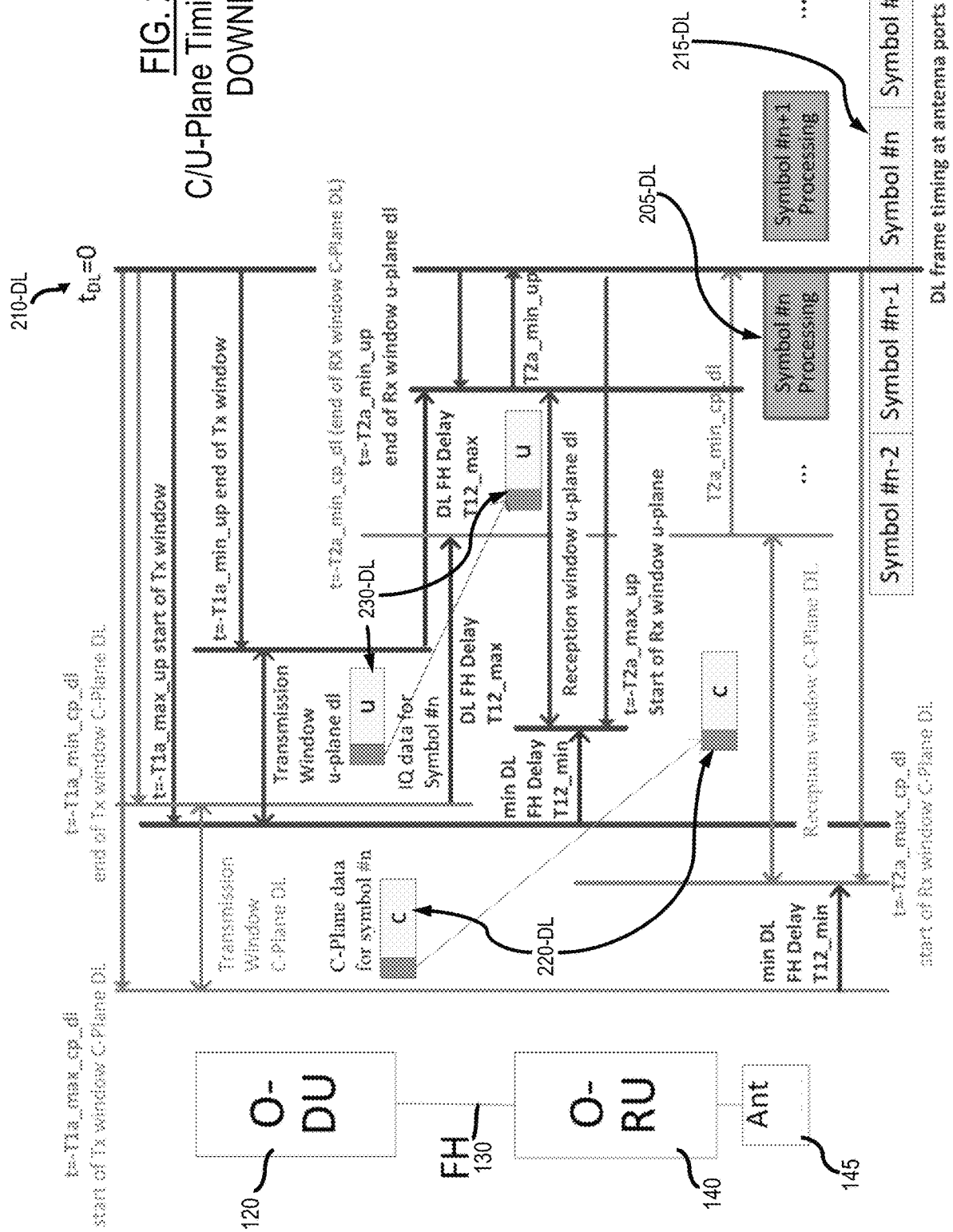
FIG. 2C is a timing diagram of the C/U-Plane downlink on the O-RAN FH link, which may be tested/analyzed by a real-time O-RAN FHA/GUI, according to an example.

FIG. 2C is a timing diagram of the C/U-Plane downlink on the O-RAN FH link 130, which a real-time O-RAN FHA/GUI 150 may test/analyze, according to an example. Generally speaking, FIG. 2C shows the transmission of a C-Plane packet 220-DL from the O-DU 120 and its reception at the O-RU 140 (the C-Plane packet 220-DL itself is shown twice on FIG. 2C, both at its transmission and its reception, connected by an arrow) and the transmission of a U-Plane packet 230-DL from the O-DU 120 and its reception at the O-RU 140 (the U-Plane packet 230-DL itself is shown both at its transmission and its reception, connected by an arrow). The U-Plane packet 230-DL contains IQ data for a symbol #n to be transmitted and the C-Plane packet 220-DL contains control data for symbol #n (and thus for the U-Plane packet 230-DL), therefore the C-Plane packet 220-DL should arrive at the O-RU 140 before the U-Plane packet 230-DL.

As shown in FIG. 2C, the C/U-Plane downlink timing parameters may be defined according to $t_{DL}=0$ (indicated by reference numeral 210-DL), which is the time of the beginning of the transmission of the symbol #n (indicated by reference numeral 215-DL) from the RF antenna 145 of the O-RU 140, after the end of the processing of the symbol #n (indicated by reference numeral 205-DL) at the O-RU 140. As stated above, the C-Plane packet 220-DL contains control data for symbol #n (and thus for the U-Plane packet 230-DL), and should be received at O-RU 140 before the U-Plane packet 230-DL. Table 1 below lists C/U-Plane downlink timing parameters for analytical timing measurements involving the O-RAN FH link 130, some of which are indicated in FIG. 2C:

TABLE 1

O-RAN FH C/U-Plane Downlink Parameters

| Parameter | Dir. | Pl. | Definition | Notes |
|---|---|---|---|---|
| T12 | DL | — | From output at O-DU (R1) to reception at O-RU (R2) | |
| T12_min | DL | — | Minimum transport delay between O-DU and O-RU | Minimum FH DL delay |
| T12_max | DL | — | Maximum transport delay between O-DU and O-RU | Maximum FH DL delay |
| T1a | DL | — | From output at O-DU (R1) to transmission over the air (Ra) | |
| T1a_max | DL | — | Earliest possible time between when the O-DU may transmit a message (from R1) and transmittal of that message at the antenna (Ra) | Start of O-DU DL Tx window |
| T1a_min | DL | — | Minimum delay between when the O-DU may transmit a message (from R1) and transmittal of that message at the antenna (Ra) | End of O-DU DL Tx window |
| T1a_max_cp_dl | DL | C | Earliest possible time at which the O-DU may send a control message (from R1) before the transmission at the antenna (Ra at $t_{DL} = 0$) of the IQ data to which the control message applies | Start of DL C-Plane Tx window (O-DU) |
| T1a_min_cp_dl | DL | C | Minimum delay between when the O-DU may transmit a control message (from R1) and transmittal of the IQ data to which the control message applies at the antenna (Ra at $t_{DL} = 0$) | End of DL C-Plane Tx window (O-DU) |
| T1a_max_up | DL | U | Earliest possible time at which the O-DU may send an IQ data message (from R1) before the transmission of that IQ data as samples at the antenna (Ra at $t_{DL} = 0$) | Start of DL U-Plane Tx window (O-DU) |
| T1a_min_up | DL | U | Minimum delay between when the O-DU may transmit an IQ data message (from R1) and transmittal of that IQ data as samples at the antenna (Ra at $t_{DL} = 0$) | End of DL U-Plane Tx window (O-DU) |
| T2a | DL | — | From reception at O-RU (R2) to transmission over the air (Ra) | |
| T2a_max | DL | — | Earliest possible time between when the O-RU receives a data packet (at R2) and transmittal of first IQ samples at the antenna (Ra) | Start of O-RU DL Rx window |
| T2a_min | DL | — | Minimum O-RU processing delay between receipt of data (at R2) and transmittal of first IQ samples at the antenna (Ra) | End of O-RU DL Rx window |
| T2a_max_cp_dl | DL | C | Earliest possible time at which the O-RU may receive a control message (at R2) before the transmission at the antenna (Ra at $t_{DL} = 0$) of the IQ data to which the control message applies | Start of DL C-Plane Rx window (O-RU) |
| T2a_min_cp_dl | DL | C | Minimum O-RU processing delay between receipt of a control message (at R2) and the transmission at the antenna (Ra at $t_{DL} = 0$) of the IQ data to which the control message applies | End of DL C-Plane Rx window (O-RU) |
| T2a_max_up | DL | U | Earliest possible time at which the O-RU may receive (at R2) an IQ data message before the transmission of that IQ data as samples at the antenna (Ra at $t_{DL} = 0$) | Start of DL U-Plane Rx window (O-RU) |
| T2a_min_up | DL | U | Minimum O-RU processing delay between receipt of an IQ data message (at R2) and transmittal of that IQ data as samples at the antenna (Ra at $t_{DL} = 0$) | End of DL U-Plane Rx window (O-RU) |
| Tcp_adv_dl | DL | C/U | Time difference (advance) between the reception window for the downlink control messages and the reception window of the data messages to which the control messages apply | |

Figure 2D:
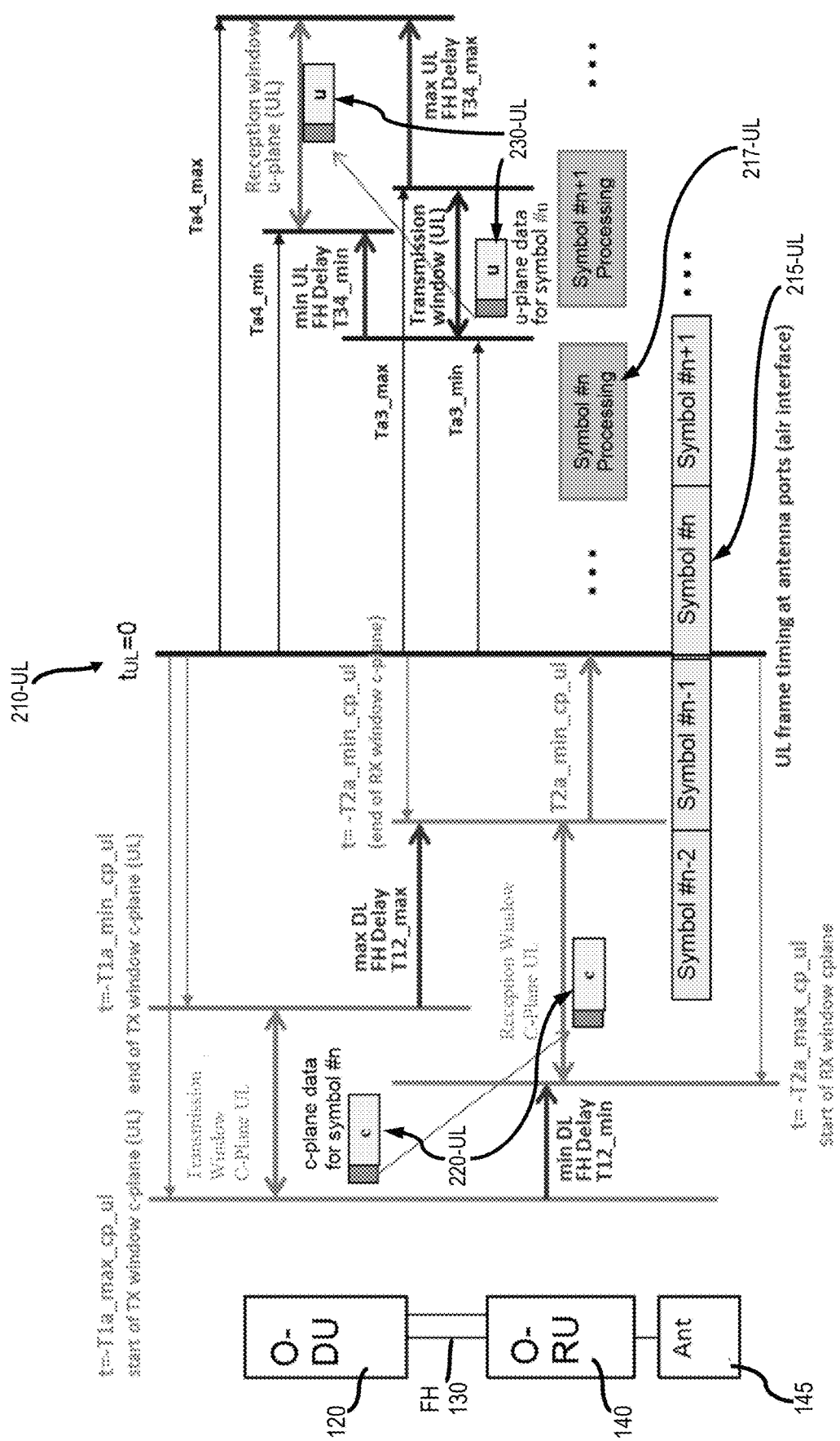
FIG. 2D is a timing diagram of the C/U-Plane uplink on the O-RAN FH link, which may be tested/analyzed by a real-time O-RAN FHA/GUI, according to an example.

FIG. 2D is a timing diagram of the C/U-Plane uplink on the O-RAN FH link 130, which a real-time O-RAN FHA/GUI 150 may test/analyze, according to an example. Generally speaking, FIG. 2D shows the transmission of a C-Plane packet 220-UL from the O-DU 120 and its reception at the O-RU 140 (the C-Plane packet 220-UL itself is shown twice on FIG. 2D, both at its transmission and its reception, connected by an arrow) and the transmission of a U-Plane packet 230-UL from the O-RU 140 and its reception at the O-DU 120 (the U-Plane packet 230-UL itself is shown both at its transmission and its reception, connected by an arrow). The U-Plane packet 230-UL contains IQ data from a symbol #n which was received, and the C-Plane packet 220-UL contains control data for the received symbol #n (and thus for the U-Plane packet 230-UL), therefore the C-Plane packet 220-UL should arrive at the O-RU 140 before the symbol #n. Because the O-DU 120 sends the control messages to the O-RU 140, the C-Plane packet 220-UL is transmitted on the downlink, although its control data applies to the uplink.

when the symbol #n is received (at 215-UL) and then processed (at 217-UL) by O-RU 140 for the creation and transmittal of the U-Plane packet 230-UL. Table 2 below lists C/U-Plane uplink timing parameters for analytical timing measurements involving the O-RAN FH link 130, some of which are indicated in FIG. 2D:

TABLE 2

O-RAN FH C/U-Plane Uplink Parameters

| Parameter | Dir. | Pl. | Definition | Notes |
|---|---|---|---|---|
| T12_min | UL (DL) | C | Minimum transport delay between O-DU and O-RU | Minimum FH DL delay (for control messages concerning incoming UL data) |
| T12_max | UL (DL) | C | Maximum transport delay between O-DU and O-RU | Maximum FH DL delay (for control messages concerning incoming UL data) |
| T1a_max_cp_ul | UL (DL) | C | Earliest possible time at which the O-DU may send a control message (from R1) before the reception at the antenna (Ra) of the IQ data to which the control message applies | Start of [UL] C-Plane Tx window (O-DU) |
| T1a_min_cp_ul | UL (DL) | C | Minimum delay between when the O-DU may transmit a control message (from R1) and transmittal of the IQ data to which the reception at the antenna (Ra) of the IQ data to which the control message applies | End of [UL] C-Plane Tx window (O-DU) |
| T2a_max_cp_ul | UL (DL) | C | Earliest possible time at which the O-RU may receive a control message (at R2) before the reception at the antenna (Ra) of the IQ data to which the control message applies | Start of [UL] C-Plane Rx window (O-RU) |
| T2a_min_cp_ul | UL (DL) | C | Minimum O-RU processing delay between receipt of a control message (at R2) and the reception at the antenna (Ra) of the IQ data to which the control message applies | End of [UL] C-Plane Rx window (O-RU) |
| T34 | UL | — | From output at O-RU (R3) to reception at O-DU (R4) | |
| T34_min | UL | — | Minimum transport delay between O-RU (R3) and O-DU (R4) | Minimum FH UL delay |
| T34_max | UL | — | Maximum transport delay between O-RU (R3) and O-DU (R4) | Maximum FH UL delay |
| Ta3 | UL | — | From reception at O-RU antenna (Ra) to transmission from O-RU (R3) | |
| Ta3_max | UL | U | Maximum delay between when the message is received at the antenna (Ra) and when the O-RU may transmit the message (from R3) to the O-DU | End of UL U-Plane Tx window (O-RU) |
| Ta3_min | UL | U | Earliest possible time at which the O-RU may transmit a message to O-DU at R3 after receipt of the message at the antenna (Ra) | Start of UL U-Plane Tx window (O-RU) |
| Ta4 | UL | — | From reception at O-RU antenna (Ra) to reception at O-DU (R4) | |
| Ta4_max | UL | U | Maximum delay between when the message is received at the antenna (Ra) and the O-DU may receive the message (at R4) from the O-RU | End of UL U-plane Rx window (O-DU) |
| Ta4_min | UL | U | Earliest possible time at which the O-DU may receive a message at R4 after receipt of the message at the antenna (Ra) | Start of UL U-Plane Rx window (O-DU) |

As shown in FIG. 2D, the C/U-Plane uplink timing parameters may be defined according to $t_{UL}=0$ (indicated by reference numeral 210-UL), which is the time of the beginning of the reception of the symbol #n (indicated by reference numeral 215-UL) at the RF antenna 145 of the O-RU 140. After the end of the processing of the symbol #n (indicated by reference numeral 217-DL) at the O-RU 140, the U-Plane packet 230-UL is transmitted on the O-RAN FH link 130 from the O-RU 140 to the O-DU 120. As stated above, the C-Plane packet 220-UL contains control data for symbol #n (and thus for the U-Plane packet 230-UL), and should be received at O-RU 140 before the $t_{UL}=0$ (210-UL), The above description is only of some specific examples, the full range and details of windows and other higher-level timing parameters which must be met by a working O-RAN FH link 130 are detailed in, inter alia, the O-RAN FH C/U/S-Plane standard, the O-RAN FH M-Plane standard, and the O-RAN FH IoT standard-any and all of which may be measured/analyzed by a real-time O-RAN FHA/GUI 150 according to examples of the present disclosure. For example, a real-time O-RAN FHA/GUI 150 according to examples of the present disclosure may be able to measure/analyze the timing parameters as detailed in Sect. 11.2.5 ("Synchronization accuracy") of the O-RAN FH C/U/S-

Plane standard, including the various types of Time Error (TE), such as, e.g., the absolute value of the Time Error (|TE(t)|), Constant Time Error (cTE), Dynamic Time Error (dTE (t)), the slow changes in Time Error after low-pass filtering ($TE_L(t)$), the absolute value of the Time Error as measured at the RF antenna 145 of the O-RU 140 with respect to an ideal time reference ($|TE|_{antenna}$), the absolute value of the Time Error contributed by the O-RU 140 measured from its input to its output ($|TE|_{O-RU}$), the absolute value of the Time Error contributed by the O-DU 120 measured from its network input to its output ($|TE_L|_{O-DU}$), the absolute value of the Time Error contributed by a fronthaul network, measured from its input to its output ($|TE|_{network}$), Time Alignment Error (TAE), Jitter (Sect. 11.2.5.2), Wander (Sect. 11.2.5.3), and Air interface frequency error (Sect. 11.2.5.4). As other examples, a real-time O-RAN FHA/GUI 150 according to examples of the present disclosure may be able to measure/analyze/determine other kinds of parameters besides timing parameters, such as those detailed in Sect. 7.2.3 ("Mixed Numerology and PRACH handling") of the O-RAN FH C/U/S-Plane standard, and other parameters regarding resource allocation such as, e.g., PRB allocation and usage, TDD allocation and usage, FDD allocation and usage, etc., as would be understood by one of ordinary skill in the art.

Moreover, a real-time O-RAN FHA/GUI 150 according to examples of the present disclosure may be able to measure/analyze any other parameters, windows, tolerances, measurements, etc., detailed in any of the O-RAN standards, even if the specific O-RAN standard is not described herein, including, but not limited to, for example, the Wavelength Division Multiplexing (WDM) Fronthaul Transport Specification of O-RAN Working Group 9 (ORAN-WG9.WDM.0-R003-v03.0); the End-to-End System Testing Framework Specification of O-RAN Test and Integration Focus Group (O-RAN.TIFG.E2ETSTFWK.0-v01.00); the End-to-End Test Specification of O-RAN Test and Integration Focus Group (O-RAN.TIFG.E2E-Test.0-v04.00); the Conformance Test Specification of O-RAN Working Group 4 (O-RAN.WG4.CONF.0-R003-v08.00); the Hardware Reference Design Specification for Fronthaul Gateway of O-RAN Working Group 7 (O-RAN.WG7.FHGW-HRD.0-v02.00); the O1 Interface Specification for O-DU of O-RAN Working Group 5 (O-RAN.WG5.O-DU-O1.0-R003-v07.00); the Use Cases Detailed Specification of O-RAN Working Group 1 (O-RAN.WG1.Use-Cases-Detailed-Specification-R003-v11.00); and the O-RAN Security Test Specifications of O-RAN Working Group 11 (O-RAN.WG11.SecTestSpecs-v04.00).

According to some examples of the present disclosure, a real-time O-RAN FHA/GUI 150 may also measure/analyze other parameters (such as, e.g., Key Performance Indicators (KPIs) of LTE and 5G NR), windows, tolerances, measurements, etc., from other standards referred to in the O-RAN standards such as, for example, eCPRI; 3GPP TS 36.141, TS 36.213, TS 38.133, TS 38.211, and 38.323; and International Telecommunications Union (ITU) Recommendations G.8260 (Definitions and terminology for synchronization in packet networks) and its amendments, G.8261 (Timing and synchronization aspects in packet networks) and its amendments, G.8262 (Timing characteristics of a synchronous Ethernet equipment slave clock) and its amendments, G.8264 (Distribution of timing information through packet networks) and its amendments, G.8271 (Time and phase synchronization aspects of telecommunication networks) and its amendments, G.8272 (Timing characteristics of primary reference time clocks) and its amendments, G.8273 (Timing characteristics of telecom boundary clocks and telecom time slave clocks) and its amendments, and G.8275 (Precision time protocol telecom profile for phase/time synchronization with full timing support from the network) and its amendments, each of which is hereby incorporated by reference in its entirety. According to some examples of the present disclosure, a real-time O-RAN FHA/GUI 150 may also measure/analyze other parameters, windows, tolerances, measurements, etc., from other standards which are not explicitly referred to in the O-RAN standards, but may be suitable for testing the O-RAN FH link 130, as would be understood by one of ordinary skill in the art.

As would be understood by one of ordinary skill in the art, additional components and/or hardware may be needed to perform some of these measurements, and examples of the present disclosure may include such additional components and/or hardware, which may be integrated into the real-time O-RAN FHA/GUI 150, and/or the real-time O-RAN FHA/GUI 150 may have a wired/wireless connection for communicating with such additional components and/or hardware (such as, e.g., over the Internet). For instance, certain TE measurements may require an RF receiver.

As used herein, the term "analytical timing measurements" may include, for example, any parameter, measurement, quantity, and/or quality discussed, described, and/or identified in any of the O-RAN and/or related standards, and/or relevant/suited for testing and/or analyzing the O-RAN FH link 130, some of which are discussed, described, and explained in the above paragraphs, as would be understood by one of ordinary skill in the art. As mentioned above, the O-RAN and any related standards are continually evolving and changing, and so are the parameters, measurements, quantities, and/or qualities relevant/suited for testing and/or analyzing the O-RAN FH link 130, thus the term "analytical timing measurements" may include, for example, any parameter, measurement, quantity, and/or quality changed and/or newly discussed, described, and/or identified in any future O-RAN and/or related standards, and/or that become otherwise relevant/suited for testing and/or analyzing the O-RAN FH link 130 in the future. In some examples, an O-RAN FHA/GUI 150 according to the present disclosure may also track, test, analyze, and/or otherwise measure parameters, measurements, quantities, and/or qualities related to the midhaul and/or backhaul links, as well as to the air interface between the UE 160 and the RF antenna 145.

At least because O-RAN is predicated upon, inter alia, providing standards/specifications for the successful interoperability between the O-DU 120 and O-RU 140 on the O-RAN FH link 130 so that different telecommunication systems may be implemented by using various components from multiple vendors, the timing details, parameters, and tolerances of the communications on the O-RAN FH link 130 may also have standardized, industry-wide testing parameters to guarantee workability, many of which are described and detailed in the O-RAN FH C/U/S-Plane standard, the O-RAN FH M-Plane standard, and the O-RAN FH IoT standard. Accordingly, the O-RAN standards, including, e.g., the O-RAN FH C/U/S-Plane standard, the O-RAN FH M-Plane standard, and the O-RAN FH IoT standard, list and detail test configurations, parameters, measurements, etc., which may be used to measure, analyze, and/or otherwise validate the interoperability of any O-DU 120 with any other O-RU 140 over any O-RAN FH link 130.

For instance, the O-RAN FH IoT standard describes many tests for each of the C/U-Plane (sect. 2.2.3), the S-Plane (sect. 2.2.2), and the M-Plane (sect. 2.2.1), as well as appropriate testing tools and parameters. Moreover, other components and instruments may be used with a real-time O-RAN FHA/GUI 150 to perform these tests, such as an O-CU emulator (including, e.g., 5G NR O-CU emulator), a network core emulator, an evolved Node B (eNB) emulator (including, e.g., a 4G LTE Master eNB (MeNB) or other MeNB emulator), an UE testers/emulator, optional beamforming network equipment, an Application Test Server, an RF Spectrum and/or Beam Signal Analyzer, and O-RU emulator, a flow traffic emulator, etc., as discussed at, e.g., Sect. 2.1.1.3 of the O-RAN FH IoT standard. As would be understood by one of ordinary skill in the art, the various examples in the present disclosure may be intended for use (and to be compliant) with both present, currently planned, and future testing protocols of the O-RAN FH IoT standard. See, e.g., Sect. 1.2.3 of the O-RAN FH IoT standard ("Future Enhancements"). However, as would also be understood by one of ordinary skill in the art, the various examples in the present disclosure of the real-time O-RAN FHA/GUI 150 are not in any limited by the present or future O-RAN FH IoT standard, but may be used for many other types of testing.

As mentioned above, there are multiple challenges with testing the O-RAN FH link 130, some but not all of which are discussed herein. Despite providing an intensive description of what is to be tested, the O-RAN standards provide no guidance on how to perform those tests, including how to create instrumentalities to provide such testing results. Moreover, previous telecommunication link analyzers provide limited guidance for creating such testing instrumentalities as some of the O-RAN testing parameters may be new and unique in detail and implementation to the O-RAN FH link 130, which effectively divides what was once a single component and layer (the PHY layer) into two components and two sub-layers (and the upper PHY layer for the O-DU 120 and the lower PHY layer for the O-RU 140), thereby requiring relatively tight timing tolerances between the two (to at least match the overall timing of the previously-single device/component).

Presently, at least partially because of the new and novel nature of the O-RAN FH link 130 and its requirements, many who attempt to perform O-RAN FH link 130 testing have struggled to build their own ad hoc software and hardware for such testing. As far as is known, most instrumentalities that perform O-RAN FH link 130 testing use a capture method, where a snapshot of the O-RAN FH link 130 packet traffic flow may be initially captured (i.e., recorded/stored) in hardware but then analyzed, after the fact, in software (i.e., post-processing). Because of the tight timing and speed of the traffic flow on the O-RAN FH link 130, such instrumentalities may not be able to handle the real-time packet traffic flow, becoming quickly overwhelmed by the flood of packets, even before the software may be able to perform any type of higher-level analysis. Furthermore, even with instrumentalities that perform O-RAN FH link 130 testing using the capture method, many parts of the analysis and processing required for O-RAN FH link 130 analysis may be performed sequentially, thereby delaying the analysis and processing in general. Furthermore, analysis of a snapshot does not take into consideration packets outside of the snapshot which may be outside tolerances.

As mentioned above, examples of a real-time O-RAN FHA/GUI 150 according to the present disclosure provide real-time hardware and software analysis, processing, and measurement of the O-RAN FH link 130, including optionally software post-processing of captured packets/frames from the O-RAN FH link 130. In examples of a real-time O-RAN FHA/GUI 150 according to the present disclosure, low-level packet analysis may be performed/implemented in parallel in hardware, rather than serially in post-processing by software reading and accessing captured frames/packets. In examples of a real-time O-RAN FHA/GUI 150 according to the present disclosure, low level analysis of packet traffic flow over the O-RAN FH link 130 may be performed/implemented in hardware for continuous real-time processing, rather than being performed after-the-fact on captured packets/frames from the O-RAN FH link 130 by post-processing in software. In examples of a real-time O-RAN FHA/GUI 150 according to the present disclosure, higher-level processing in software of data from the continuous real-time low-level processing in hardware allows for the generation of a GUI to present visual representations in near-real-time of analyses, timing parameters (such as, e.g., transmission/reception windows), analytical timing measurements, conditions, tolerances, qualities (such as, e.g., Quality of Service (QOS) and/or Quality of Experience (QoE)), etc., which are being continuously and actively updated.

Figure 3:
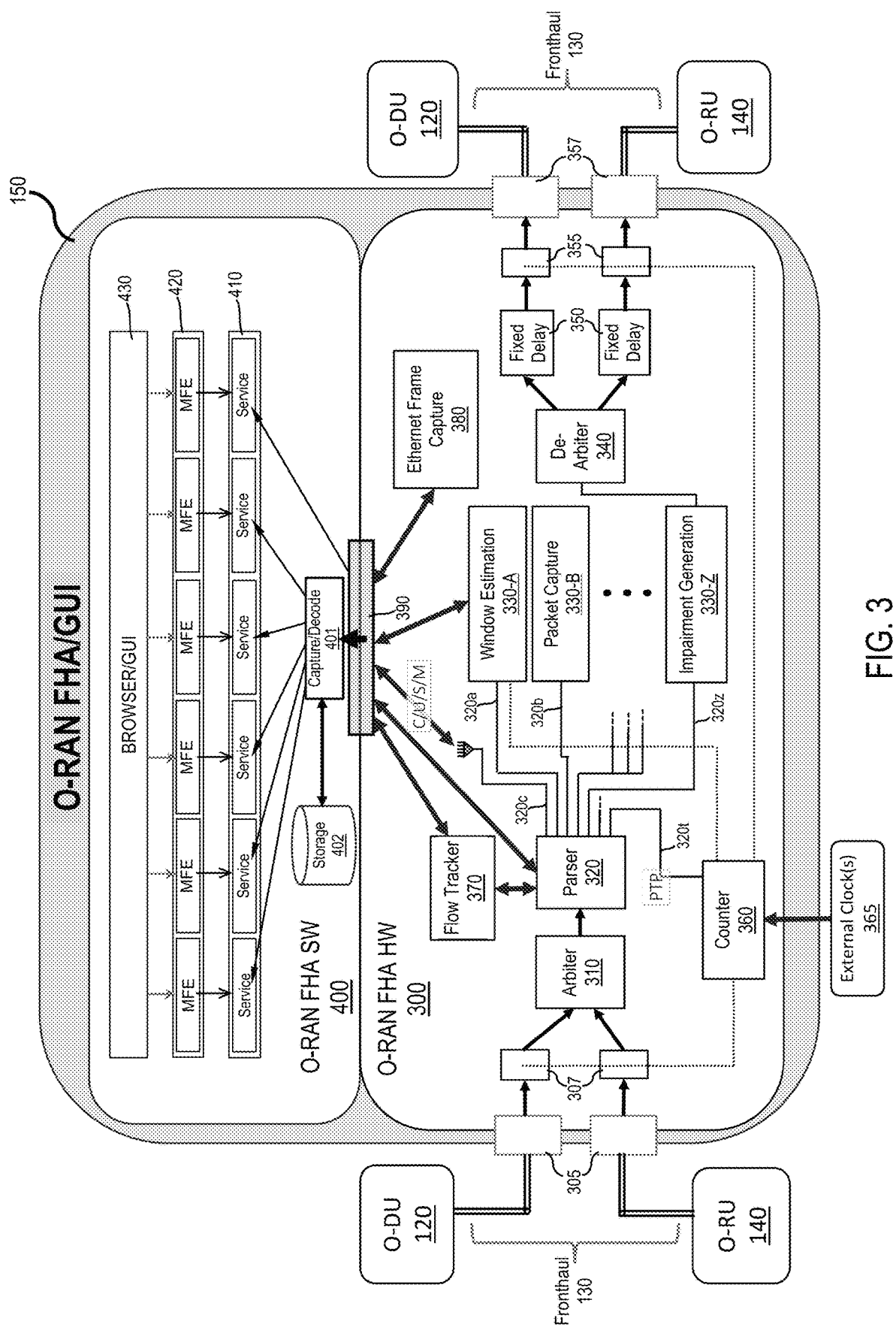
FIG. 3 is a block diagram illustrating components of a real-time O-RAN FHA/GUI, according to an example.

FIG. 3 is a block diagram illustrating components of a real-time O-RAN FHA/GUI 150, according to an example. The number and arrangement of components shown in FIG. 3 are provided as an example. In practice, a real-time O-RAN FHA/GUI 150 according to examples of the present disclosure may include additional components, fewer components, different components, or differently arranged components than those shown in FIG. 3. Additionally, or alternatively, a set of components (e.g., one or more components) of a real-time O-RAN FHA/GUI 150 according to examples of the present disclosure may perform one or more functions described as being performed by another set of components of a real-time O-RAN FHA/GUI 150 according to examples of the present disclosure, as would be understood by one of ordinary skill in the art. FIG. 3 may further omit parts, components, circuit paths, etc., in the real-time O-RAN FHA/GUI 150 not directly germane to examples of the present disclosure, as would be understood by one of ordinary skill in the art. For instance, a circuit path for a low latency/non-intrusive packet flow through the real-time O-RAN FHA/GUI 150 which may by-pass most of the components in the real-time O-RAN FHA/GUI 150 by more or less directly linking the inputs and outputs, is not shown in FIG. 3.

In FIG. 3, the O-RAN FH link 130 may be between an O-DU 120 and an O-RU 140. A real-time O-RAN Fronthaul Analyzer and Graphical User Interface (FHA/GUI) 150 may include a hardware component (HW) 300 and a software component (SW) 400. As would be understood by one of ordinary skill in the art, while called the software component, the O-RAN FHA SW 400 may include hardware on which the software would run, and the term "the O-RAN FHA SW 400" may be used to distinguish those parts of the real-time O-RAN FHA/GUI 150 whose relevant components (e.g., those components for testing, analyzing, and measurements, as well as generating content for, and interpreting commands from, a user I/O interface) exist in the form of software/firmware/hardware i.e., the O-RAN FHA SW 400 may be differentiated from those parts of the real-time O-RAN FHA/GUI 150 whose relevant components (e.g., those components for testing, analyzing, and measurements, as well as generating content for, and interpreting commands from, a user I/O interface) exist in the form of hardware/firmware, i.e., the O-RAN FHA HW 300.

In some examples, the O-RAN FHA HW 300 may include a hardware accelerator. As used herein, a "hardware accelerator" may be any group of programmable logic blocks with reconfigurable interconnects, such as, e.g., a Programmable Logic Device (PLD) and/or Programmable Read-Only Memory (PROM), and may include an Application-Specific Integrated Circuit (ASIC), a programmable gate array, a Field Programmable Gate Array (FPGA), and/or Configurable Logic Blocks (CLBs) with Lookup Tables (LUTs), Reconfigurable Acceleration Devices (RADs), and may have one or more soft processor cores, one or more hard processor cores, one or more general purpose Advanced Reduced Instruction Set Computer (RISC) Machine (ARM) core processors, one or more vector processors, one or more memories, one or more inputs and/or outputs, one or more memory controllers, one or more Networks-on-Chip (NoCs) to provide a pervasive system-wide network, one or more network controllers, one or more network interfaces, and/or one or more transceivers, as would be understood by one of ordinary skill in the art. In some examples, the hardware accelerator may include an FPGA and associated peripherals, such as, e.g., one or more Double Data Rate (DDR) memories, one or more clocks, one or more Phase-Locked Loops (PLLs), etc., as would be understood by one of ordinary skill in the art.

An overview of the traffic flow through the O-RAN FHA HW 300 in FIG. 3 is presented below. In some examples, the packet traffic flow on the O-RAN FH link 130 may include Ethernet packets of varying configurations such as, e.g., 10 Gb, 25 Gb, and 100 Gb.

As shown in FIG. 3, the packet flow traffic from O-DU 120 and O-RU 140 may enter O-RAN FHA HW 300 by inputs 305. In some examples, each of the inputs 305 may include, for example, a Quad Small Form-factor Pluggable (QSFP) transceiver/interface port, such as an Ethernet subsystem/interface component. The O-DU packet flow and the O-RU packet flow from the inputs 305 then are forwarded to Medium Access Controller (MAC) receivers 307, which timestamp all of the packets in the incoming flows using the timing clock signal (shown by the dotted line) from a Counter 360. The timing clock signal from the Counter 360 may set a system-wide standard time by which the O-RAN FHA HW 300 may perform analysis, in hardware, of the packet traffic flow in real time (examples of which are described in greater detail below) and the O-RAN FHA SW 400 may perform analysis of the packet traffic flow and generate continuous real-time output representing data concerning the O-RAN FH link 130. As used herein, the phrase "maintain a clock" may refer to selecting and/or generating a reference timing signal for system-wide use on the hardware accelerator.

The Counter 360 may maintain a clock using, for example, incoming S-Plane PTP packets from a PTP master at the O-DU 120 (routed to the Counter 360 by the Parser 320, discussed further below), one or more External Clock(s) 365, and/or a stable internal oscillator which may keep time within a billionth of a second deviation (i.e., nanosecond timing resolution). In some examples, the stable internal oscillator may include a Voltage-Controlled Oscillator (VCO). Under some conditions, including, e.g., when the packet traffic flow on the O-RAN FH link 130 is on-time and not congested, the Counter 360 may use the PTP timing information in the incoming S-Plane PTP packets. Under some conditions, including, e.g., when the packet traffic flow on the O-RAN FH link 130 is delayed (which may be caused by congestion) or when the timing received via the incoming S-Plane PTP packets is otherwise degraded, the Counter 360 may switch to External Clock(s) 365 and/or a highly accurate internal timing oscillator. For further details, see also, e.g., ITU G.8260, G.8261, G.8262, G.8264, G.8271, G.8272, G.8273, and G.8275; and 3GPP TS 36.141, TS 36.213, TS 38.133, TS 38.211, and TS 38.323.

In some examples, the Counter 360 may include a hardware module which may receive and parse in-coming PTP packets in order to synchronize the Counter 360. In some examples, such a hardware module may include an ARM core processor embedded in the O-RAN FHA HW 300. In some examples, such a hardware module may include a processor from the x86 family, a PowerPC (PPC) processor, and/or an Intel multicore processor. The External Clock(s) 365 may be any suitable reference time source, as would be understood by one of ordinary skill in the art. In some examples, the External Clock(s) 365 may provide one or more Global Navigation Satellite System (GNSS) timing signals, such as, e.g., a Global Positioning System (GPS) timing signal. In some examples, the External Clock(s) 365 may provide both a one pulse per second (1PPS) signal and a Time of Day (ToD) signal which may be used to synchronize the Counter 360. In some examples, the External Clock(s) 365 may include one or more external clock generation/synchronization subsystems and/or chips.

In some examples, the Counter 360 may include a ToD counter which may be initialized and incremented by an internal clock that has its frequency adjusted by at least one of the following inputs: the PTP packets received from/on the circuit path 320*t*; a 1PPS signal at 10 MHz from the External Clock(s) 365; and/or a 1PPS/TOD signal from the External Clock(s) 365. In some examples, the Counter 360 may be a register with a suitable number of bits to maintain a sufficient timing accuracy—for instance, 64 bits may be sufficient to maintain a timing accuracy within about one nanosecond. In some examples, the Counter 360 may be implemented as a hardware register with logic gates, clocked by an internal oscillator, and accessible by other components via a memory mapped address.

In some examples, the Counter 360 may include an auto-detect mechanism to select which timing signal source to use as a primary timing signal, e.g., the PTP packets (parsed and synchronized in hardware circuitry), one or more External Clock(s) timing signals (e.g., GPS signals, timing package/chip signals), and/or an internal timing signal generated by an on-board timing oscillator capable of nanosecond resolution. In some examples, the user may choose a primary timing source and/or select an auto-detect mechanism in order to synchronize the Counter 360. In some examples, the Counter 360 may combine two or more timing sources together to generate a primary timing signal. In some examples, the Counter 360 may recover synchronization for Synchronous Ethernet (SyncE) transparency. In some examples, the real-time O-RAN FHA/GUI 150 may provide bidirectional SyncE clock recovery, which may avoid any break/interrupt of the SyncE line frequency from, e.g., the O-DU 120 to the O-RU 140 (in network configuration LLS-C1), which may be beneficial when in either intrusive mode. In such examples, the real-time O-RAN FHA/GUI 150 may provide SyncE line transparency in each direction ("bidirectional SyncE clock transparency"), i.e., a recovered clock from inputs 305 to transmit clock of outputs 357 and vice-versa, which may be beneficial for both the non-intrusive and intrusive modes.

In typical telecommunication link analyzers, such low level timing synchronization and analysis per packet is performed mostly via software on one or more captured packets/frames of the packet traffic flow on the link (i.e., post-processing of captured traffic packets/frames in storage/memory). By contrast, the O-RAN FHA HW 300 according to examples of the present disclosure provides processing such as, e.g., low level timing synchronization and analysis on a per packet basis, in real-time (i.e., real-time-processing of tapped traffic packets/frames currently being transmitted/received on the O-RAN FH link 130). In examples according to the present disclosure, the O-RAN FHA HW 300 may perform continuous real-time low-level processing of the packet traffic flow on the O-RAN FH link 130, while the O-RAN FHA SW 400 may perform higher-level processing of data from the continuous real-time low-level processing by the O-RAN FHA HW 300 and may generate a GUI for presentation/representation in near-real-time of analyses, timing parameters (such as, e.g., transmission/reception windows), analytical timing measurements, conditions, tolerances, qualities (such as, e.g., Quality of Service (QoS) and/or Quality of Experience (QoE)), etc., which are being continuously and actively updated.

Returning to the packet traffic flow through the O-RAN FHA HW 300, an Arbiter 310 may combine the timestamped packets from each of the MAC receivers 307 into a single stream. In some examples, the resulting single stream has twice the data rate as the individual O-DU or O-RU packet flows. Combining the two flows at high speed in hardware into a single stream may be helpful at least because some of the timing parameters, measurements, and tolerances analyzed in the real-time O-RAN FHA/GUI 150 are based on the relative timings of packets from one flow with the packets of another. For instance, as shown in FIG. 2D described above, the timing of the C-Plane packet 220-UL which is transmitted on the downlink (from O-DU 120 to O-RU 140) must be closely coordinated with the timing of the U-Plane packet 230-UL which is transmitted on the uplink (from O-RU 140 to O-DU 120) according to the O-RAN standards. Accordingly, having both kinds of packets immediately accessible is advantageous when performing, for example, C/U-Plane timing analysis. In some examples, the Arbiter 310 may combine additional packet flows with the O-DU and O-RU packet flows.

The single stream of timestamped packets then enters the Parser 320 which may appropriately sort and route the packets by parsing the appropriate header information in each packet. In some examples, the sorting and routing may also be determined by user set criteria and/or parameters set by the type of analyses being performed in the real-time O-RAN FHA/GUI 150. As used herein, the term "routing criteria" may refer to any set of one or more conditions, parameters, and/or qualities of any packet and/or frame on the O-RAN FH link 130 (and thus, like in common usage, the term "criteria" as used herein may refer to either or both the singular and the plural, like the terms "agenda," "indicia," and "data").

As shown in FIG. 3, multiple circuit paths may lead out from the Parser 320 to other components on the O-RAN FHA HW 300, including, for example, a circuit path 320*a* to a Window Estimation hardware packet analyzer 330-A, a circuit path 320*b* to a Packet Capture hardware packet analyzer 330-B, a circuit path 320*c* to a HW/SW interface 390 with the O-RAN FHA SW 400, a circuit path 320*t* to the Counter 360, multiple unlabeled circuit paths (indicated by dashed lines) to other possible hardware packet analyzers and/or other components with other functionalities, a circuit path 320*z* to an Impairment Generation hardware packet analyzer 330-Z, and many other circuit paths not specifically shown in FIG. 3 to other possible components on the O-RAN FHA HW 300 not specifically shown here. For example, an up-down arrow between the Parser 320 and the Flow Tracker 370 indicates one or more circuit paths with communications going in both directions (as both control instructions and metadata, among other information, may flow between the Parser 320 and the Flow Tracker 370). The multiple circuit paths leading to and from the Parser 320 may carry, in addition to packets routed by the Parser 320 according to a routing criteria, control instructions (such as, e.g., action bits and/or action fields), data, metadata, and the like, some of which are described in greater detail below.

As used herein, "hardware packet analyzer" refers to any type of hardware component or module in/on the O-RAN FHA HW 300 that may process, analyze, measure, scan, quantify, estimate, evaluate, modify, and/or further parse any packet received by the real-time O-RAN FHA/GUI 150. In some examples, a hardware packet analyzer may include digital and/or analog circuitry (e.g., one or more transistors, logic gates, registers, memory devices, resistive elements, conductive elements, capacitive elements, and/or the like, as would be understood by one of ordinary skill in the art) and/or more complex discrete hardware components such as, e.g., a single- and/or multi-chip processor, a single- and/or multi-core processor, a digital signal processor (DSP), an application specific integrated circuit (ASIC), a field programmable gate array (FPGA), or other programmable logic device, discrete gate or transistor logic, other discrete hardware components, and/or any combination thereof suitable to perform any of the functions described herein, as would be understood by one of ordinary skill in the art.

In some examples, the Parser 320 may use metadata parsed from the headers of the incoming packets along with routing criteria in order to perform certain functions. For example, as described in detail below, if a C/U-Plane Timing Analysis is to be performed, the Parser 320 may, in accordance with the routing criteria, use the parsed metadata to identify the packets in the C/U-Plane, and then may route those identified C/U-Plane packets on the circuit path 320*a* to the Window Estimation hardware packet analyzer 330-A where C/U Timing Analysis may be performed. As another example, as described in detail below, if a Packet Capture operation is to be performed, the routing criteria may indicate what kind, type, and/or number of packets are to be captured, the Parser 320 may, in accordance with the routing criteria, use the parsed metadata to identify the packets to be captured, and then may route those identified packets on the circuit path 320*b* to the Packet Capture hardware packet analyzer 330-B. As another example, as described in detail above, the Counter 360 may use the incoming S-Plane PTP packets as part of maintaining the clock, thus the Parser 320 may, in accordance with the routing criteria for the timing functionality, use the parsed metadata to identify the S-Plane PTP packets, and then may route those identified S-Plane PTP packets on the circuit path 320*t* to the Counter 360. In such an example, the Counter 360 may include PTP processing software and a suitable servo (such as, e.g., the embedded ARM core processor discussed above). As yet another example, if the O-RAN FHA SW 400 is to perform a higher-level M-Plane analysis, the Parser 320 may, in accordance with the routing criteria for the higher-level M-Plane analysis, use the parsed metadata to identify the packets in the M-Plane, and then may route those identified M-Plane packets on the circuit path 320*c* to the HW/SW interface 390 for transmittal to the O-RAN FHA SW 400 for the higher-level M-Plane analysis.

In some examples, the Parser 320 parses specific header fields of the incoming packets for metadata and may use the resulting metadata to appropriately route individual packets and/or packet flows and/or supply the metadata to the Flow Tracker 370. In some examples, the Parser 320 may be implemented as a Programming Protocol-independent Packet Processor (P4), which is an open source, domain specific programming language for network devices, specifying how data plane devices (switches, routers, Network Interface Controllers (NICs), filters, etc.) process packets in hardware. In some examples, the Parser 320 may be designed directly using Hardware Description Language (HDL) and/or implemented using Node Processing Unit (NPU) type blocks/functions, Tensor Processing Units (TPUs), and/or any other suitable means, as would be understood by one of ordinary skill in the art. In some examples, P4 tables may be implemented using multiple memory mapped tables, such as, e.g., Content Addressable Memory (CAM), Direct CAM (DCAM), Binary CAM (BCAM or BiCAM), Ternary CAM (TCAM), Semi-Ternary CAM (STCAM) tables; block RAM (BRAM), ultra-RAM (URAM), and the like; as well as other hash tables with match fields, as would be understood by one of ordinary skill in the art.

In some examples, the Flow Tracker 370 may use the metadata from the Parser 320 to track whether each Ethernet frame is a new type of frame flow or a frame flow that has been received before. In some examples, the metadata parsed by the Parser 320 and/or used by the Flow Tracker 370 may include, for example, a source address, a destination address, a MAC address (including, e.g., an Ethernet MAC address, an IP address, etc.), a Virtual Local Area Network (VLAN) tag and ID, an EtherType, an eCPRI Message Type, an extended Antenna-Carrier identification (eAxC ID), data direction, source IP address, destination IP address, etc., as would be understood by one of ordinary skill in the art. The Flow Tracker 370 may maintain details and statistics for each flow-if there is a new flow, it may be entered and initialized for tracking by the Flow Tracker 370; if it is an existing flow, the statistics for that flow may be updated (for example, its frame and byte count may be incremented); and if it is determined an existing flow has ceased, that flow may be deleted/dropped from tracking by the Flow Tracker 370. Statistics maintained by the Flow Tracker 370 may include, for example, packet count, the total bytes of each flow, timestamps of corresponding packets, etc. The Flow Tracker 370 may allow the tracking of the complete information about each flow, such as, e.g., each individual C-Plane, U-Plane, S-Plane, and M-Plane packet flows on the O-RAN FH link 130. In some examples, the Flow Tracker 370 may be implemented as pipeline arrays and processor-less block RAM (BRAM). In some examples, the Parser 320 may parse packets per MAC layer and Layer 2 through Layer 4, as well as basic eCPRI/O-RAN headers, in order that the Flow Tracker 370 may maintain Layer 2 counters and statistics (aggregated per port), as well as flow discovery and tracking per connection. In some examples, components of the O-RAN FHA SW 400 may keep track of which flows are "live" or "active" by recording (and/or monitoring) the timestamp of the last time a flow was detected and/or reported by the Flow Tracker 370, and comparing the current time with the last recorded timestamp.

The O-RAN FHA SW 400 may periodically query and receive data to and from the Flow Tracker 370 via a HW/SW interface 390 for analysis, processing, and then presentation on a Browser/GUI 430. In some examples, the HW/SW interface 390 may include a Peripheral Component Interconnect Express (PCIe) Subsystem, and/or another suitable card/bus subsystem, as would be understood by one of ordinary skill in the art. In some examples, the Browser/GUI of the O-RAN FHA SW 400 may present a user with filtering or action selections (such as, e.g., capture, window analysis, real-time software (SW) analysis, etc.) for any user-selected flow. In such examples, when the user chooses a specific packet flow and a matching particular action for that packet flow, the O-RAN FHA SW 400 may enter a TCAM function in the Parser 320 with a rule (typically identifying a flow) and the action, which results in action bits indicating the appropriate routing and/or downstream processing for the packet flow. In such examples, this may be how the Parser 320 uses the metadata parsed from the incoming packets to appropriately route individual packets and/or packet flows. One or more hardware packet analyzers 330 perform such downstream processing.

Accordingly, the Parser 320 may route one or more packets and/or packet flows for downstream processing by the one or more hardware packet analyzers 330, which may perform, e.g., analyses, hardware processing, measurements, and/or the like on the particular received packets and/or packet flow(s). In the example of FIG. 3, three different hardware packet analyzers are shown: a Window Estimation hardware packet analyzer 330-A to analyze packet flows in terms of, e.g., transmission/reception windows, latency in general, early/late/on-time packets, etc., a Packet Capture hardware packet analyzer 330-B to capture and analyze packets based on user-set criteria, and an Impairment Generation hardware packet analyzer 330-Z to analyze and alter packets in terms of, e.g., latency, delay, and other impairments, etc.

For instance, a user may select the C/U-Plane Timing Analysis function using the O-RAN FHA SW 400, so that the O-RAN FHA SW 400 may configure the TCAM in the Parser 320 with the appropriate rule (i.e., select the C/U-Plane packet flows) and the matching action (i.e., (i) route the selected packet flow to the Window Estimation hardware packet analyzer 330-A; and (ii) direct the Window Estimation hardware packet analyzer 330-A to perform the appropriate hardware processing). In some examples, the selected flow may be accompanied by action bits or an action field (generated by the Parser 320), which serves as instructions/control information for the specific hardware packet analyzer; such action bits/field may be routed via separate control circuitry/pathways from the Parser 320 to each of the hardware packet analyzers 330 as well as other analytical/measuring/processing/etc. components on the O-RAN FHA HW 300.

In this example/instance, the action bits/field accompanying the C/U-Plane packet flows to the Window Estimation hardware packet analyzer 330-A may instruct the Window Estimation hardware packet analyzer 330-A to perform real-time packet analysis in hardware to directly measure/calculate/determine early/late/on-time packet arrival for at least one of the C/U-Plane transmission/reception windows. In some examples, the user may select threshold values for the C/U-Plane Timing Analysis using, for example, a pull-down menu, a touchscreen, or a keyboard of the Browser/GUI 430 of the O-RAN FHA SW 400, which will result in the O-RAN FHA SW 400 programming/instructing/controlling the O-RAN FHA HW 300 to use the entered threshold values as stored hardware register values to be machine matched, set, calculated from, and the results stored in other hardware registers. The O-RAN FHA SW 400 may query those hardware registers in the O-RAN FHA HW 300 based on an event (such as, e.g., user input) or periodically/on a set schedule, and display those values and/or further analyze/ process them for higher-level analysis or simpler visual graphical representation. In some examples, the O-RAN FHA SW 400 may set/control the O-RAN FHA HW 300 to continuously transmit the calculated values in real-time so that the Browser/GUI 430 of the O-RAN FHA SW 400 may present a visual display of those values and/or an intuitive graphical representation of the same information to the user in real-time.

In some examples, the Window Estimation hardware packet analyzer 330-A may perform monitoring of the C/U-Plane packets using CAM filtering rules provided by the Parser 320. Early, late, and on-time windows as specified in the O-RAN FH C/U/S-Plane standard may be calculated here and presented to the user via the O-RAN FHA SW 400. In some examples, C/U Timing Analysis may be performed via the Window Estimation hardware packet analyzer 330-A using the timing signal provided by the Counter 360.

As another instance, a user may select a Packet Capture function using the O-RAN FHA SW 400, so that the O-RAN FHA SW 400 may configure the TCAM in the Parser 320 with the appropriate rule (i.e., select the user-identified packets and/or packet flows) and the matching action (i.e., (i) route the selected packet flow to the Packet Capture hardware packet analyzer 330-B; and (ii) direct the Packet Capture hardware packet analyzer 330-B to store the packets and, in some examples, perform appropriate hardware processing). In such an example, the selected packets/packet flow(s) being routed by the Parser 320 to the Packet Capture hardware packet analyzer 330-B may be accompanied by action bits/field which instructs the Packet Capture hardware packet analyzer 330-B to capture the selected packets/packet flows and store them in, e.g., a Double Data Rate (DDR) buffer. In some examples, the Packet Capture hardware packet analyzer 330-B, following instructions indicated by the action bits/field, may implement a line rate dual port capture by making use of separate (or integrated) DDR components and/or Dual In-line Memory Modules (DIMMs) to store the packets/packet flows based on some criteria. For example, a separate capture buffer may be implemented for each direction, i.e., the UL and the DL, or for each plane, e.g., the C-Plane and the U-Plane; or by matching C-Plane packets to the U-Plane packets they pertain to; or by some other criteria, which criteria may be set by a user, or by the O-RAN FHA SW 400 for higher-level analysis and reporting/monitoring, etc. In some examples, the Packet Capture hardware packet analyzer 330-B may support dual port 100-Gbps line rate capture.

In these examples involving the Packet Capture hardware packet analyzer 330-B, the timestamp put on the individual packets upon entering the O-RAN FHA HW 300 by the MAC receivers 307 may play a crucial role in analysis by, for example, providing a "real-time" check separate from the time(s) already stored in the packet headers by the sender. In some examples, these O-RAN FHA HW 300-generated timestamps may be saved as corresponding metadata for each captured packet. When requested, these timestamps along with the other metadata and, in some examples, the captured packets themselves may be provided by the Packet Capture hardware packet analyzer 330-B to the O-RAN FHA SW 400 for higher-level analysis and processing. In some examples, the action bits/field may also indicate a trigger threshold for the buffer storage, which may, e.g., inform the O-RAN FHA SW 400 or its user of the event, or automatically purge the buffer and send its contents to the O-RAN FHA SW 400 for higher-level analysis and processing. The timestamped packets from the capture buffer may then be used by the O-RAN FHA SW 400 for, e.g., offline decode functionalities. In some examples, C/U/S/M-Plane packet flows may be captured in Double Data Rate Synchronous Dynamic Random Access Memory (DDR-SDRAM) embedded in the Packet Capture hardware packet analyzer 330-B.

In typical telecommunication link analyzers, such low level timing synchronization and analysis per packet as the Window Estimation and Packet Capture functions described above are performed mostly via software on one or more captured packets/frames (stored in hardware) of the packet traffic flow on the link (i.e., post-processing of captured traffic packets/frames in storage/memory). By contrast, the O-RAN FHA HW 300 according to examples of the present disclosure provides processing such as, e.g., Window Estimation, C/U Timing Analysis, in real-time by hardware (i.e., real-time-processing of tapped traffic packets/frames from the O-RAN FH link 130). In examples according to the present disclosure, the O-RAN FHA HW 300 may perform continuous real-time low-level processing of the packet traffic flow on the O-RAN FH link 130, while the O-RAN FHA SW 400 may perform higher-level processing of data from the continuous real-time low-level processing by the O-RAN FHA HW 300 and may generate a GUI for presentation/representation in near-real-time of analyses, timing parameters (such as, e.g., transmission/reception windows), analytical timing measurements, conditions, tolerances, qualities (such as, e.g., Quality of Service (QOS) and/or Quality of Experience (QoE)), etc., which are being continuously and actively updated.

As indicated by the three dots in between the hardware packet analyzers 330 of FIG. 3, there may be any number of hardware packet analyzers 330 in the O-RAN FHA HW 300, which may perform a wide variety of functions, analyses, and/or measurements, including, but not limited to, other measurements and testing specified in the O-RAN FH C/U/S-Plane standard, the O-RAN FH M-Plane standard, and/or the O-RAN FHA IoT standard. For example, according to examples of the present disclosure, one or more of hardware packet analyzers 330 in the O-RAN FHA HW 300 may perform functions and/or the lower-level processing involved in functions such as, e.g., I/Q Transmission Analysis, M-Plane Analysis, S-Plane Analysis, M-Plane Client Analysis (which may involve measurements and timing analysis of the Network Configuration Protocol (NET-CONF)), and C/U-Plane Physical Resource Block (PRB) Utilization Analysis, some of which are described in greater detail below. In examples according to the present disclosure, the O-RAN FHA SW 400 may provide control and user input of these low-level functions, and the O-RAN FHA HW 300 may provide higher-level processing and presentation/representation of the data from the continuous real-time low-level processing.

As another instance, a user may select specific packets/packet flows of interest for generating impairments using the O-RAN FHA SW 400, so that the O-RAN FHA SW 400 may configure the TCAM in the Parser 320 with the appropriate rule (i.e., select the user-identified packets and/or packet flows) and the matching action (i.e., (i) route the selected packet flow to the Impairment Generation hardware packet analyzer 330-Z; and (ii) direct the Impairment Generation hardware packet analyzer 330-Z to apply one or more impairments on the received packets, in some examples, different impairments depending on other conditions, and forward the impaired packet so that they re-enter the live, real-time packet traffic flow on the O-RAN FH link 130). In such an example, the selected packets/packet flow(s) being routed by the Parser 320 to the Impairment Generation hardware packet analyzer 330-Z may be accompanied by action bits/field which instructs the Impairment Generation hardware packet analyzer 330-Z to delay (i.e., Packet Delay Variation-PDV) or even drop the packet/packet flow entirely.

In some examples, the Impairment Generation hardware packet analyzer 330-Z, following instructions indicated by the action bits/field, may establish a specific delay, delay range/window, or jitter, for the selected packets/flow(s). In some examples, the Impairment Generation hardware packet analyzer 330-Z, following instructions indicated by the action bits/field, may generate header field errors in packets of the selected packets/flow(s). It is considered that, in some examples, the Impairment Generation hardware packet analyzer 330-Z, following instructions indicated by the action bits/field, may generate low level spoofing and/or security hazards in packets of the selected packets/flow(s) in order to test the security of the system. In these examples involving the Impairment Generation hardware packet analyzer 330-Z, the timestamp put on the individual packets upon entering the O-RAN FHA HW 300 by the MAC receivers 307 may play a role in, for example, generating the appropriately synchronized and timed impairments, or providing a "real-time" check separate from the time(s) already stored in the packet headers by the sender. Although generated and used in the O-RAN FHA HW 300, the O-RAN FHA SW 400 in examples according to the present disclosure may make extensive use of these timestamps when performing higher-level processing and presentation/representation of the data generated by the continuous real-time low-level processing by the O-RAN FHA HW 300.

As mentioned above, and in some examples, only the packets/packet flow(s) output from the Impairment Generation hardware packet analyzer 330-Z actually "flows through" the O-RAN FHA HW 300 to re-enter the packet traffic flow on the O-RAN FH link 130, as indicated by the line connecting the output of the Impairment Generation hardware packet analyzer 330-Z to a De-Arbiter 340. The De-Arbiter 340 takes the single stream of packets/flow(s) from the Impairment Generation hardware packet analyzer 330-Z and splits the packets/flow(s) into respective target paths based on, e.g., action bits/field provided by either the Impairment Generation hardware packet analyzer 330-Z or the Parser 320, and/or the original metadata of the packet upon entering the O-RAN FHA HW 300. This information mainly includes port information, indicating whether the packet was received by the O-RAN FHA HW 300 by inputs/MACs 305/307 as either transmissions on the O-RAN FH link 130 from the O-DU 120 or transmissions on the O-RAN FH link 130 from the O-RU 140. If the packet was received from the O-DU 120, it may be forwarded on to be transmitted to O-RU 140; if the packet was received from the O-RU 140, it may be forwarded on to be transmitted to O-DU 120.

The packets, which are to re-enter the O-RAN FH link 130, may be sent to Fixed Delays 350, which may compensate for the delay introduced by the individual packets going through the various data paths and circuitry of the O-RAN FHA HW 300. In some examples, the Fixed Delays 350 may assist in ensuring that S-Plane PTP packets and C/U timing packets are not subject to Packet Delay Variation (PDV) or delay asymmetry in either direction. The various circuit paths of differing lengths and complexity through which the various packets may go through, may cause delay, which may vary from build to build of the O-RAN FHA HW 300. Accordingly, in some examples, for each build of the O-RAN FHA HW 300, the worst case delays for each data path are determined, and the Fixed Delays 350 may be set such that all packets exiting the O-RAN FHA HW 300 may have the same delay, which may be easily compensated for by whichever unit, whether an O-DU or an O-RU, on the O-RAN FH link 130 receives the packets. In some examples, the real-time O-RAN FHA/GUI 150 ensures substantially all packets which flow through the real-time O-RAN FHA/GUI 150 may experience a similar fixed delay, which may be implemented by Fixed Delays 350, in order to minimize time error for both the intrusive and non-intrusive modes. In some examples, the real-time O-RAN FHA/GUI 150 may provide bidirectional SyncE clock recovery, which may avoid any break/interrupt of the SyncE line frequency from, e.g., the O-DU 120 to the O-RU 140 (in network configuration LLS-C1), which may be beneficial when in either intrusive mode. In such examples, the real-time O-RAN FHA/GUI 150 may provide SyncE clock transparency in each direction ("bidirectional SyncE clock transparency"), i.e., a recovered clock from inputs 305 to a transmit clock of outputs 357 and vice-versa, which may be beneficial for both the non-intrusive and intrusive modes.

The packet flow traffic exits Fixed Delays 350 and may enter MAC transmitters 355 before exiting the O-RAN FHA HW 300 and re-entering the packet traffic flow on the O-RAN FH link 130 via outputs 357. In some examples, the general purpose of the MAC transmitters 355 may be to ensure that frames going back onto the O-RAN FH link 130 may have the proper format to meet the IEEE 802.3 standard (with, e.g., a Frame Check Sequence (FCS)/Cyclic Redundancy Check (CRC), a proper interface gap, Physical Coding Sublayer (PCS)/Physical Layer encoding, etc.). In some examples, the MAC transmitters 355 may receive a timing signal from the Counter 360 which may be used to adjust the PTP correction field in S-Plane packets when the real-time O-RAN FHA/GUI 150 may include a PTP boundary clock (i.e., a Telecom Boundary Clock (T-BC) and/or Telecom Transparent Clock (T-TC) function). In some examples, the MAC transmitters 355 may use the timing signal when the real-time O-RAN FHA/GUI 150 may be emulating S-Plane impairments.

In some examples, the MAC receivers 307 may timestamp incoming packets with an accuracy of about 20-30 ns. In some examples, an accuracy of about +/−100 ns may be maintained in the intrusive mode for the packets flowing thru the real-time O-RAN FHA/GUI 150 with some fixed delay of about 2-15 microseconds depending on the line rate. In some examples, the parsing/processing of received frames may be roughly a few hundred nanoseconds after the first bit/symbol is received at the inputs 305. In some examples, processing in "real-time" may be understood as processing every received frame in the real-time O-RAN FHA/GUI 150 and performing some real-time operation on each frame (such as, e.g., parsing, defining/identifying a packet flow, and/or counting or performing some other function on a per frame or per frame payload basis).

In various examples of the present disclosure, the packet flows from one, some, or all of the hardware packet analyzers 330 may or may not be forwarded onward in the real-time O-RAN FHA/GUI 150, i.e., the packets exiting from one, some, or all of the hardware packet analyzers 330 may or may not enter the next three modules, e.g., the De-Arbiter 340, one of Fixed Delays 350, and one of MAC transmitters 355, before exiting to the O-RAN FH link 130 via outputs 357. In some examples of the real-time O-RAN FHA/GUI 150 in the intrusive mode, all packet flows from the hardware packet analyzers 330 (and/or any traffic routed elsewhere by the Parser 320) would continue to the De- Arbiter 340, which separates the incoming packets into appropriate traffic flows for the O-DU 10 and O-RU 20, in a manner complementary and opposite to the combining process performed by the Arbiter 310. In other examples of the intrusive mode, packet flows exiting from only some or one hardware packet analyzer 330 would be forwarded to the De-Arbiter 340 as part of the process of being re-introduced to the traffic flow on the FH link. For instance, in the example shown in FIG. 3, only the packet flow from the Impairment Generation hardware packet analyzer 330-Z continues onto the De-Arbiter 340 and other modules to be re-introduced into the traffic flow on the O-RAN FH link 130.

In examples like FIG. 3, where less than all of the incoming packet flows may be, after analysis by the O-RAN FHA HW 300, output to rejoin the packet traffic flow on the O-RAN FH link 130, or when in non-intrusive mode, only copies of the O-RAN FH link packet traffic flow may actually enter the real-time O-RAN FHA/GUI 150 in real-time. In such examples, a splitter may be used so a replica of the packet traffic flow on the O-RAN FH link 130 enters the real-time O-RAN FHA/GUI 150 for analysis in real-time. In examples specifically like FIG. 3, where only the Impairment Generation hardware packet analyzer 330-Z generates packet traffic which will re-enter the traffic flow on the O-RAN FH link 130, the real-time O-RAN FHA/GUI 150 may route all other packet traffic around the components in the O-RAN FHA HW 300 directly to the exiting modules. In some examples, the O-RAN FHA HW 300 may support a low latency Layer 1flow-thru mode and/or a low-time-error Layer 2 intrusive mode. As described in detail above, after all, some, or none of the packet traffic from one or more of the hardware packet analyzers 330 may be separated into two streams by De-Arbiter 340, one containing O-DU traffic and the other containing O-RU traffic, the two streams may be modified by Fixed Delays 350, which may synchronize the packets appropriately with the other traffic on the O-RAN FH link 130, transmitted by MAC transmitters 355, and exit through outputs 357 to re-enter the packet traffic flow of the O-RAN FH link 130.

In some examples, the O-RAN FHA HW 300 may include a capture component to capture and hold entire frames being transmitted on the O-RAN FH link 130 for further study/analysis by O-RAN FHA SW 400. In some examples, an Ethernet Frame Capture module 380 may receive one or more whole Ethernet Frames from the O-DU 120 and/or the O-RU 140 on the O-RAN FH link 130 (via one or more wire connections from inputs 305 not shown in FIG. 3) and store these one or more whole Ethernet Frames for low-level analysis in the O-RAN FHA HW 300 and/or high-level analysis in the O-RAN FHA SW 400.

It may be observed from the description herein that the O-RAN FHA/GUI 150 and in particular the O-RAN FHA HW 300 according to examples of the present disclosure may include one or more of the following functions:

Physical layer/QSFP interfaces, supporting dual port 10/25/100G Ethernet monitors and in-line flow-thru mode, with recovered clock for SyncE transparency.

Ethernet MAC layer functions, including Layer 2 Link counters/stats (aggregate per port)

Packet parsing covering Layer 2 thru 4, and basic eCPRI/O-RAN headers.

Flow discovery/tracking in hardware with per connection statistics (flow types include all valid C/U/S/M frames)—which may be used for Explorer style GUI in the O-RAN FHA SW 400

Flexible flow filtering to direct specific flows to analysis blocks in hardware (with possible software-controlled parameters for the filtering in the O-RAN FHA SW 400)

Analysis blocks may include:
Hardware C/U Timing/Window Analysis (on downlink and uplink U-plane/C-plane frames)
Hardware Packet Capture, supporting dual port 100G line rate capture.
Real-time software analysis (by the O-RAN FHA SW 400 receiving data via HW/SW interface 390)
Hardware O-RAN Fronthaul PTP and ESMC frames.

O-RAN standard and I/Q Tx/Rx analysis

Timestamp counter with nanosecond resolution and possible inputs from external timing modules Frame insertion/removal (including, e.g., real-time software frame insertion/removal by the O-RAN FHA SW 400 for intrusive thru M-plane peering).

Support for low latency flow-thru mode (Layer 1) and low-time-error intrusive mode (Layer 2)

O-RAN Impairment block(s)

As shown in FIG. 3, O-RAN FHA SW 400 may include an HW/SW interface 390 with the O-RAN FHA HW 300 through which the two parts of the real-time O-RAN FHA/GUI 150 communicate and exchange control, management, and other forms of data. As mentioned above, the HW/SW interface 390 may include a Peripheral Component Interconnect Express (PCIe) Subsystem, but may also include any of a wide variety of communication connections, such as, e.g., a suitable Network Interface Controller or Card (NIC) or any appropriate physical network/device interface, as would be understood by one of ordinary skill in the art. As also shown in FIG. 3, the O-RAN FHA SW 400 may include a Storage 402, a Capture/Decode 401, a Service layer 410, a Micro Front End (MFE) layer 420 and a Browser/Graphical User Interface (GUI) 430, which are described in greater detail below with reference to FIG. 4.

Figure 4:
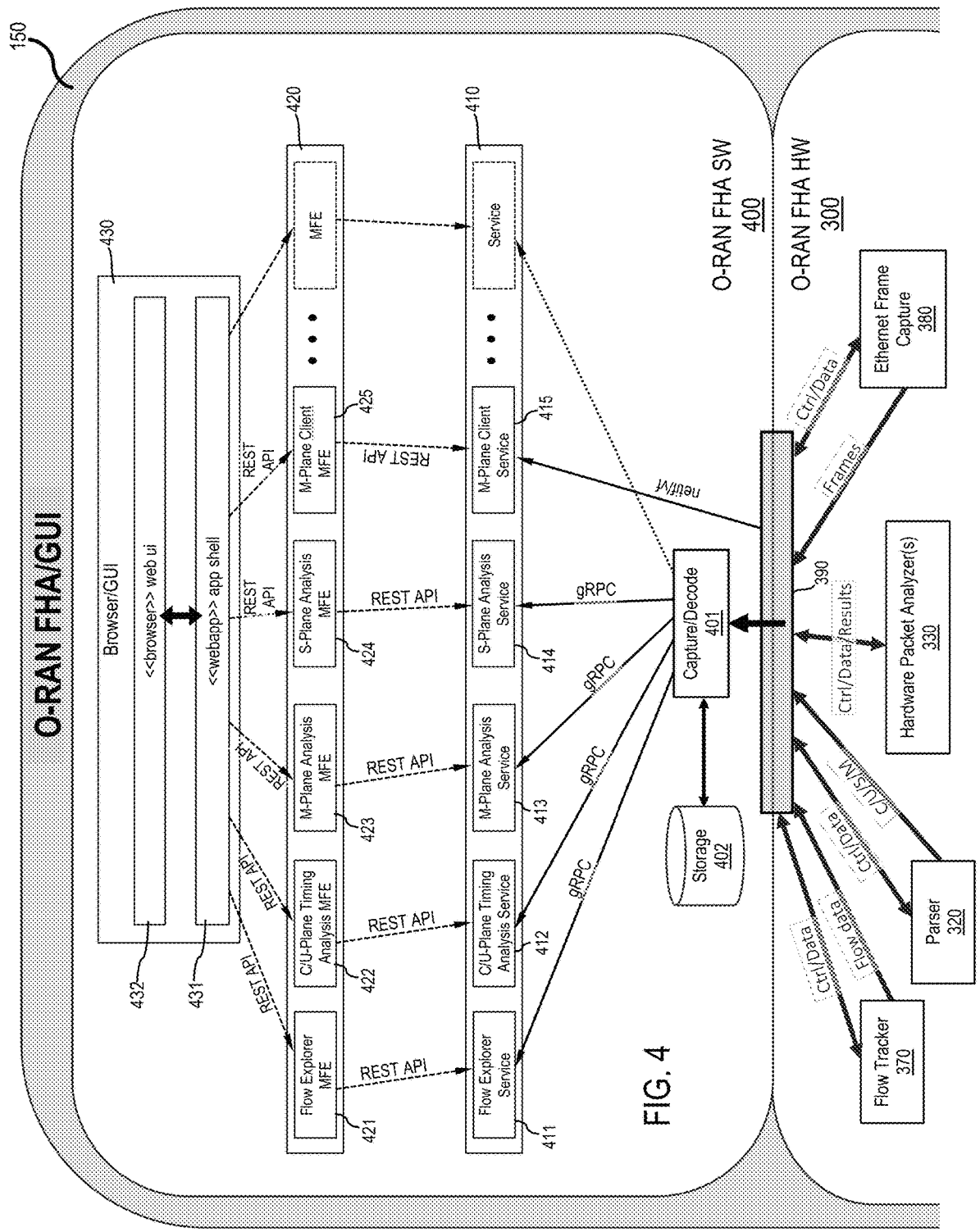
FIG. 4 is a block diagram illustrating components of an O-RAN FHA software (SW) in a real-time O-RAN FHA/GUI, according to an example.

FIG. 4 is a block diagram illustrating components of the O-RAN FHA SW 400 in the real-time O-RAN FHA/GUI 150 in greater detail, according to an example. As mentioned above and shown by the arrows at the bottom of FIG. 4, some of the components in the O-RAN FHA HW 300 which may communicate with the O-RAN FHA SW 400 through HW/SW interface 390 include, but are not limited to, the Flow Tracker 370, which may receive control signals representing user commands, instructions, and other parameters from the O-RAN FHA SW 400 and may provide data concerning packet traffic flow; the Parser 320, which may receive control signals representing user commands, instructions, and other parameters from the O-RAN FHA SW 400 and may provide packets from the packet traffic flow (as shown by arrow labelled "C/U/S/M" which may represent one or more circuit paths from the Parser 320); one or more of the hardware packet analyzers 330, which may receive control/instructions/data/parameters from the O-RAN FHA SW 400 (in addition to, instead of, and/or supplementing control signals—"action bits"—and instructions from the Parser 320) and may transmit measurements/notes/low-level hardware analyses to the O-RAN FHA SW 400; and the Ethernet Frame Capture module 380, which may receive data and control signals representing user commands, instructions, and other parameters from the O-RAN FHA SW 400 and may provide one or more Ethernet frames from the packet traffic flow (as shown by arrow labelled "Frames") to the O-RAN FHA SW 400 for higher-level analyses. Also, as discussed above, the Parser 320 may deliver specific packets and packet flows to the O-RAN FHA SW 400 for higher level I/Q and O-RAN analysis, such as, e.g., PTP, Ethernet Synchronization Messaging Channel (ESMC), M-Plane packets, as well as certain C/U-Plane packet flows.

As shown in FIG. 4, the Capture/Decode 401 receives the raw information from the O-RAN FHA HW 300 and forwards individual parts of it to the appropriate service modules in the Service layer 410 and/or onto Storage 402. Storage 402 may store, for example, captured packet flow(s) captured using the pcap Application Programming Interface (API). Capture/Decode 401 may pass parameters between the O-RAN FHA SW 400 and the O-RAN FHA HW 300 via the HW/SW interface 390 using a Remote Procedure Call (RPC) framework, such as, e.g., gRPC. In some examples, the O-RAN FHA SW 400 may use remote procedure calls to both send control information, parameters, and commands through Capture/Decode 401 and HW/SW interface 390 to components in the O-RAN FHA HW 300 and to obtain data, information, and measurements from components in the O-RAN FHA HW 300. In some examples, services in the Service layer 410 may communicate directly through the HW/SW interface 390 with the O-RAN FHA HW 300, as shown by the arrow labelled "netif/vf" in FIG. 4, which may be network interface message.

In some examples, the O-RAN FHA SW 400 may use remote procedure calls to provide information and data, such as, for example, metadata of the C/U-Plane packets and/or the C/U-Plane packets themselves, from the O-RAN FHA HW 300 through Capture/Decode 401 to the services (shown as the boxes) in a Service layer 410. The Service layer 410 may include such services as, for example, a Flow Explorer Service 411, a C/U-Plane Timing Analysis Service 412, an M-Plane Analysis Service 413, an S-Plane Analysis Service 414, and/or an M-Plane Client Service 415. In some examples, additional services may also be provided, as indicated by the three dots in FIG. 4, and/or some of the listed services may not be employed. The MFE layer 420 may include multiple MFE web components (shown as the boxes), which may communicate with the services in Service layer 410 via Representational State Transfer (REST) APIs. The MFE layer 420 may include such MFEs as, for example, a Flow Explorer MFE 421, a C/U-Plane Timing Analysis MFE 422, an M-Plane Analysis MFE 423, an S-Plane Analysis MFE 424, and/or an M-Plane Client MFE 425. In some examples, additional MFEs may also be provided, as indicated by the three dots in FIG. 4, and/or some of the listed MFEs may not be employed.

As shown in FIG. 4, the one or more MFEs in MFE layer 420 may communicate with Browser/GUI 430 to, for example, present information, graphics, and other data to a user. In some examples, visual representations of such information, graphics, and other data may be in the form of a file renderable by a browser or other GUI, such as, e.g., a web page renderable by a web browser. In some examples, REST APIs may be employed for such communications between the Browser/GUI 430 and the MFE layer 420. In some examples, an application 431 (labelled "<<webapp→app shell" in FIG. 4) may perform these communications with the Service layer 410 via REST APIs, and provide the results for further processing by an application 432 (labelled "<<browser→web ui" in FIG. 4). By using the data collected from the O-RAN FHA HW 300, the services in the Service layer 410 and the MFEs in the MFE layer 420 provide frontend services to be displayed on Browser/GUI 430, such as, e.g., a Flow Explorer functionality/application, a C/U-Plane Timing Analysis functionality/application, an M-Plane Analysis functionality/application, an S-Plane Analysis functionality/application, and an M-Plane Client functionality/application (examples of some of which are described in greater detail below). In some examples, the O-RAN FHA SW 400 may provide real-time frame insertion/removal functionality for, e.g., intrusive thru M-Plane peering.

Although shown as a single entity in FIGS. 3 and 4, the O-RAN FHA SW 400 according to examples of the present disclosure may be operationally separable into multiple components. In some examples, the Browser/GUI 430, or higher-level portions of the Browser/GUI 430, may be operated on a remote computer connected by a network to the remaining components of the O-RAN FHA/GUI 150. In some examples, portions or all of the Browser/GUI 430 may be implemented as a program on a laptop computer connected to the Internet, where the remaining components of the O-RAN FHA/GUI 150 are also connected to the Internet. In such examples, the remaining components of the O-RAN FHA/GUI 150 may have an IP address and be accessed remotely by the laptop computer.

The O-RAN FHA SW 400 may be implemented in and/or by any number of processors and non-transitory computer-readable storage media storing instructions executable by the processor(s) which may be separate from the hardware accelerator which may comprise the O-RAN FHA HW 300. The processor(s) implementing the O-RAN FHA SW 400 may include multiple processing units executing instructions in parallel. The non-transitory computer-readable storage medium/media implementing the O-RAN FHA SW 400 may be any memory, such as a hard disk drive, a removable memory, or a solid-state drive (e.g., flash memory or dynamic random access memory (DRAM)). In some examples, one or more processors in the O-RAN FHA SW 400 may perform one or more functions; in some examples, one or more non-transitory computer-readable storage media in the O-RAN FHA SW 400 may store instructions that, when executed by the one or more processors, cause the one or more processors to perform any of the functions described herein. In some examples, functions such as those described herein in reference to the O-RAN FHA SW 400 may be performed by one or more processors wired/wirelessly connected to the O-RAN FHA HW 300.

In some examples, the O-RAN FHA SW 400 may be implemented by a rack server, such as, for example, a Dell™ PowerEdge Rack Server (e.g., a R7515 server), containing one or more processors, such as, for example, an Advanced Micro Devices (AMD™) EPYC 700×/900× series server processor, with from 8 GB to 2 TB of DDR4 Registered DIMM (RDIMM) and/or Load-Reduced DIMM (LRDIMM) having a bandwidth up to 3200 MegaTransfers per second (MT/s), and 100 GB-1 TB Solid State Drive (SSD) memory. As would be understood by one of ordinary skill in the art, this is only one specific configuration of a wide variety of possible configurations suitable for implementing the O-RAN FHA SW 400.

In some examples, the real-time O-RAN FHA/GUI 150 may identify all packet flows on the O-RAN FH link 130, and may display different metrics (including bandwidth) associated with each flow. In some examples, the real-time O-RAN FHA/GUI 150 may identify a packet type (such as e.g., eCPRI, M-Plane, S-Plane, etc.) and the O-DU(s) and O-RU(s) terminating each flow. In examples with such a real-time O-RAN FHA/GUI 150, a user may visualize information regarding the communications on the O-RAN FH link 130. In such examples, the Browser/GUI 430 may provide the user with a visual representation of the C/U-Plane communications on the O-RAN FH link 130, including all packets/flows distinguished by a unique enhanced Antenna Carrier identification (eAxC Id), and their associated bandwidth and packet counts. This information may help the user validate operability/interoperability of the O-RAN FH link 130, such as, for example, that the O-RAN FH link 130 may support a sufficient number of flows for user equipment to communicate with the O-DUs 120 (and thereby connect to the core network). Without the ability of the O-RAN FH link 130 to support a sufficient number of flows, a consumer/user of the UE 160 may not be able to call someone, establish a broadband session (e.g., web browsing), achieve sufficient QoS, or—even if a broadband session is possible-receive an adequate QoE.

In examples with such a real-time O-RAN FHA/GUI 150, the Browser/GUI 430 may provide the user with a visual representation of the S-Plane activity on the O-RAN FH link 130. In such examples, a user may be able to determine if the O-DU(s) and O-RU(s) are connected to a valid Telecom Grand Master (T-GM), and are thus synchronized to a time source traceable to a GNSS such as GPS. Without such synchronization, multiple failures are possible, including, for example, interference and/or the inability to transmit any signals to UEs. In examples with such a real-time O-RAN FHA/GUI 150, the Browser/GUI 430 may provide the user with a visual representation of the M-Plane activity on the O-RAN FH link 130. In such examples, a user may be able to determine if the O-DU(s) and O-RU(s) have established one or more valid M-Plane sessions, without which the O-DU(s) and O-RU(s) may not be able to interoperate and/or be able to establish any sessions in the C/U/S-Planes.

Figure 5:
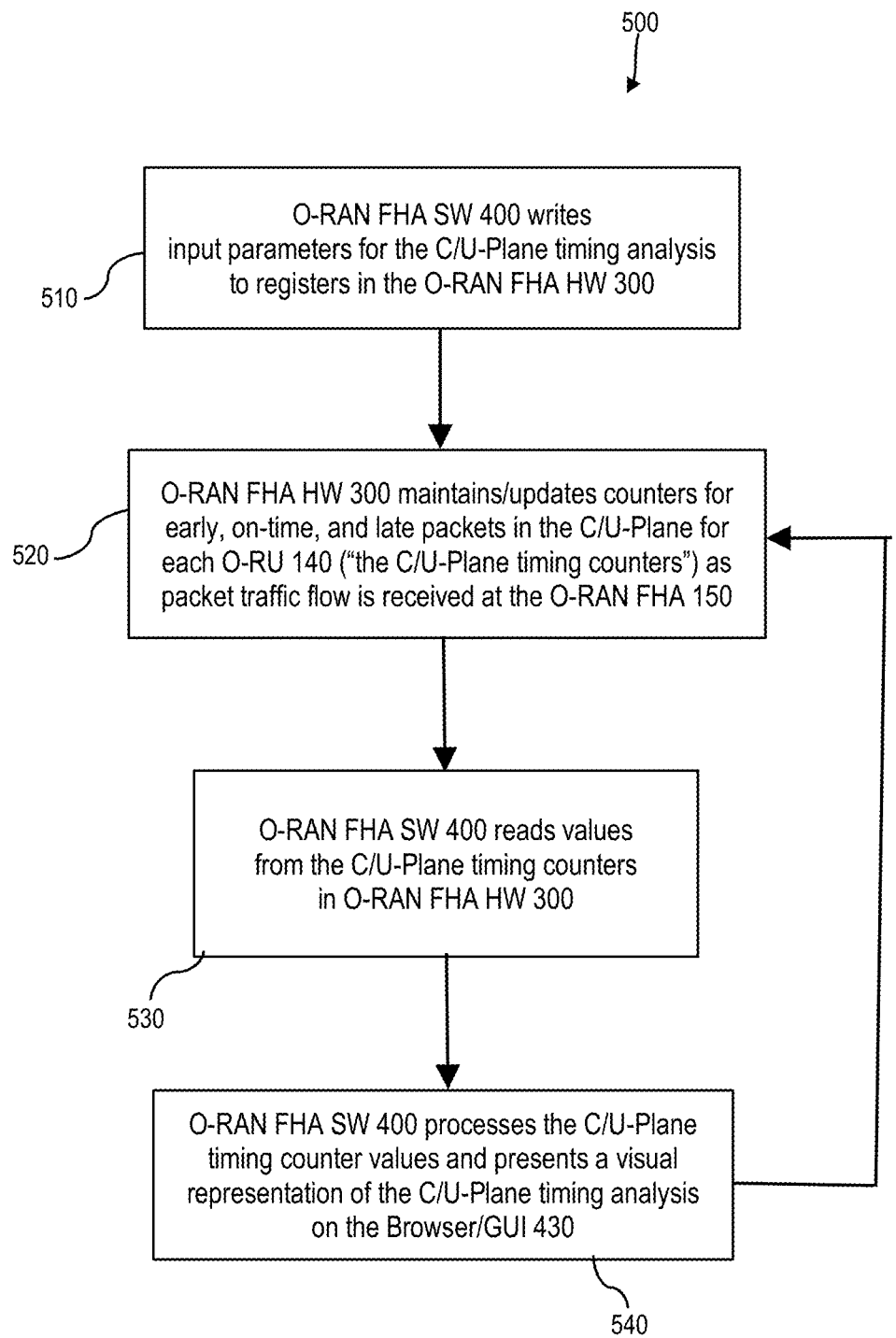
FIG. 5 is a flowchart of a method for analyzing C-Plane and U-Plane packet flow traffic on an O-RAN FH link by a real-time O-RAN FHA/GUI, according to an example.

FIG. 5 illustrates a flowchart of a method for performing C/U-Plane timing analysis on the O-RAN FH link 130 with the O-RAN FHA/GUI 150 according to an example. A method 500 shown in FIG. 5 is provided by way of example and may only be one part of an entire process, as would be understood by one of ordinary skill in the art. The method 500 may further omit parts of any process, procedure, ongoing operation, method, etc., involved in the O-RAN FH link 130 analysis not germane to examples of the present disclosure, as would be understood by one of ordinary skill in the art. Each block shown in FIG. 5 may further represent one or more steps, processes, methods, or subroutines, as would be understood by one of ordinary skill in the art. In some examples, the processes in the blocks of FIG. 5 may overlap and/or may occur substantially simultaneously. For the sake of convenience and ease of explanation, the blocks in FIG. 5 may refer to the components shown in the other figures described herein; however, the method 500 is not limited in any way to the components, apparatuses, and/or constructions described and/or shown in any of the other figures herein.

At block 510, the O-RAN FHA SW 400 may write input parameters for the C/U-Plane timing analysis to registers in the O-RAN FHA HW 300. In some examples, the O-RAN FHA SW 400 may provide input parameters to the Parser 320, such as, e.g., control information for selecting and routing C/U-Plane packets to the Window Estimation hardware packet analyzer 330-A. In some examples, the O-RAN FHA SW 400 may provide input parameters to the Window Estimation hardware packet analyzer 330-A, such as, e.g., control information for establishing and maintaining counters concerning the timing, resource allocation, etc., of individual packet flows in the C/U-Plane. In some examples, the O-RAN FHA SW 400 may provide input parameters to the Flow Tracker 370, such as, e.g., control information for establishing and maintaining counters concerning the timing, resource allocation, etc., of individual packet flows in the C/U-Plane. In some examples, a user may provide user input indicating any of the aforementioned input parameters. In some examples, other input parameters may be provided to the same or other components on the real-time O-RAN FHA HW 300 (which may include an FPGA).

At block 520, the O-RAN FHA HW 300 may maintain/update counters for early, on-time, and late packets in the C/U-Plane on both the uplink and the downlink for each O-RU 140 ("the C/U-Plane timing counters") as packet traffic flow is being received at the real-time O-RAN FHA/GUI 150. In some examples, the C/U-Plane timing counters may be maintained/implemented at the Flow Tracker 370, the Window Estimation hardware packet analyzer 330-A, and/or elsewhere on the O-RAN FHA HW 300.

At block 530, the O-RAN FHA SW 400 may read values from the C/U-Plane timing counters in O-RAN FHA HW 300. In some examples, the C/U-Plane Timing Analysis Service 412 may send a gRPC through the Capture/Decode 401 and the HW/SW interface 390 to retrieve such values from the C/U-Plane timing counters which may be maintained/implemented at the Flow Tracker 370, the Window Estimation hardware packet analyzer 330-A, and/or elsewhere on the O-RAN FHA HW 300. In some examples, block 530 may be performed periodically or continuously while block 520 is being performed.

At block 540, the O-RAN FHA SW 400 may perform higher-level processing on the values from the C/U-Plane timing counters in O-RAN FHA HW 300 and may present a visual representation of the C/U-Plane timing analysis on the Browser/GUI 430 of the real-time O-RAN FHA/GUI 150. In some examples, the Browser/GUI 430 may use REST API to query, access, and/or generate appropriate data for a visual presentation from the C/U-Plane Timing Analysis MFE 422 and the C/U-Plane Timing Analysis Service 412. In some examples, block 540 may be performed periodically or continuously while blocks 520 and 530 are being performed. In some examples, the presented visual presentation may include, for one or more of each O-RU and/or O-DU, e.g., the current reception bandwidth, the current transmission bandwidth, the transmission bandwidth usage, the reception bandwidth usage, and/or current analytical measurements of the early, late, and/or on-time downlink U-Plane packets, the early, late, and/or on-time uplink U-Plane packets, and/or the early, late, and/or on-time uplink C-Plane packets.

As indicated above and by the arrow from block 540 back to block 520 in FIG. 5, blocks 520, 530, and 540 may be continuously performed roughly/approximately simultaneously. In some examples, blocks 520 and 530 may be continuously performed roughly/approximately simultaneously in real-time by components in the O-RAN FHA HW 300, while the O-RAN FHA SW 400 continuously performs block 540 roughly/approximately in near-real-time, using data generated by the O-RAN FHA HW 300 in blocks 520 and 530. Accordingly, a user of the real-time O-RAN FHA/GUI 150 according to examples of the present disclosure may use the visual representation of the C/U-Plane packet flows from block 540 of FIG. 5 to validate operability/interoperability of the O-RAN FH link 130. As discussed above, in some examples, the visual representation may include, for each packet flow, its eAxC Id, bandwidth, and packet counts, such that, for example, the visual representation may help the user validate the operability/interoperability of the O-RAN FH link 130, its O-DUs 120, and its O-RUs 140. In such examples, the visual representation may help the user determine if the O-RAN FH link 130 may support a sufficient number of flows for user equipment to communicate with the O-DUs 120 (and thereby connect to the core network).

In some examples, the interface 155 of the real-time O-RAN FHA/GUI 150 may be placed/connected at various locations on the O-RAN FH link 130 to perform particular analyses, measurements, etc. In such examples, the location of the interface 155 may be one of the input parameters for determining the analytical timing measurements. Other input parameters, which may be entered by a user and/or automatically determined by the real-time O-RAN FHA/GUI 150 itself, may also include, for example, the MAC addresses of the O-RUs 140 (which may be, e.g., Ethernet MAC addresses), the total and/or per-flow bandwidth, the SubCarrier Spacing (SCS) value/numerology, the a (alpha) and B (beta) offsets (see, e.g., Sect. 11.7 and Table 11.7.2-1 of the O-RAN FH C/U/S-Plane standard), the timing parameters listed in Tables 1 and 2, etc., as would be understood by one of ordinary skill in the art.

In an example where the interface 155 is connected at the O-DU 120 end of the O-RAN FH link 130 (i.e., similarly located as R1 and R4 in FIG. 2B), the real-time O-RAN FHA/GUI 150 may observe C/U-Plane packet transmission windows, parameters, and tolerances, as listed in Table 3:

TABLE 3

| O-RAN FHA/GUI C/U-Plane Timing Analysis Parameters | |
|---|---|
| Parameter | Value/Limit |
| C-Plane UL TX Window | T1a_max_cp_ul--T1a_min_cp_ul |
| C-Plane DL TX Window | T1a_max_cp_dl--T1a_min_cp_dl |
| U-Plane DL TX Window | T1a_max_up--T1a_min_up |
| Boundary of Start of C-Plane UL TX Window | T1a_min_cp_ul ≥ (T2a_min_cp_ul + T12_max) |
| Boundaries of Start of C-Plane DL TX Window | T1a_max_cp_dl ≤ (T2a_max_cp_dl + T12_min) T1a_max_cp_dl ≥ (T1a_max_up + Tcp_adv_dl) |
| Boundaries of End of C-Plane DL TX Window | T1a_min_cp_dl ≥ (T2a_min_cp_dl + T12_max) T1a_min_cp_dl = (T1a_min_up + Tcp_adv_dl) |
| Boundary of Start of U-Plane DL TX Window | T1a_max_up ≤ (T2a_max_up + T12_min) |
| Boundary of Start of U-Plane DL TX Window | T1a_min_up ≥ (T2a_min_up + T12_max) |

In an example where the interface 155 is connected at the O-RU 140 end of the O-RAN FH link 130 (i.e., similarly placed as R2 and R3 in FIG. 2B), the real-time O-RAN FHA/GUI 150 may observe C/U-Plane packet transmission windows, parameters, and tolerances, as listed in Table 4:

TABLE 4

| O-RAN FHA/GUI C/U-Plane Timing Analysis Parameters | |
|---|---|
| Parameter | Value/Limit |
| C-Plane DL RX Window | T2a_max_cp_dl – T2a_min_cp_dl |
| U-Plane DL RX Window | T2a_max_up – T2a_min_up |
| C-Plane UL TX Window | Ta3_max – Ta3_min |

TABLE 4-continued

| O-RAN FHA/GUI C/U-Plane Timing Analysis Parameters | |
|---|---|
| Parameter | Value/Limit |
| Boundary of Start of C-Plane DL RX Window | T2a_max_cp_dl ≥ (T2a_max_up + Tcp_adv_dl) |
| Boundary of End of C-Plane DL RX Window | T2a_min_cp_dl = (T2a_min_up + Tcp_adv_dl) |

Figure 6:
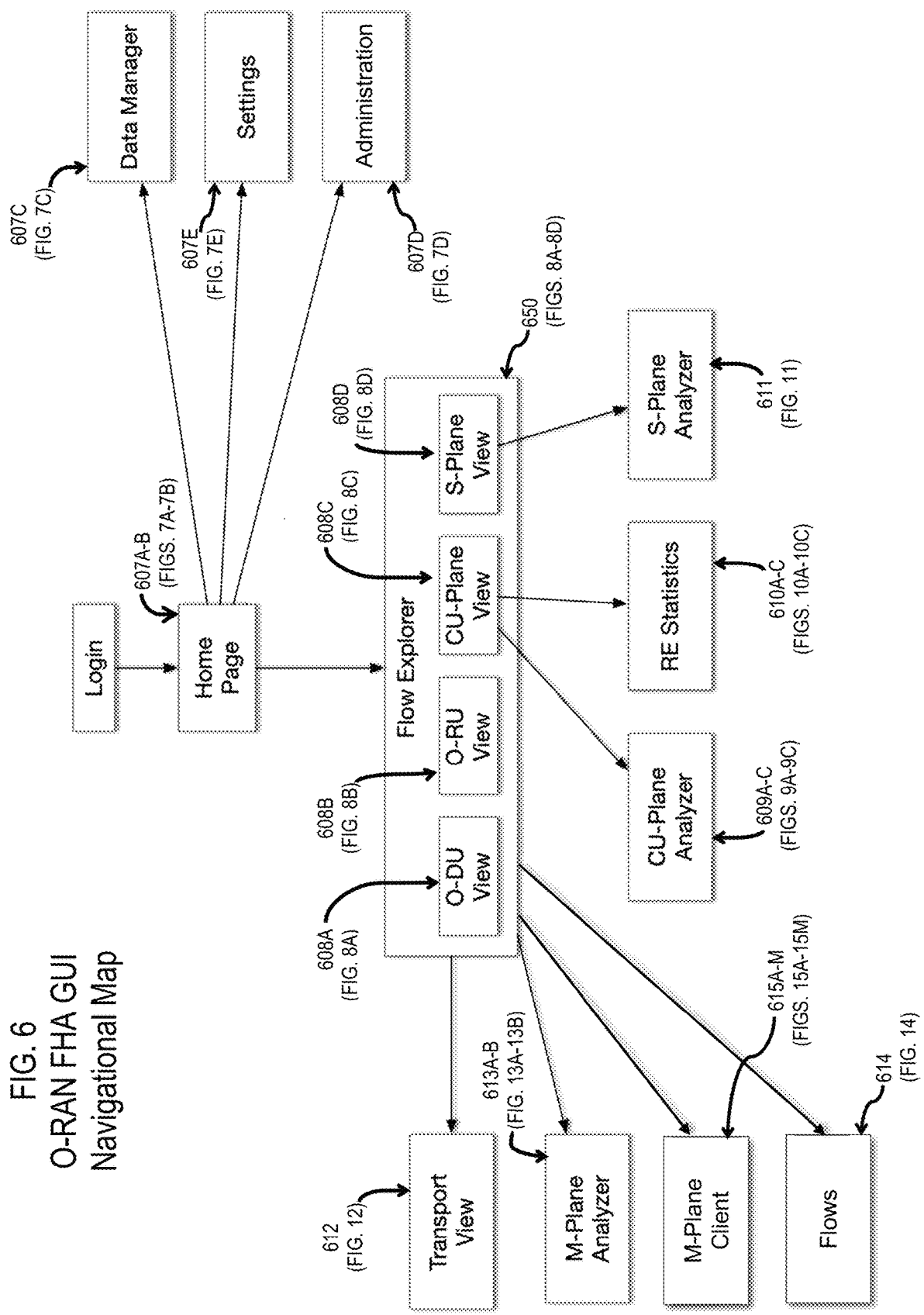
FIG. 6 is a navigational map of visual representations which may be presented on a Browser/GUI of functionalities/applications provided by an O-RAN FHA SW using data and/or low-level analysis generated by an O-RAN FHA HW of a real-time O-RAN FHA/GUI, according to examples.

FIG. 6 is a navigational map of visual representations which may be presented on the Browser/GUI 430 of functionalities/applications provided by the O-RAN FHA SW 400 using data and/or low-level analysis generated by the O-RAN FHA HW 300 of the real-time O-RAN FHA/GUI 150, according to examples. As shown on FIG. 6, each box represents one or more visual representations, which may take the form of web pages rendered in the Browser/GUI 430, and the operational connections between these visual representations. Hereinafter, depending on the context, the terms "view," "visual representation," and "GUI" may be used somewhat interchangeably, although the term "visual representation" may be understood in its broadest possible interpretation, including any type of visual presentation perceivable by human eyesight, whether on screen, by projector, and/or other instrumentality. In some examples, the visual representation may be a web page, e.g., a hypertext file renderable by a web browser, which may or may not be available over the Internet. As shown in FIG. 6, a user may first log in, using the Browser/GUI 430, in order to access the functionalities/applications provided by the O-RAN FHA SW 400. As discussed above, in some examples, the user may use a remote computer to login over a network to the real-time O-RAN FHA/GUI 150.

In FIG. 6, each box is labelled by both a reference numeral and the one or more figures among FIGS. 7A-14 in which an example of the named visual representation is presented. For example, the Home Page is labelled 607AB (FIGS. 7A-7B) and has arrows to three boxes: the Data Manager view 607C (FIG. 7C), the Settings view 607E (FIG. 7E), and the Administration view 607D (FIG. 7D), indicating that those three views are accessible from the Home Page by some form of user input, such as, e.g., selecting a tab or other icon with a cursor. The Home Page 607AB (FIGS. 7A-7B) also has an arrow to the Flow Explorer GUI 650, in which may be found boxes labelled O-DU View 608A (FIG. 8A), O-RU View 608B (FIG. 8B), CU-Plane View 608C (FIG. 8C), and S-Plane View 608D (FIG. 8D), which are the four webpages included in the Flow Explorer GUI according to this example. In a similar manner, boxes within the Flow Explorer GUI 650 have arrows to other boxes: the CU-Plane View 608C (FIG. 8C) has two arrows, one to CU-Plane Analyzer 609A-C(FIGS. 9A-9C), the other to RE Statistics 610A-C(FIGS. 10A-10C); and the S-Plane View 608D (FIG. 8D) has an arrow to S-Plane Analyzer 611 (FIG. 11; referred to below as "the S-Plane Analysis GUI 611"). More generally, the Flow Explorer GUI 650 has arrows to Transport View 612 (FIG. 12), M-Plane Analyzer 613A-B (FIGS. 13A-13B), M-Plane Client functionality/application 615A-Z (FIGS. 15A-15Z), and Flows 614 (FIG. 14; referred to below as "the Flow GUI 614"). It should be appreciated that some of the screenshots are only partial views, as may be seen when an information box, graphic, or other visual item is cut off at the bottom of the drawing: this is the result of each screenshot being limited to what may be displayed on a particular screen at one time, which is not a limitation on the examples of the present disclosure. As would be understood by one of ordinary skill in the art, "cut off" information (i.e., below the bottom of the partial drawings) would be accessible by scrolling further down while on that particular page.

The navigational map in FIG. 6 of visual representations which may be presented on the Browser/GUI 430 of functionalities/applications provided by the O-RAN FHA SW 400 using data and/or low-level analysis generated by the O-RAN FHA HW 300 of the real-time O-RAN FHA/GUI 150, is provided by way of example and may only be one part of an entire selection of visual representations of functionalities/applications, as would be understood by one of ordinary skill in the art. FIG. 6 may omit many other possible visual representations of functionalities/applications, processes, procedures, ongoing operations, methods, etc., involved in the Browser/GUI 430 of functionalities/applications provided by the O-RAN FHA SW 400, as would be understood by one of ordinary skill in the art. In other examples, the blocks/boxes (and corresponding functionalities/applications) in FIG. 6 may be further sub-divided into multiple web pages, or combined together into one or more larger web pages, as would be understood by one of ordinary skill in the art. For the sake of convenience and ease of explanation, the descriptions of FIGS. 7A-14 below may refer to the components shown in the other figures described herein; however, the Browser/GUI 430 of functionalities/applications provided by examples of the O-RAN FHA SW 400 is not necessarily limited in any way to the components, apparatuses, and/or constructions described and/or shown in any of the other figures herein.

FIG. 6 and the associated screens, views, and GUIs shown in FIGS. 7A-15M are examples, and examples of the present disclosure are not necessarily limited to the visual presentations presented therein. In some examples, the presented visual presentation may include, for one or more of any entity involved in the O-RAN FH link 130 (such as, O-DU 120, O-RU 140, etc.), any one of one or more of the current analytical measurements such as, for example, the current reception bandwidth, the current transmission bandwidth, the transmission bandwidth usage, the reception bandwidth usage, and/or current analytical measurements concerning the early, late, and/or on-time downlink U-Plane packets, the early, late, and/or on-time uplink U-Plane packets, the early, late, and/or on-time uplink C-Plane packets, and/or any other timing parameters concerning any other packet type. In some examples, the presented visual representation may be generated by the O-RAN FHA SW 400 using, at least in part, received data from the O-RAN FHA HW 300 (e.g., the Flow Tracker 370 and/or any of the hardware packet analyzers 330).

Figure 7A:
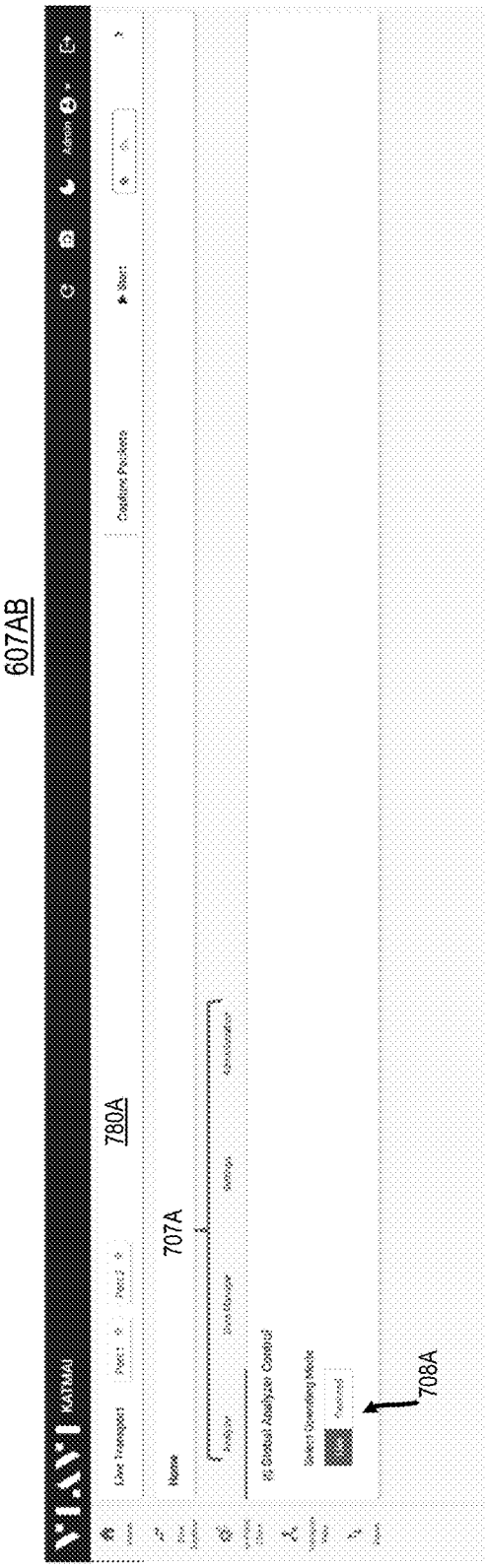
FIGS. 7A-7E are screenshots of visual representations illustrating a Home page and related Data Manager, Settings, and Administration views of a Browser/GUI of an O-RAN FHA SW in a real-time O-RAN FHA/GUI, according to an example.
Figure 7B:
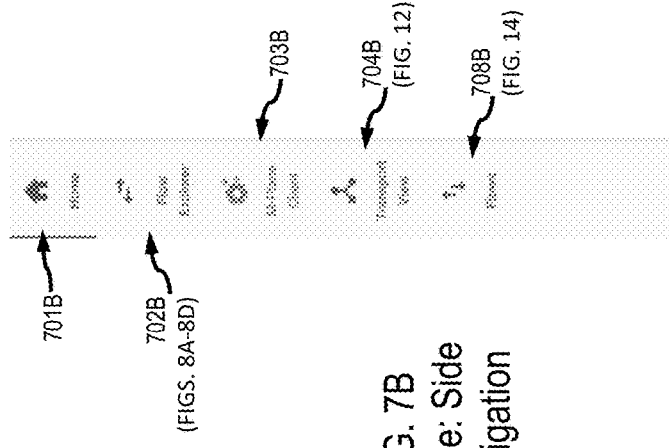
Figure 7C:
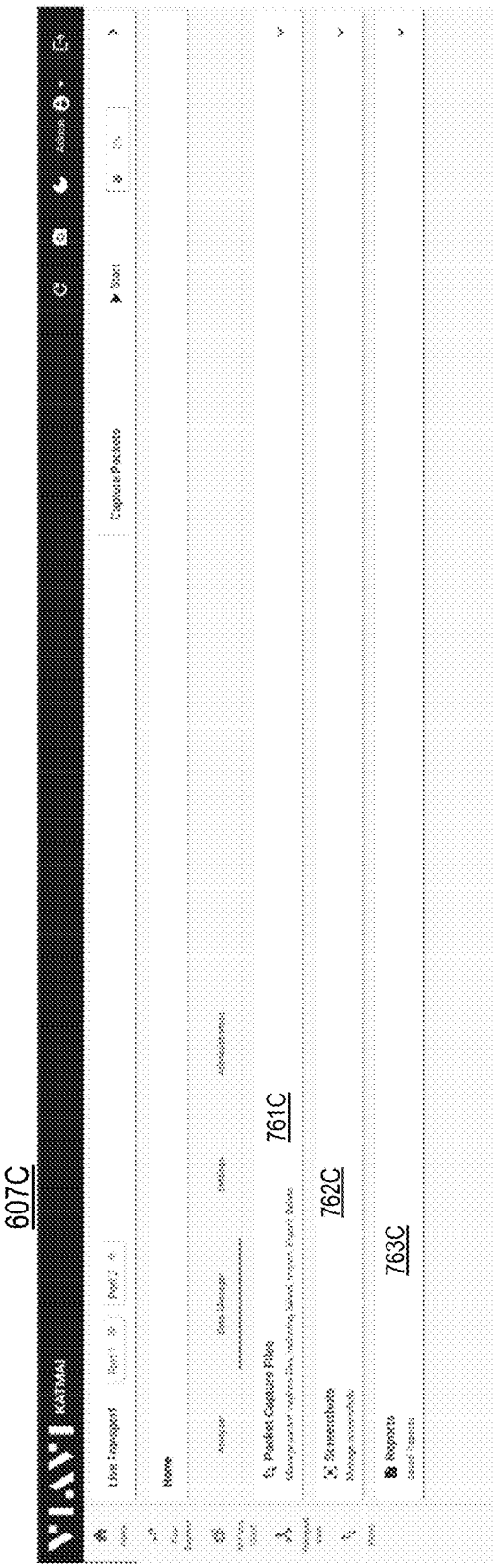
Figure 7E:
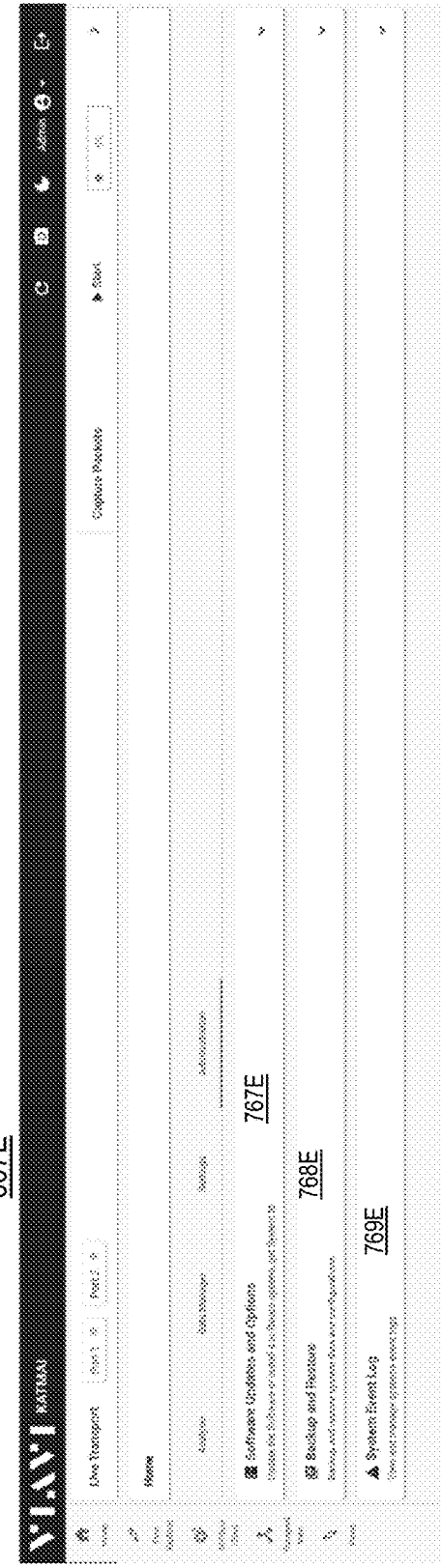
Figure 7D:
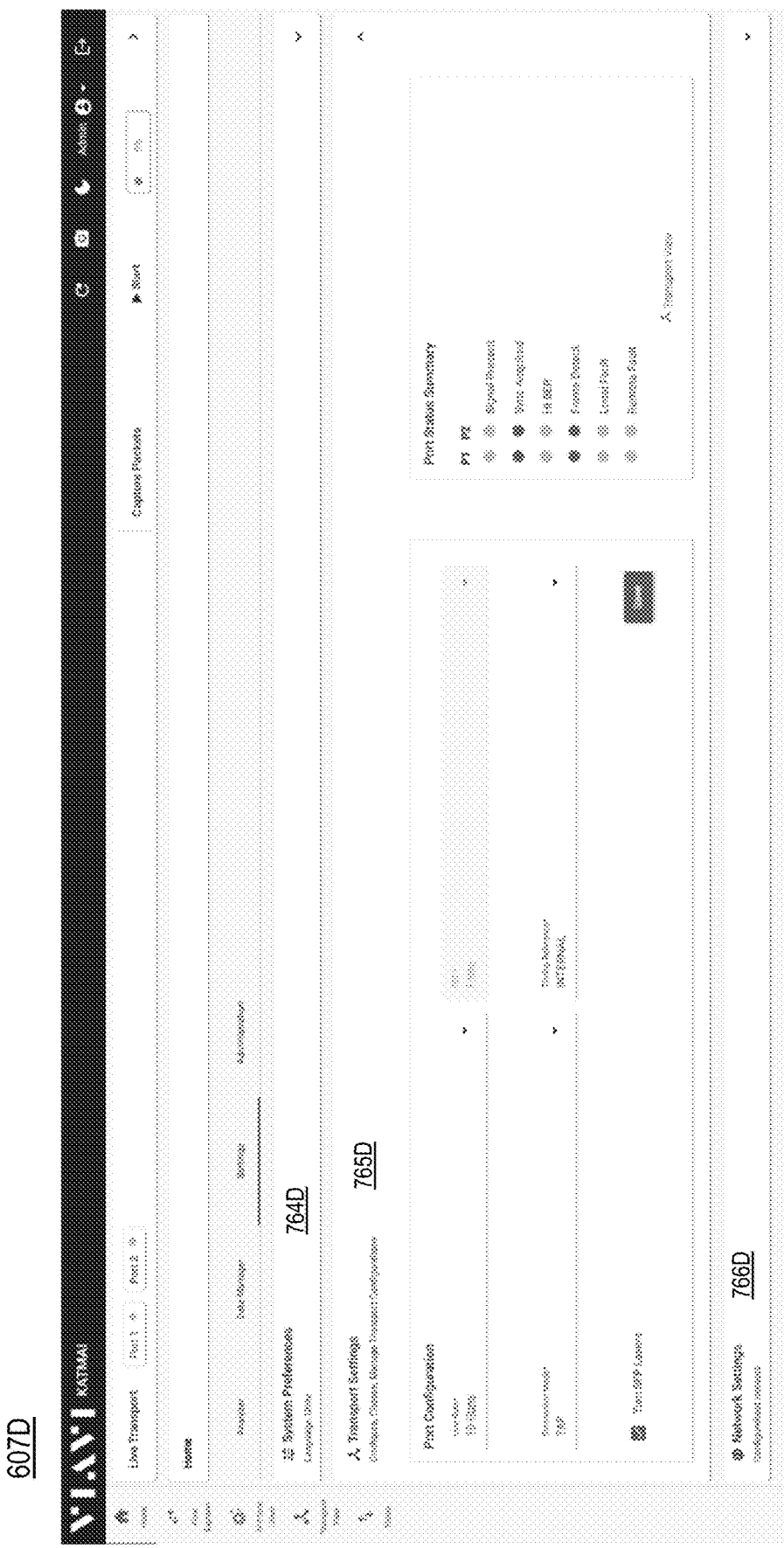

FIGS. 7A-7E are screenshots of visual representations illustrating a Home page 607AB (FIGS. 7A-7B) and the related Data Manager view 607C (FIG. 7C), the Settings view 607E (FIG. 7E), and the Administration view 607D (FIG. 7D) of a Browser/GUI 430 of the O-RAN FHA SW 400 in a real-time O-RAN FHA/GUI 150, according to an example. As shown in FIG. 7A, the Home Page 607AB may include a side navigation bar, which is further blown up in size in FIG. 6B, which may allow a user to select various icons representing some general functionalities/applications of the O-RAN FHA SW 400, including, but not limited to, the Home icon 701B, the Flow Explorer icon 702B, the M-Plane Client icon 703B, the Transport View icon 704B, and the Flows icon 708B. In some examples, this side navigation bar may appear on every web page. The top of the Home Page 607AB may include a Live Transport block 780A, which is discussed in further detail below in reference to FIG. 8A, and a selection of tabs 707A, which may include an Analyzer tab (which is presently selected, and thus being shown in FIG. 7A), the Data Manager tab (whose contents are shown in FIG. 7C), the Settings tab (whose contents are shown in FIG. 7E), and the Administration tab (whose contents are shown in FIG. 7D). In the Analyzer tab view of FIG. 7A, a user may select an operating mode, either Live or Capture, using button 708A, thereby putting the real-time O-RAN FHA/GUI 150 in either the real-time, live mode of analyzing packets, or the capture mode, respectively.

As shown in FIG. 7C, when the Data Manager tab is selected, a screen or a Data Manager view 607C may provide three boxes for displaying further options in particular categories, which may include, e.g., a Packet Capture Files category 761C which may present a user with various changeable variables for capturing packet files, a Screenshots category 762C which may present a user with various options for managing screenshots, and a Reports category 763C which may present a user with various options for managing reports. Similarly, in FIG. 7E, when the Administration tab is selected, screen or an Administration view 607E may provide three boxes for displaying further options in particular categories, which may include, e.g., a Software Updates and Options category 767E, a Backup and Restore category 768E, and a System Event Log category 769E.

Also similarly, in FIG. 7D, when the Settings tab is selected, a screen or a Settings view 607D provides three boxes for displaying further options in particular categories, which may include, e.g., a System Preferences category 764D which may present a user with various changeable system preferences (such as, e.g., language), a Transport Settings category 765D, which may present a user with various options for managing the port configurations with the O-RAN FH link 130, and a Network Settings category 766D which may present a user with various options for configuring the network. As shown in FIG. 7D, the Transport Settings category 765D is selected, and thus some Port Configuration setting options are displayed, namely, the line rate (set at 10 Gbps), Connection mode (set to TAP, indicating the real-time O-RAN FHA/GUI 150 is connected using an optical splitter in a non-intrusive mode), and the Timing Reference (set to Internal, indicating the internal clock of the Counter 360 in the O-RAN FHA HW 300 is set as the timing reference clock, e.g., used for timestamps and C/U-Plane Timing Analysis). In examples where the real-time O-RAN FHA/GUI 150 is connected via an optical splitter in non-intrusive mode, the real-time O-RAN FHA/GUI 150 may not actively transmit any signals onto, or otherwise actively interact with, the O-RAN FH link 130; however, there may be some optical power loss due to the connected optical splitter, thereby reducing the overall optical power level at the O-RU 140 and the O-DU 120.

Figure 8A:
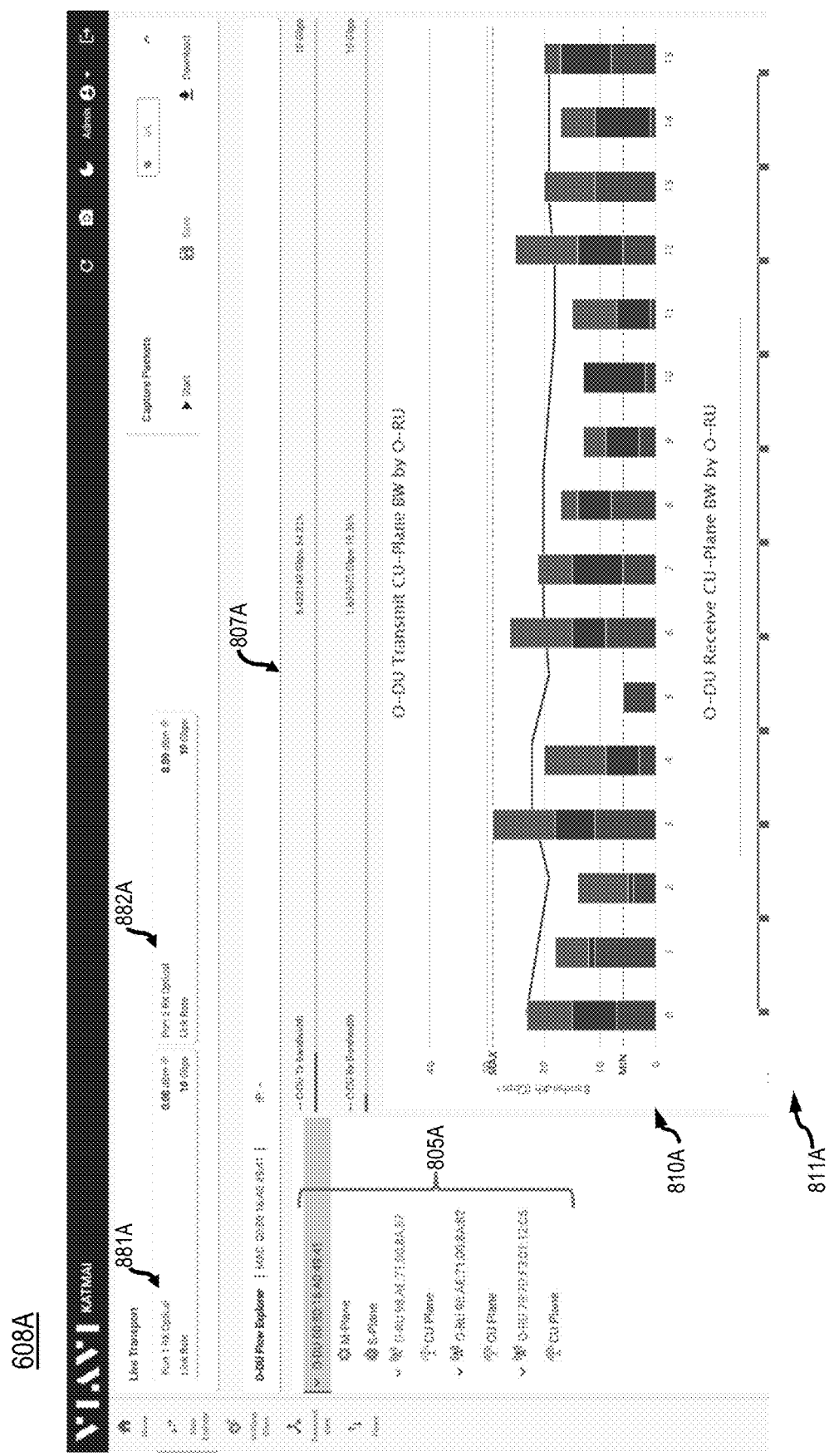
FIGS. 8A-8D are screenshots of visual representations on a GUI illustrating various views of a Flow Explorer functionality/application of an O-RAN FHA SW in a real-time O-RAN FHA/GUI, according to an example.

FIG. 8A is a screenshot of a visual representation on the Browser/GUI 430 illustrating a O-DU view 608A of the Flow Explorer GUI 650 of the O-RAN FHA SW 400 according to an example. At the top of FIG. 8A, as appears on the top of many of the GUI views, boxes 881A and 882A show the optical power and link rate of ports 1 and 2, respectively, of the Small Form Factor Pluggable (SFP) transceiver that links the real-time O-RAN FHA/GUI 150 with the Ethernet traffic on the O-RAN FH link 130 (one port for the O-DU 120, the other for the O-RU 140). On the side of FIG. 8A, a side menu 805A shows different categories for a particular selected O-DU, identified by its Ethernet MAC address (00:80:16:A0:49:41, hereinafter "the selected O-DU"). The side menu 805A shows an M-Plane category, an S-Plane category, under which different units connected to the selected O-DU on the O-RAN FH link 130 may be shown/identified, and a C/U-Plane ("CU-Plane") category, under which different units connected to the selected O-DU on the O-RAN FH link 130 may be shown/identified. More specifically in FIG. 8A, one O-RU is identified in the S-Plane category (identified by Ethernet MAC address 98:AE: 71:00:8A: 57, and hereinafter "the 1st O-RU") and two different O-RUs are identified in the C/U-Plane category (identified by Ethernet MAC addresses 98:AE: 71:00:8A: 82 and 78:7D:F3:01:12:C5, and hereinafter "the 2nd O-RU" and "the 3rd O-RU," respectively). In other examples, multiple O-DUs, other O-RUs, and/or other components on the O-RAN FH link 130 may be shown in the Flow Explorer GUI 650 for each category/screen in the side menu 805A, and less or more categories/screens may be available for a user to select.

In FIG. 8A, block 807A shows the transmission bandwidth and the reception bandwidth for the selected O-DU. Bar graph 810A (labelled "O-DU Transmit CU-Plane BW by O-RU") shows C/U-Plane transmission bandwidth usage over time for each of the 1st, 2nd, and 3rd O-RUs (differentiated by color), dotted lines indicating maximum and minimum bandwidth usage, and a line tracing the average total bandwidth usage. Bar graph 811A (labelled "O-DU Receive CU-Plane BW by O-RU"), which is only partially visible in FIG. 8A, shows C/U-Plane reception bandwidth usage over time for each of the $1^{st}$, $2^{nd}$, and $3^{rd}$ O-RUs (differentiated by color), dotted lines indicating maximum and minimum bandwidth usage, and a line tracing the average total bandwidth usage. In some examples, the O-DU view 608A of the Flow Explorer GUI 650 in FIG. 8A may show other information, analyses, parameters, analytical timing measurements (including current analytical timing measurements), etc., as would be understood by one of ordinary skill in the art. In some examples, the O-DU view 608A of the Flow Explorer GUI 650 in FIG. 8A may show the same information in another form/type of visual representation, such as, e.g., a 3-D model, a histogram, etc.

Figure 8B:
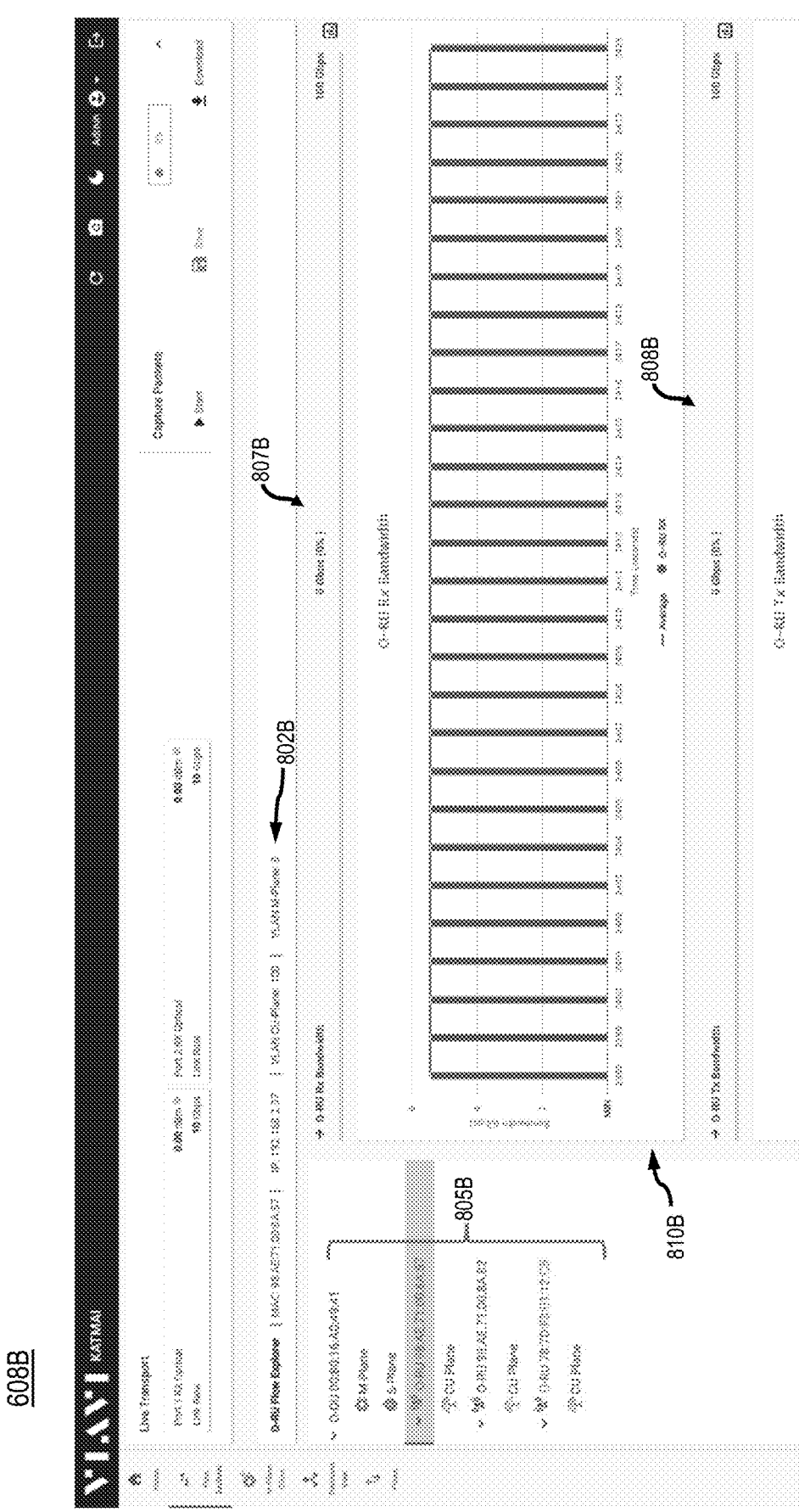

FIG. 8B is a screenshot of a visual representation on the Browser/GUI 430 illustrating a O-RU view 608B of the Flow Explorer GUI 650 of the O-RAN FHA SW 400 in a real-time O-RAN FHA/GUI 150 according to an example. In FIG. 8B, the $1^{st}$ O-RU is shown selected in the side menu 805B, and thus information concerning that O-RU is displayed. In block 802B, the Ethernet MAC address, the IP address, the VLAN C/U Plane, and VLAN M-Plane of the $1^{st}$ O-RU may be shown, while block 807B shows the reception bandwidth and block 808B shows the transmission bandwidth for the $1^{st}$ O-RU. Bar graph 810B (labelled "O-RU Rx Bandwidth") shows the reception bandwidth usage over time for the $1^{st}$ O-RU, and a line tracing the average total bandwidth usage. Bar graph 811B (labelled "O-RU Tx Bandwidth"), which is only partially visible in FIG. 8B, shows the transmission bandwidth usage over time for the $1^{st}$ O-RU (which is not visible in FIG. 8B). In some examples, the O-RU view 608B of the Flow Explorer GUI 650 in FIG. 8B may show other information, analyses, parameters, analytical timing measurements (including current analytical timing measurements), etc., as would be understood by one of ordinary skill in the art. In some examples, the O-RU view 608B of the Flow Explorer GUI 650 in FIG. 8B may show the same information in another form/type of visual representation, such as, e.g., a 3-D model, a histogram, etc.

Figure 8C:
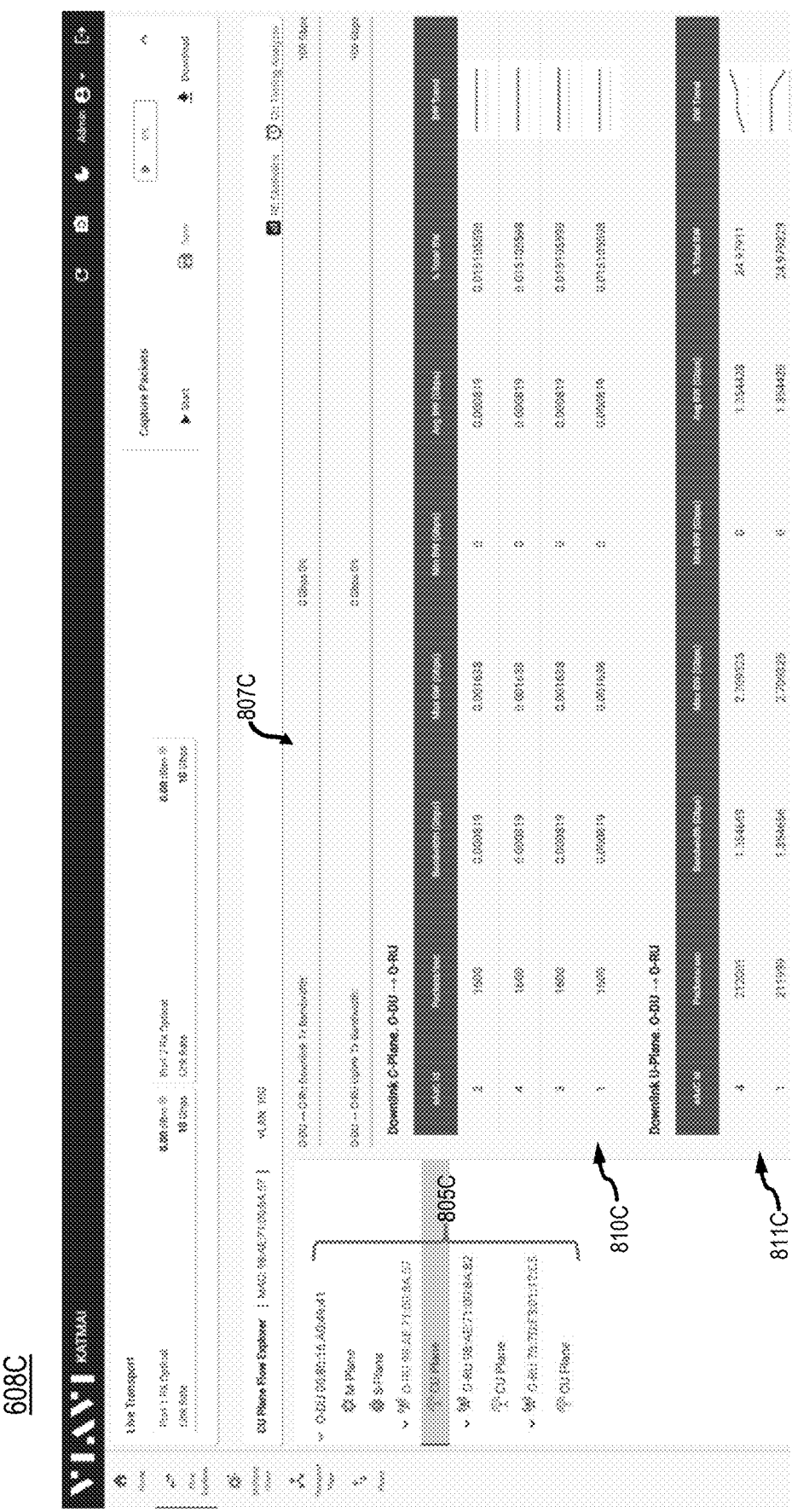

FIG. 8C is a screenshot of a visual representation on the Browser/GUI 430 illustrating a C/U-Plane view 608C of a Flow Explorer GUI 650 of the O-RAN FHA SW 400 in a real-time O-RAN FHA/GUI 150 according to an example. In FIG. 8C, the C/U-Plane view (labelled "CU-Plane" in some of the drawings) of the $1^{st}$ O-RU is shown selected in the side menu 805C, and thus information concerning the C/U-Plane of that O-RU is displayed. Block 807C shows the downlink bandwidth (labelled "O-DU→O-RU Downlink Tx Bandwidth") and uplink bandwidth (labelled "O-DU→O-RU Uplink Tx Bandwidth") for the C/U Plane of the $1^{st}$ O-RU. List 810C (labelled "Downlink C-Plane. O-DU→O-RU") shows various characteristics for identified Antenna Carriers; more specifically, the list 810C shows the eAxC Id, Packets/sec., Bandwidth (in Gbps), Maximum Bandwidth (in Gbps), Minimum Bandwidth (in Gbps), Average Bandwidth (in Gbps), Percentage of Total Bandwidth, and the bandwidth trend over time as a line on a small graph (labelled "BW trend"). Similarly, list 811C (labelled "Downlink U-Plane. O-DU→O-RU") shows various characteristics for identified Antenna Carriers; more specifically, the list 811C shows the eAxC Id, Packets/sec., Bandwidth (in Gbps), Maximum Bandwidth (in Gbps), Minimum Bandwidth (in Gbps), Average Bandwidth (in Gbps), Percentage of Total Bandwidth, and the bandwidth trend over time as a line on a small graph (labelled "BW trend").

In some examples, the C/U-Plane view 608C of the Flow Explorer GUI 650 in FIG. 8C may show Antenna Carrier lists besides the lists 810C and 811C, such as, for example, an Uplink C-Plane/O-DU→O-RU list, an Uplink C-Plane/O-DU←O-RU list, etc., as would be understood by one of ordinary skill in the art. In some examples, the C/U-Plane view 608C of the Flow Explorer GUI 650 in FIG. 8C may show other information, analyses, parameters, analytical timing measurements (including current analytical timing measurements), etc., as would be understood by one of ordinary skill in the art. In some examples, the C/U-Plane view 608C of the Flow Explorer GUI 650 in FIG. 8C may show the same information in another form/type of visual representation, such as, e.g., a 3-D model, a histogram, etc.

Figure 8D:
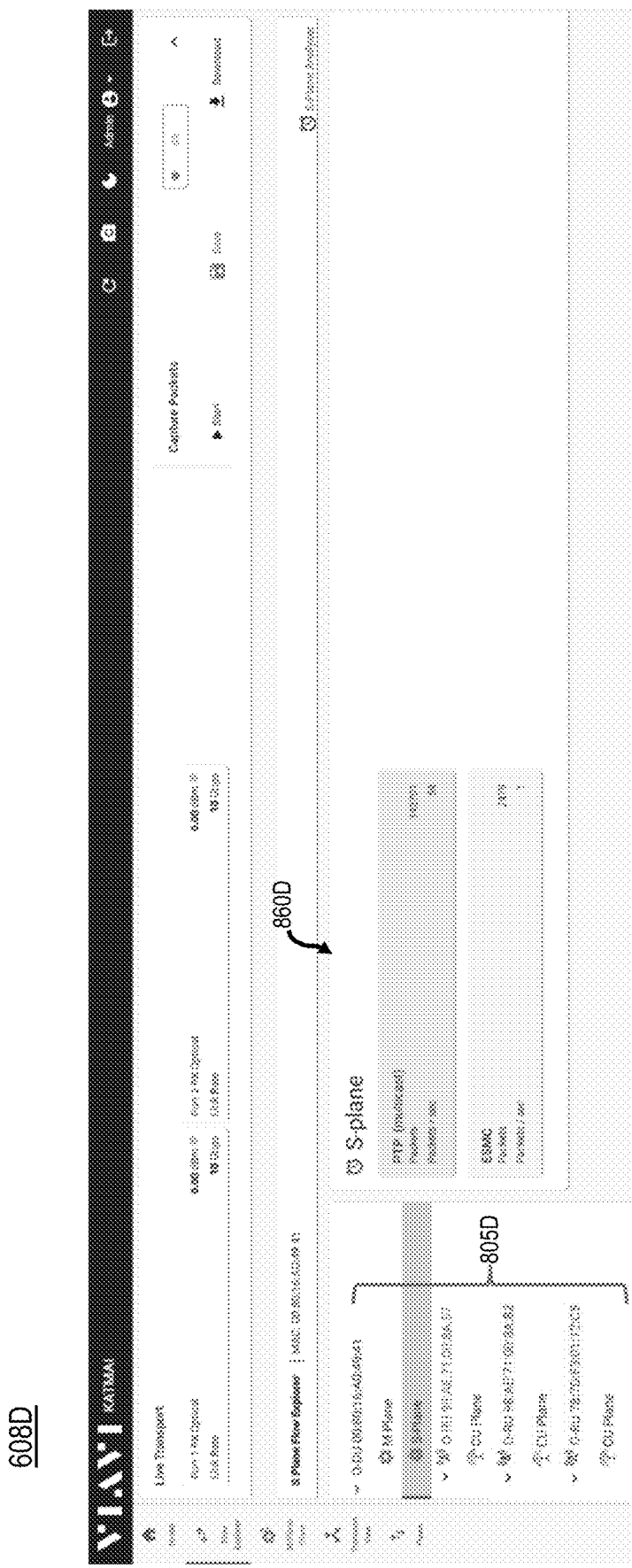

FIG. 8D is a screenshot of a visual representation on the Browser/GUI 430 illustrating an S-Plane view 608D of a Flow Explorer GUI 650 of the O-RAN FHA SW 400 in a real-time O-RAN FHA/GUI 150 according to an example. In FIG. 8D, the S-Plane view of the selected O-DU is shown selected in the side menu 805D, and thus information concerning the S-Plane of the selected O-DU is displayed. More specifically, block 860D shows the number of packets and packets/sec. of the multicast PTP packets and the number of packets and packets/sec. of the ESMC packets. In some examples, the S-Plane view 608D of the Flow Explorer GUI 650 in FIG. 8D may show other information, analyses, parameters, analytical timing measurements (including current analytical timing measurements), etc., as would be understood by one of ordinary skill in the art. In some examples, the S-Plane view 608D of the Flow Explorer GUI 650 in FIG. 8D may show the same information in another form/type of visual representation, such as, e.g., line graphs, bar graphs, a 3-D model, a histogram, etc.

As mentioned further above, a user of the real-time O-RAN FHA/GUI 150 may employ the Flow Explorer GUI 650 in FIGS. 8A-8D to determine, for example, whether the selected O-DU, the $1^{st}$, $2^{nd}$, and/or $3^{rd}$ O-RUs, and/or the O-RAN FH link 130 in general can support a sufficient packet traffic flow and/or provide an adequate Quality of Service (QOS)/Quality of Experience (QoE). In some examples, the Flow Explorer GUI 650 in FIGS. 8A-8D may provide the visual representations substantially in near-real-time, thereby reflecting the current status of the packet traffic flow on the O-RAN FH link 130.

Figure 9A:
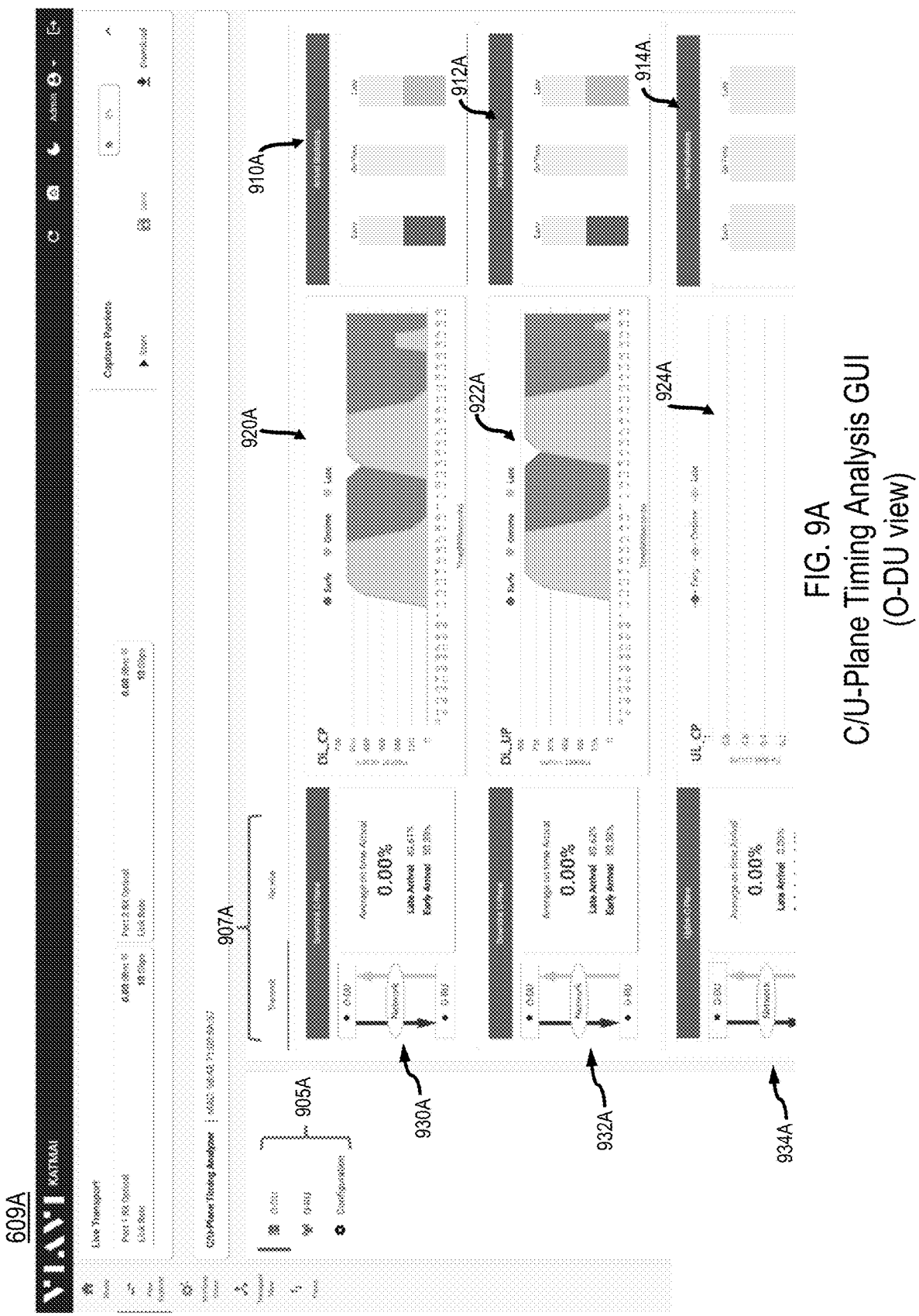
FIGS. 9A-9C are screenshots of visual representations on a GUI illustrating various views of a C/U-Plane Timing Analysis functionality/application of an O-RAN FHA SW in a real-time O-RAN FHA/GUI, according to an example.

FIG. 9A is a screenshot of a visual representation on the Browser/GUI 430 illustrating an O-DU view 609A of a C/U-Plane Timing Analysis functionality/application ("C/U-Plane Timing Analysis GUI") of the O-RAN FHA SW 400 according to an example. In FIG. 9A, a menu 905A is shown where three different display screens may be selected: an O-DU view showing O-DU statistics and tracking information, an O-RU view showing O-RU statistics and tracking information, and a Configuration view for selecting the parameters of the C/U-Plane Timing Analysis. As shown in FIG. 9A, the O-DU view 609A is selected on the menu 905A and thus displayed. In the O-DU view 609A of the C/U-Plane Timing Analysis GUI shown in FIG. 9A, block 930A shows the average percentage of C-Plane downlink (DL) packets having an on-time arrival time; DL_CP graph 920A breaks down the number of early, late, and on-time C-Plane DL packets; and bar graph 910A shows the early, on-time, and late statistics of the C-Plane DL packets. Similarly, block 932A shows the average percentage of U-Plane DL packets having an on-time arrival time; DL_UP graph 922A is a graph breaking down the number of early, late, and on-time U-Plane DL packets; and bar graph 912A shows the early, on-time, and late statistics of the U-Plane DL packets. Lastly, block 934A shows the average percentage of C-Plane uplink (UL) packets having an on-time arrival time; UL_CP graph 924A breaks down the number of early, late, and on-time C-Plane UL packets; and bar graph 914A is a bar graph showing the early, on-time, and late statistics of the C-Plane UL packets.

When in the C/U-Plane Timing Analysis GUI shown in FIG. 9A, a user may select either the Transmit or Receive tab 907A to show either the C/U-Plane packet flows being transmitted or the C/U-Plane packet flows being received, respectively, at the selected unit-accordingly, as the O-DU screen is selected in the menu 905A and the Transmit tab 907A is selected in FIG. 9A, the C/U-Plane packet flows being transmitted from the O-DU are shown in the C/U-Plane Timing Analysis GUI of FIG. 9A. Similarly, if the user selected the Receive tab 907A, the C/U-Plane packet flows being received by the O-DU would be shown in the C/U-Plane Timing Analysis GUI. Although only one O-DU and one O-RU are shown in the menu 905A, in other examples, multiple O-DUs and/or multiple O-RUs may be displayed for selection in the menu 905A. In some examples, the O-DU view 609A in FIG. 9A of a C/U-Plane Timing Analysis GUI may show other information, analyses, parameters, analytical timing measurements (including current analytical timing measurements), etc., as would be understood by one of ordinary skill in the art. In some examples, the O-DU view 609A in FIG. 9A of a C/U-Plane Timing Analysis GUI may show the same information in another form/type of visual representation, such as, e.g., line graphs, bar graphs, a 3-D model, a histogram, etc.

Figure 9B:

FIG. 9B is a screenshot of a visual representation on the Browser/GUI 430 illustrating an O-RU view 609B of the C/U-Plane Timing Analysis GUI of the O-RAN FHA SW 400 according to an example. In the O-RU view 609B (selected in menu 905B) of the C/U-Plane Timing Analysis GUI of FIG. 9B, block 930B shows the average percentage of U-Plane uplink (UL) packets having an on-time arrival time; UL_UP graph 920B breaks down the number of early, late, and on-time U-Plane UL packets; and bar graph 910B shows the early, on-time, and late statistics of the U-Plane UL packets. When in the O-RU view 609B of the C/U-Plane Timing Analysis GUI shown in FIG. 9B, a user may select either the Transmit or Receive tab 907B to show either the C/U-Plane packet flows being transmitted or the C/U-Plane packet flows being received, respectively, at the O-RU-accordingly, as the Transmit tab 907B is selected in FIG. 9B, the U-Plane packet flows being transmitted from the O-RU are shown in the O-RU view 609B of the C/U-Plane Timing Analysis GUI of FIG. 9B. If the user selected the Receive tab 907A, the C/U-Plane packet flows being received by the O-RU would be shown in the C/U-Plane Timing Analysis GUI, such as, e.g., the downlink U-Plane and C-Plane packet flows. In some examples, the O-RU view 609B in FIG. 9B of a C/U-Plane Timing Analysis GUI may show other information, analyses, parameters, analytical timing measurements (including current analytical timing measurements), etc., as would be understood by one of ordinary skill in the art. In some examples, the O-RU view 609B in FIG. 9B of a C/U-Plane Timing Analysis GUI may show the same information in another form/type of visual representation, such as, e.g., line graphs, bar graphs, a 3-D model, a histogram, etc.

Figure 9C:
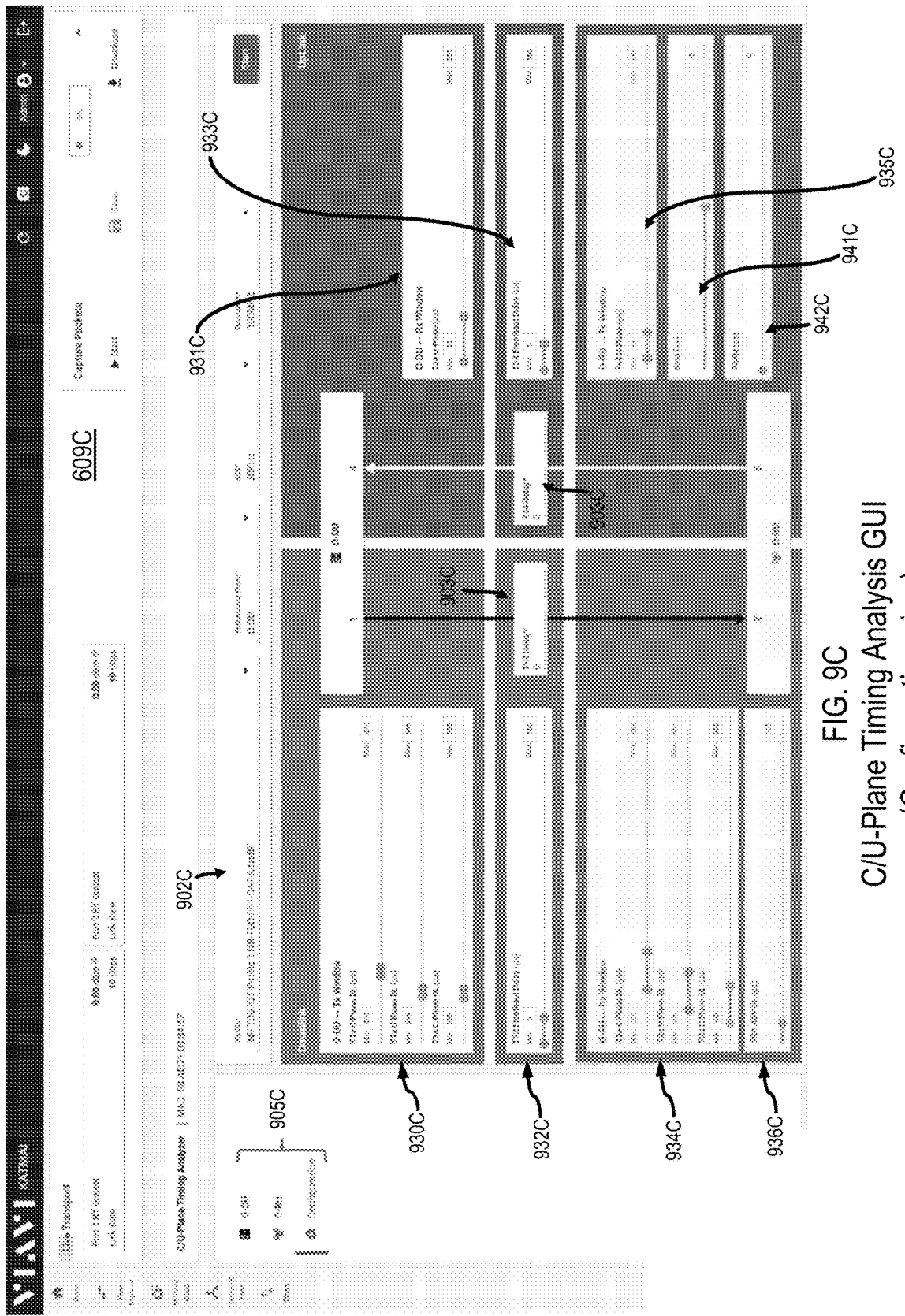

FIG. 9C is a screenshot of a visual representation on the Browser/GUI 430 illustrating a Configuration view 609C of the C/U-Plane Timing Analysis GUI of the O-RAN FHA SW 400 according to an example. At the top of the Configuration view 609C (selected in menu 905C) of the C/U-Plane Timing Analysis GUI of FIG. 9C, block 902C shows a Profile drop-down selection box (i.e., for a user to select among the profiles in Annex A of the O-RAN FH IoT standard; in this example, the "NR TDD IoT Profile 1 NR-TDD-FR1-CAT-A-NoBF" profile of Sect. A.2.1.1 is selected/set), a Text Access Point location drop down selection box (set to O-DU), an SCS setting drop down selection box (set to 30 kHz), and a Bandwidth drop down selection box (set to 100 MHz). In some examples, the remaining selections may be automatically set once the appropriate Profile is selected by the user.

In the remaining and largest portion of the Configuration view 609C of the C/U-Plane Timing Analysis GUI in FIG. 9C, several boxes show the various parameters of the selected configuration schematically, graphically, and numerically. On the left side, the various parameters and windows of the downlink are shown; on the right side, the various parameters and windows of the uplink are shown, while in the middle, a block diagram illustrates the O-DU, the O-RU, and the connections between them, similarly to the block diagram of FIG. 2B described above. In that middle section, a block 903C and 904C show the T12 and T34 delays, respectively.

On the downlink side of the Configuration view 609C of the C/U-Plane Timing Analysis GUI in FIG. 9C, a block 930C (labelled "O-DU→Tx Window") may provide sliders for setting the minimum and maximum values of the Ta parameter, i.e., the C-Plane DL minimum and maximum T1a, the U-Plane DL minimum and maximum T1a, and the C-Plane UL minimum and maximum T1a. A block 932C (labelled "T12 Fronthaul Delay") may provide a slider for setting the minimum and maximum values of the T12 window. A block 934C (labelled "O-RU→Rx Window") may provide sliders for setting the minimum and maximum values of the T2a parameter, i.e., the C-Plane DL minimum and maximum T2a, the U-Plane DL minimum and maximum T2a, and the C-Plane UL minimum and maximum T2a. A block 936C (labelled "TCP ADV CP") may provide a slider for setting the maximum value of the Tcp_adv_dl parameter.

On the uplink side of the Configuration view 609C of the C/U-Plane Timing Analysis GUI in FIG. 9C, a block 931C (labelled "O-DU→Rx Window") may provide a slider for setting the minimum and maximum values of the Ta4 parameter for the U-Plane. A block 933C (labelled "T34 Fronthaul Delay") may provide a slider for setting the minimum and maximum values of the T34 window. A block 935C (labelled "O-RU→Tx Window") may provide sliders for setting the minimum and maximum values of the Ta3 parameter for the U-Plane. Lastly, on the bottom right, blocks 941C and 942C provide sliders for the a (alpha) and B (beta) offsets (see, e.g., Sect. 11.7 and Table 11.7.2-1 of the O-RAN FH C/U/S-Plane standard). In some examples, the Configuration view 609C in FIG. 9C of a C/U-Plane Timing Analysis GUI may show other information, parameters, analytical timing measurements (including current analytical timing measurements), etc., as would be understood by one of ordinary skill in the art, and/or may show the same information in another form/type of visual representation, such as, e.g., line graphs, bar graphs, a 3-D model, a histogram, etc.

Figure 10A:
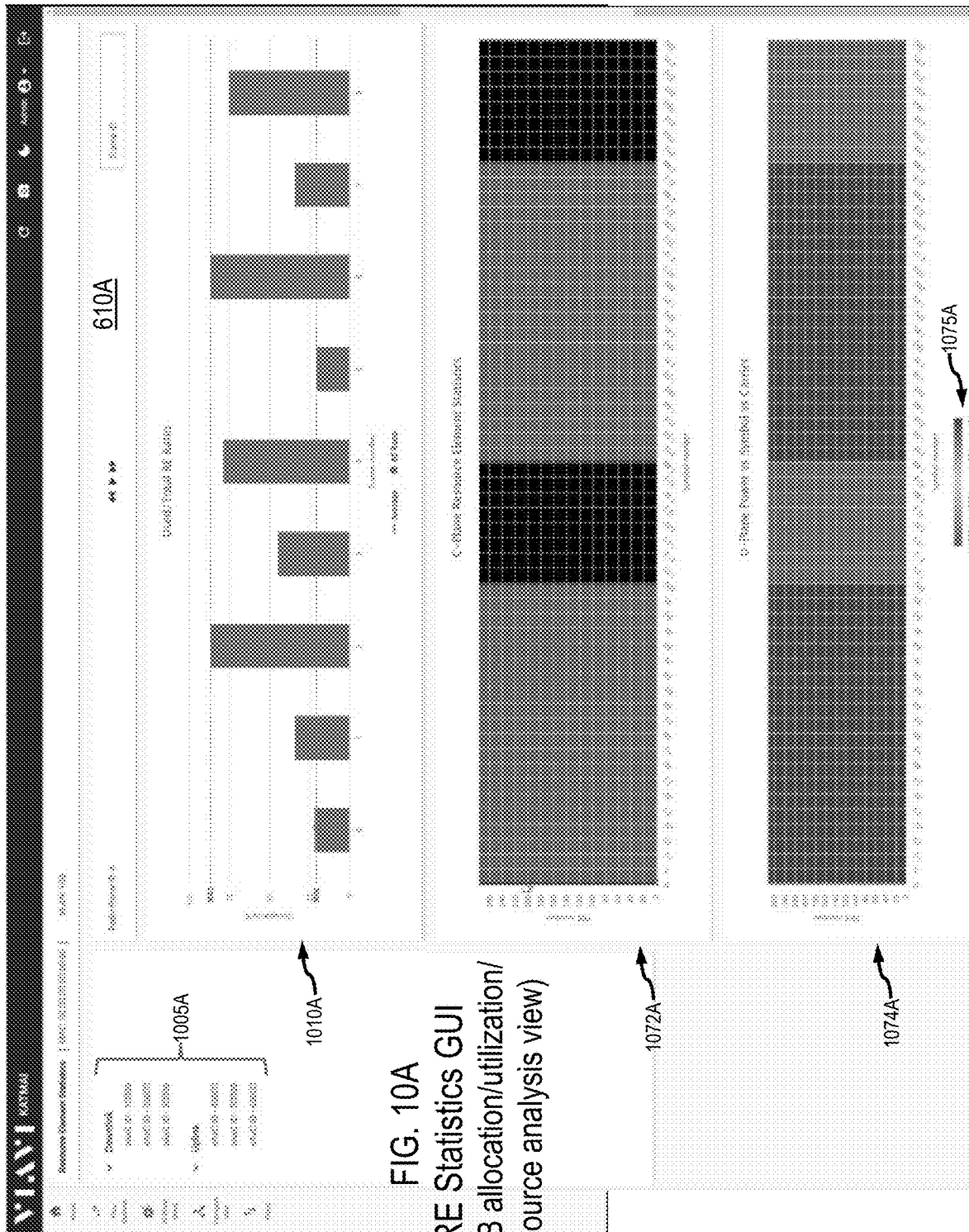
FIG. 10A is a screenshot of a visual representation on a GUI illustrating a Resource Element (RE) Statistics functionality/application of an O-RAN FHA SW in a real-time O-RAN FHA/GUI, according to an example.

FIG. 10A is a screenshot of a visual representation on the Browser/GUI 430 illustrating an RE Statistics GUI 610 of the O-RAN FHA SW 400 according to an example. More specifically, FIG. 10A illustrates a PRB allocation, utilization, and/or resource analysis functionality/application of the O-RAN FHA SW 400 according to an example. In FIG. 10A, a menu 1005A shows different eAxC IDs on the uplink and the downlink which a user may select in order that the PRB allocation/utilization/resource analysis view (hereinafter, "the PRB a/u/r analysis view") of the RE Statistics GUI 610A shows the relevant information regarding the selected eAxC ID. More specifically, a usage ratio bar graph 1010A (labelled "Used/Total RE Ratio") shows, for the selected eAxC ID, the occupancy percentage for each frame number and tracks the local maximum and minimum values with dotted lines. A resource usage block graph 1072A (labelled "C-Plane Resource Element Statistics") shows usage by PRB number on the y-axis and symbol number on the x-axis, where the blocks are colored according to resource usage, and a power block graph 1074A (labelled "U-Plane Power vs. Symbol vs. Carrier") shows the PRB number on its y-axis and the symbol number on its x-axis and indicates power usage by the color of the individual blocks, as shown by the color legend 1075A showing power output in decibels. Accordingly, a user may see the usage ratio bar graph 1010A, the resource usage block graph 1072A, and the power block graph 1074A for any of the eAxC Ids by selecting that eAxC Id from the menu 1005A. In some examples, the RE Statistics GUI 610 in FIG. 10A may show other information, parameters, analytical timing measurements (including current analytical timing measurements), etc., as would be understood by one of ordinary skill in the art, and/or may show the same information in another form/type of visual representation, such as, e.g., line graphs, bar graphs, a 3-D model, a histogram, etc.

Figure 10B:
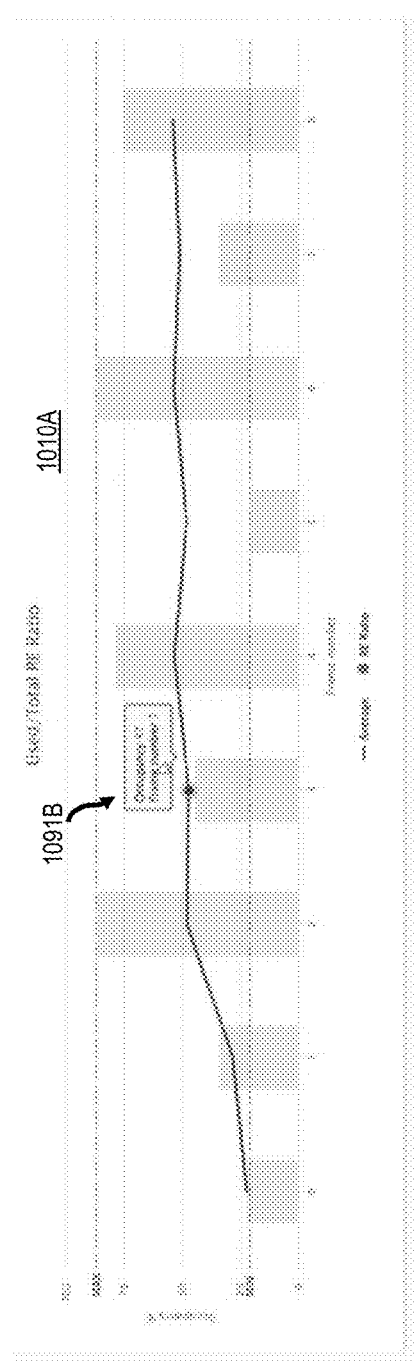
FIGS. 10B and 10C are close-ups of portions of the GUI in FIG. 10A of a RE Statistics functionality/application of an O-RAN FHA SW in a real-time O-RAN FHA/GUI, according to an example.
Figure 10C:
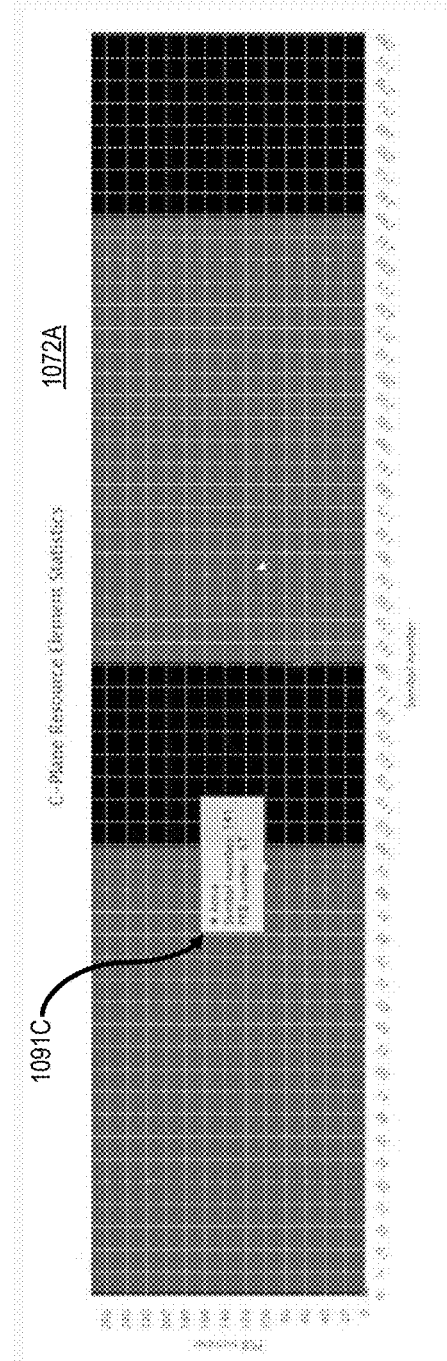

FIGS. 10B and 10C are close-ups of portions of the RE Statistics GUI 610A in FIG. 10A of the O-RAN FHA SW 400 according to an example. More specifically, FIG. 10B is a close-up of the usage ratio bar graph 1010A in FIG. 10A and FIG. 10C is a close-up of the resource usage bar graph 1072A in FIG. 10A. FIGS. 10B and 10C demonstrate the cursor hover functionality of the PRB a/u/r analysis view of FIG. 10A:specifically, how hovering the cursor over parts of the PRB a/u/r analysis view of FIG. 10A cause more information to be displayed. In FIG. 10B, when a user hovers the cursor over one of the bars representing a frame, a box 1091B appears, showing the frame number and occupancy percentage of that frame. In FIG. 10C, when a user hovers the cursor over one of the blocks in the resource usage block graph 1072A, a box 1091C appears, indicating whether the block is active (also indicated by color), the symbol number of the block, and the PRB number of the block. While this cursor hover functionality is only shown in reference to the PRB a/u/r analysis view of FIG. 10A, such functionality may be applied to any of the views and/or GUIs described and/or mentioned in the present disclosure.

Figure 11:
FIG. 11 is a screenshot of a visual representation on a GUI illustrating an S-Plane Analysis functionality/application of an O-RAN FHA SW in a real-time O-RAN FHA/GUI, according to an example.

FIG. 11 is a screenshot of a visual representation on the Browser/GUI 430 illustrating an S-Plane Analysis GUI 611 of the O-RAN FHA SW 400 according to an example. In FIG. 11, block 1160 shows statistics concerning the PTP Master, specifically, for each PTP Master packet type (Announce, Sync, and Followup), the current packet flow (in packets per second (pps)), the minimum packet flow, and the maximum packet flow. Block 1162 shows information concerning any PTP events, such as the timestamp, Domain Number, Clock Class, and Clock Accuracy of the PTP event. Block 1164 shows statistics concerning any PTP Slaves, specifically, for each PTP Slave, its Ethernet MAC address, delay request statistics (current, minimum, and maximum flow), and delay response statistics (current, minimum, and maximum flow). In other examples, an S-Plane Analysis GUI 611 may show ESMC frame and packet data. In some examples, the S-Plane Analysis GUI 611 in FIG. 11 may show other information, parameters, analytical timing measurements (including current analytical timing measurements), etc., as would be understood by one of ordinary skill in the art, and/or may show the same information in another form/type of visual representation, such as, e.g., line graphs, bar graphs, a 3-D model, a histogram, etc.

Figure 12:
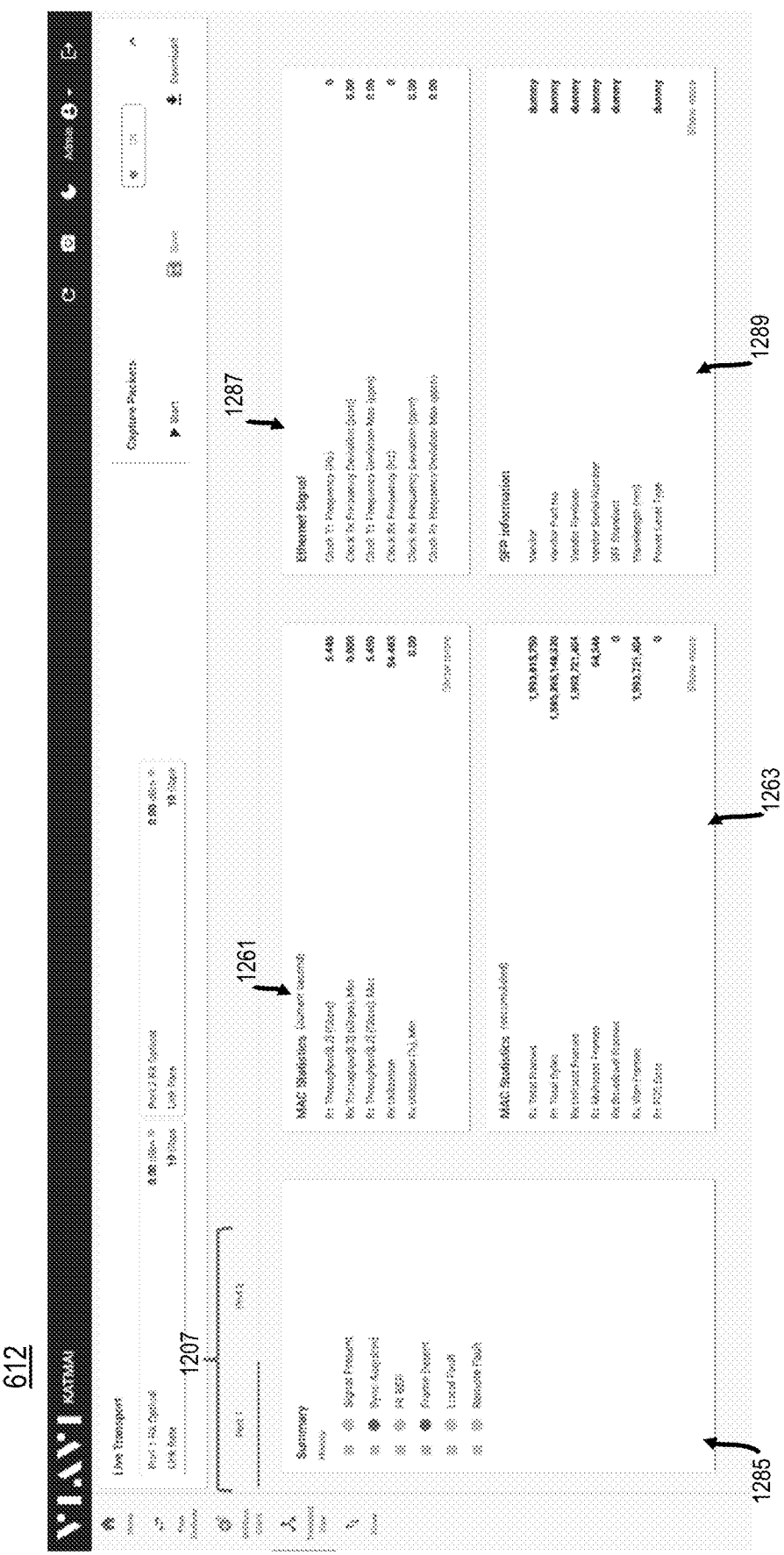
FIG. 12 is a screenshot of a visual representation on a GUI illustrating a Live Transport functionality/application of an O-RAN FHA SW in a real-time O-RAN FHA/GUI, according to an example.

FIG. 12 is a screenshot of a visual representation on the Browser/GUI 430 illustrating a Live Transport functionality/application of the O-RAN FHA SW 400 according to an example. In FIG. 12, a Live Transport view 612 shows various statistics, information, measurements, etc., of the SFP transceiver connecting the real-time O-RAN FHA/GUI 150 to the O-RAN FH link 130. When in the Live Transport view of FIG. 12, a user may select either the Port 1 tab or the Port 2 tab 1207 to show the data for either Port 1 or Port 2, respectively-accordingly, as the Port 1 tab 1207 is selected in FIG. 12, the Live Transport view 612 of FIG. 12 shows the data for Port 1.

In FIG. 12, box 1285 shows a summary of the recent history of events, codes, and/or faults for Port 1, while box 1261 shows the current MAC statistics for Port 1, including the Reception (Rx) Throughput (L2) (Gbps), the Minimum Rx Throughput (L2) (Gbps), the Maximum Rx Throughput (L2) (Gbps), the Rx Utilization, and the Minimum Rx Utilization (%). As shown by the Live Transport view 612 in FIG. 12, the box 1261 may have more information, as indicated by the "Show More" link, which may include, for example, the Rx Bandwidth (in Gbps), the Tx Bandwidth (in Gbps), the Rx Cycle Count, the Rx Multicast, the Rx Total Bytes, the Rx Total Packets, the Tx Cycle Count, the Tx Total Bytes, the Tx Total Packets, etc., as would be understood by one of ordinary skill in the art.

Box 1263 shows the accumulated MAC statistics for Port 1, including the Rx Total Frames, the Rx Total Bytes, the Rx Unicast Frames, the Rx Multicast Frames, the Rx Broadcast Frames, the Rx VLAN Frames, and the Rx Frame Check Sequence (FCS) Error. As shown by the Live Transport view 612 in FIG. 12, the box 1263 may have more information, as indicated by the "Show More" link, which may include, for example, the Tx Total Frames, the Tx Total Bytes, the Tx Unicast Frames, the Tx Multicast Frames, the Tx Broadcast Frames, the Tx VLAN Frames, the Tx FCS Error, the Tx Total Packets, the Tx Total Good Packets, the Tx Total Good Bytes, etc., as would be understood by one of ordinary skill in the art.

Box 1287 shows statistics and data for the Ethernet traffic, including the Clock Tx Frequency (in Hz), the Clock Tx Frequency Deviation (in ppm), the Clock Tx Frequency Deviation Maximum (in ppm), the Clock Rx Frequency (in Hz), the Clock Rx Frequency Deviation (in ppm), and the Clock Rx Frequency Deviation Maximum (in ppm). Box 1289 shows the SFP transceiver information, including Vendor, Vendor Part No., Vendor Revision, Vendor Serial Number, the SFP Standard being used (such as, e.g., the Common Management Interface Specification (CMIS) or SFP-8402), the Wavelength (in nm), of the optical transmissions on the SFP transceiver, and the Power Level Type. In other examples, the Live Transport view 612 of FIG. 12 may show other information, parameters, characteristics, etc., as would be understood by one of ordinary skill in the art, and/or may show the same information in another form/type of visual representation, such as, e.g., line graphs, bar graphs, a 3-D model, a histogram, etc.

Figure 13A:
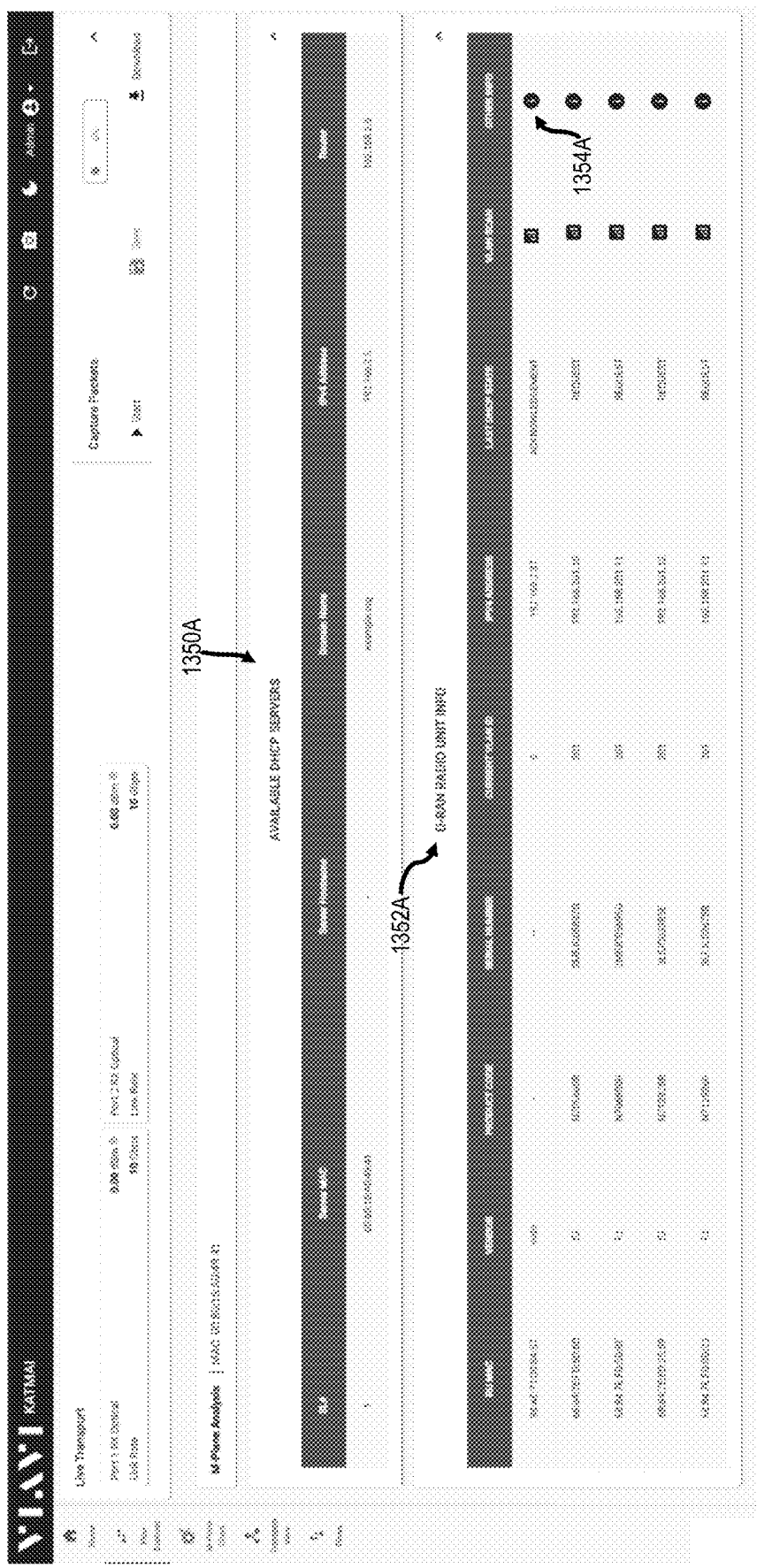
FIG. 13A is a screenshot of a visual representation on a GUI illustrating an M-Plane Analysis functionality/application of an O-RAN FHA SW in a real-time O-RAN FHA/GUI, according to an example.

FIG. 13A is a screenshot of a visual representation on the Browser/GUI 430 illustrating an M-Plane Analysis functionality/application of the O-RAN FHA SW 400 ("the M-Plane Analysis GUI 613A") according to an example. In FIG. 13A, block 1350A shows information concerning the available Dynamic Host Configuration Protocol (DHCP) servers for the M-Plane and, specifically, each available DHCP server's Ethernet MAC address, Server Hostname, Domain Name, IPv4 address, and Router. Block 1352A shows information concerning the O-RAN RUs connected to the O-DU, including each O-RU's Ethernet MAC address, Vendor (manufacturer), Product Code, Serial Number, Current VLAN ID, IPV4 address, Last DHCP State, a link/button to VLAN Scan information, and an Other Info icon/link 1354A.

Figure 13B:
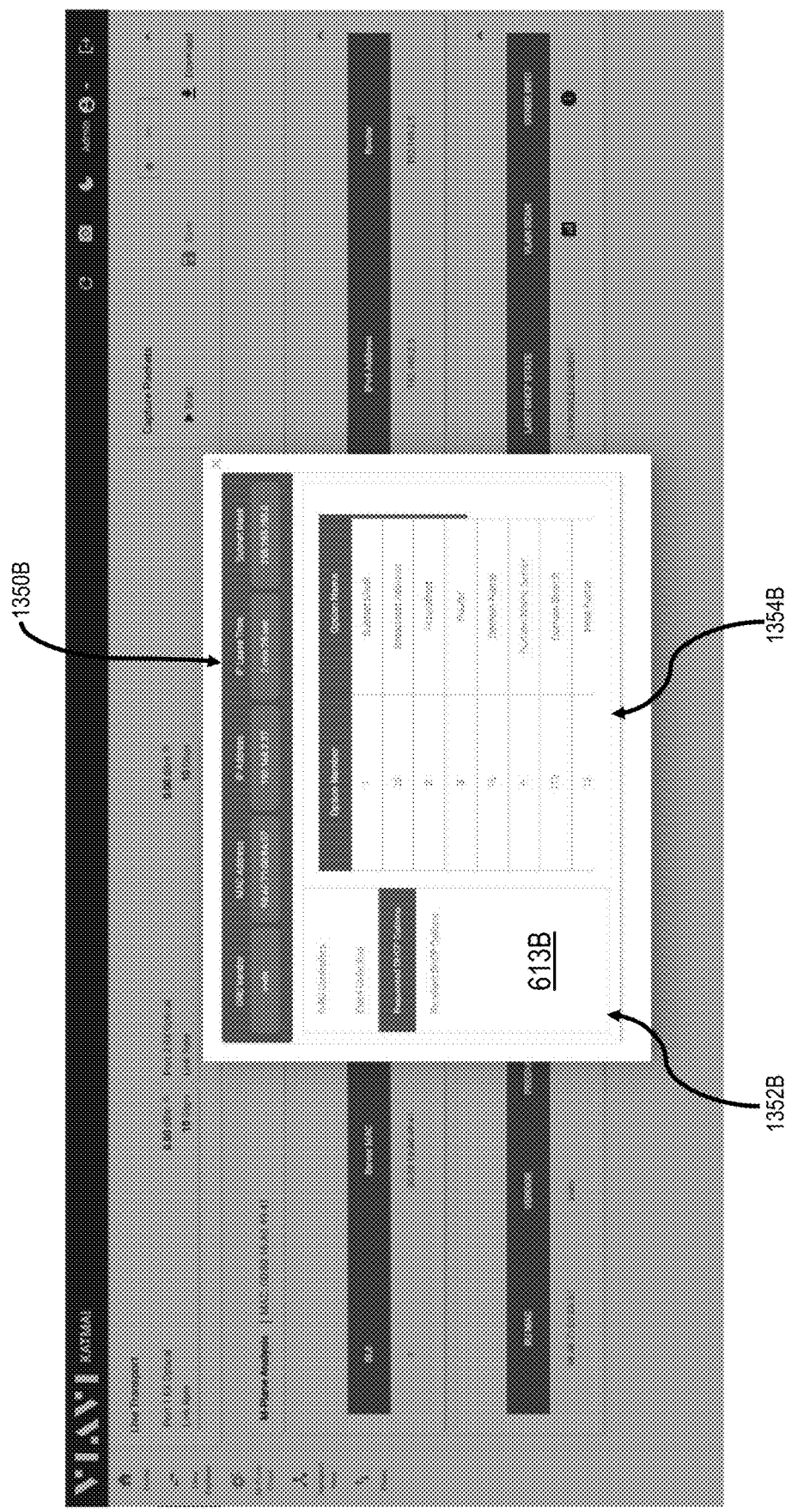
FIG. 13B is a pop-up screen that may appear on the GUI illustrating the M-Plane Analysis functionality/application in FIG. 13A of an O-RAN FHA SW in a real-time O-RAN FHA/GUI, according to an example.

FIG. 13B is a pop-up screen 613B which appears when a user selects the Other Info icon/link 1354A on the M-Plane Analysis GUI 613A of FIG. 13A. As shown in the pop-up screen 613B of FIG. 13B, the other information provided by selecting the Other Info icon/link 1354A may include a top bar 1350B, a side selection menu 1352B, and a pane 1354B which shows the information indicated in the side selection menu 1352B. The top bar 1350B may include the Vendor, Ethernet MAC Address, IP Address, the IP Lease Time, and the Subnet Mask of the O-RU. On the side selection menu 1352B, a user may select from among O-RU Controllers, Event Controllers, Requested DHCP Options, and Received DHCP Options, to show information in the pane 1354B. In FIG. 13B, the Requested DHCP Options is selected in the side selection menu 1352B, and thus the pane 1354B displays a SubNet Mask, Broadcast Address, TimeOffset, Domain Name, Domain Name Server, Domain Search, Host Name, and other information which may be seen by using the scroll bar in the pane 1354B. In other examples, the M-Plane Analysis GUI 613A and pop-up screen 613B in FIGS. 13A-13B may show other information, parameters, characteristics, etc., as would be understood by one of ordinary skill in the art, and/or may show the same information in another form/type of visual representation, such as, e.g., line graphs, bar graphs, a 3-D model, a histogram, etc.

Figure 14:
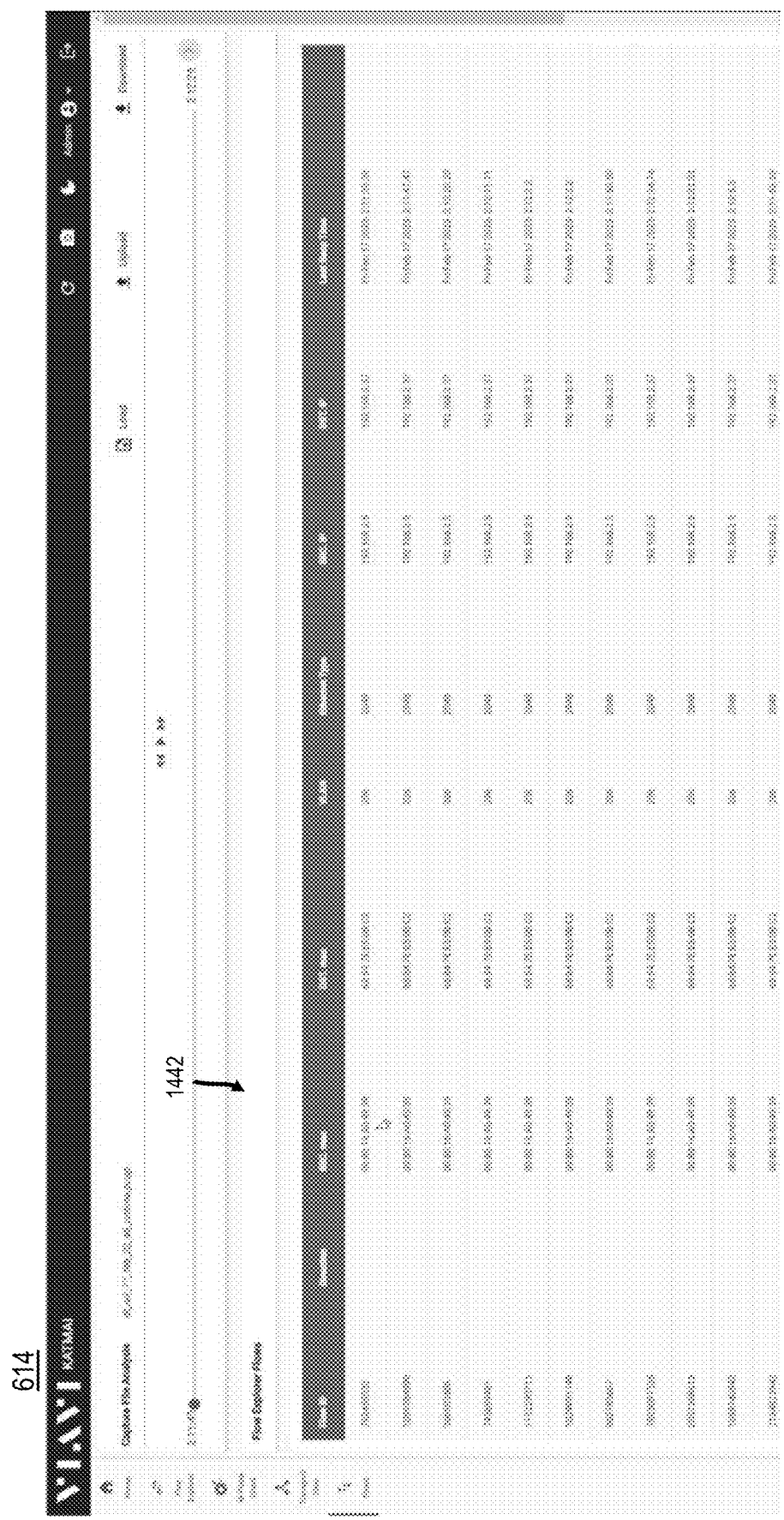
FIG. 14 is a screenshot of a visual representation on a GUI illustrating a packet traffic flow functionality/application of an O-RAN FHA SW in a real-time O-RAN FHA/GUI, according to an example.

FIG. 14 is a screenshot of a visual representation on the Browser/GUI 430 illustrating a packet traffic flow view functionality/application ("Flow GUI 614") of the O-RAN FHA SW 400 according to an example. In FIG. 14, a list 1442 (labelled "Flow Explorer Flows") shows information concerning each of one, multiple, and/or all packet flows on the O-RAN FH link 130, including, for example, the Flow ID, the Direction (i.e., UL or DL), the Source Ethernet MAC address, the Destination Ethernet MAC address, the current VLAN ID, the Ethernet Type, the Source IP address, the Destination IP address, and the time of reception of the latest packet in the packet flow (which may assist in determining if a specific packet traffic flow has stopped/ceased). In some examples, the Flow ID may be an arbitrary unique indicia, such as, e.g., a hash value, generated by the O-RAN FHA HW 300 and/or the O-RAN FHA SW 400. In other examples, the Flow GUI 614 in FIG. 14 may show other information, parameters, characteristics, etc., as would be understood by one of ordinary skill in the art, and/or may show the same information in another form/type of visual representation, such as, e.g., line graphs, bar graphs, a 3-D model, a histogram, etc.

FIGS. 15A-15M are screenshots of visual representations on the Browser/GUI 430 illustrating various views 615A-615M of an M-Plane Client functionality/application ("M-Plane Client GUI") of the O-RAN FHA SW 400 according to examples. Generally speaking, the M-Plane Client GUI may enable a user to establish a NETCONF session with the O-RU and retrieve various YANG model attribute values from the O-RU. These values and other information generated for and shown on the M-Plane GUI may help diagnose optical fiber, transport, synchronization, or RF issues observed over the FH link. In some examples, the M-Plane Client GUI may only be available when the O-RAN FHA/GUI 150 is operating in intrusive through connection mode. Further details regarding the parameters, measurements, quantities, and/or qualities in the various views 615A-615M, and/or other parameters, measurements, quantities, and/or qualities suitable for visual representation by one or more views of the M-Plane Client GUI may be found in the O-RAN FH M-Plane standard and/or other O-RAN standards, such as in Sect. 2.2.1 of the O-RAN FH IoT standard (which lists, among other things, how specific O-RU information may be obtained using YANG models), as would be understood by one of ordinary skill in the art.

Figure 15A:
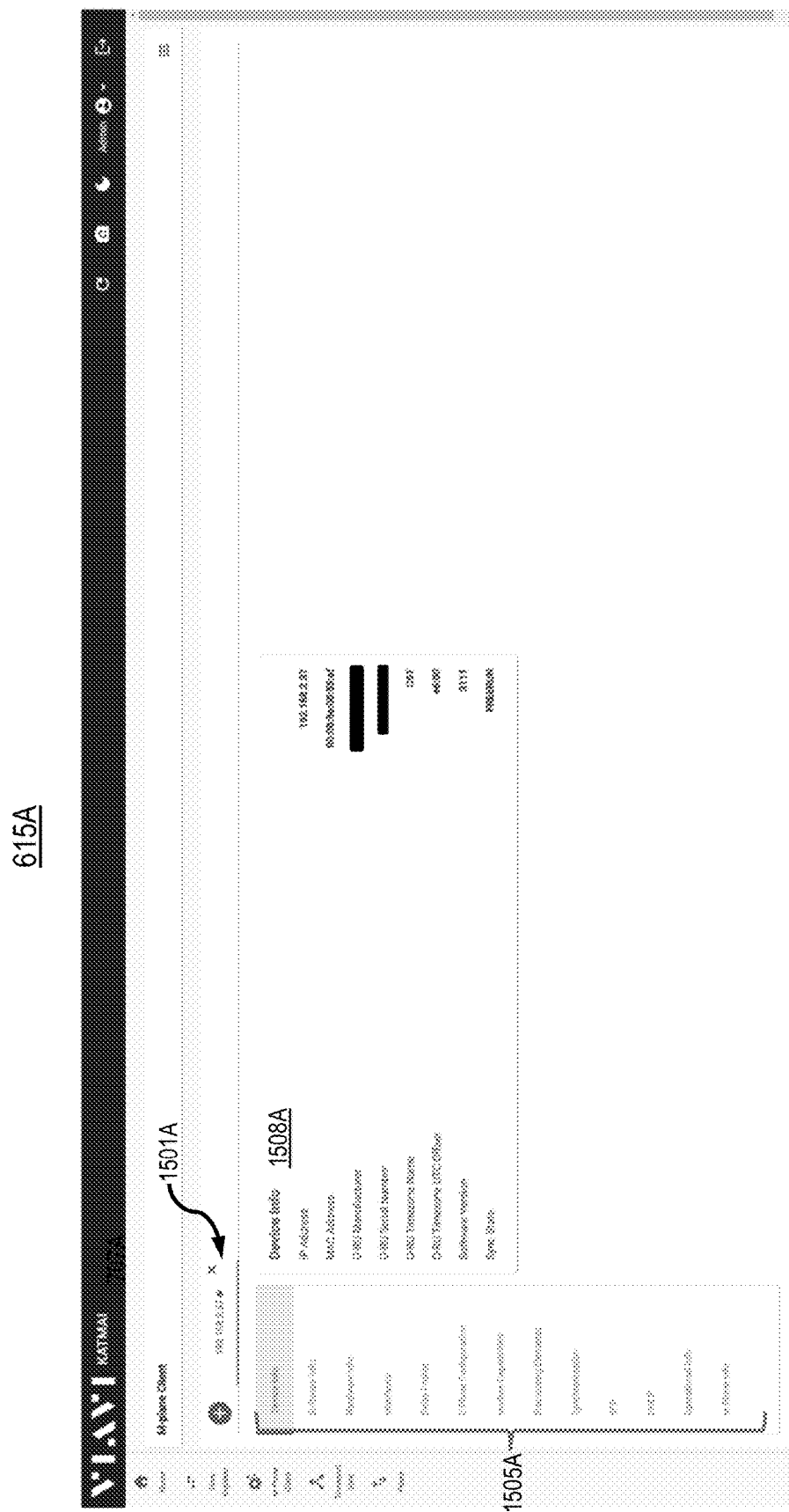
FIGS. 15A-15M are screenshots of visual representations on a GUI illustrating various views of an M-Plane Client functionality/application of an O-RAN FHA SW in a real-time O-RAN FHA/GUI, according to an example.

FIG. 15A is a screenshot of a visual representation on the Browser/GUI 430 illustrating a Device Info view 615A of the M-Plane Client GUI according to an example. As with all the pages/views of the M-Plane Client GUI, a menu 1505A appears on the left-hand side of the Device Info view 615A, indicating all of the views/pages available within the M-Plane Client GUI, including Device Info (which is selected in the Device Info view 615A), Software Info (i.e., Software Info view 615B shown in FIG. 15B), Hardware Info (i.e., Hardware Info view 615C shown in FIG. 15C), Interfaces (i.e., Interfaces view 615D shown in FIG. 15D), Delay Profile (i.e., Delay Profile view 615E shown in FIG. 15E), U-Plane Configuration (i.e., U-Plane Configuration view 615F shown in FIG. 15F), Module Capabilities (i.e., Module Capabilities view 615G shown in FIG. 15G), Processing Elements (i.e., Processing Elements view 615H shown in FIG. 15H), Synchronization (i.e., Synchronization view 6151 shown in FIG. 15I), SFP (i.e., SFP view 615J shown in FIG. 15J), DHCP (i.e., DHCP view 615K shown in FIG. 15K), Operational Info (i.e., Operational Info view 615L shown in FIG. 15L), and M Plane Info (i.e., M-Plane Info view 615M shown in FIG. 15M).

In FIG. 15A, a Device Info block 1508A provides information regarding the O-RU which may be tested/analyzed using the M-Plane Client GUI. Generally speaking, the Device Info block 1508A may relate to information regarding the O-RU as described in, e.g., the O-RAN FH M-Plane standard (and may be provided by a certificate mechanism, as described therein). More specifically, in some examples, the Device Info block 1508A may include the IP address, the MAC address, the O-RU Manufacturer, the O-RU Serial Number, the O-RU Timezone, the O-RU Timezone UTC Offset, the Software Version, and/or the Sync State. The IP address of the O-RU being tested/analyzed may be shown in tab/block 1501A. In some examples, multiple O-RUs may be tested/analyzed by the M-Plane Client GUI and thus there may be multiple tabs on top of the M-Plane Client GUI like the tab/block 1501A; however, only one O-RU may be tested/analyzed by the M-Plane Client GUI at a time, and thus a green dot next to the IP address in tab/block 1501A may indicate which O-RU is currently being tested/analyzed. In some examples, other information besides that shown in FIG. 15A may be shown, as would be understood by one of ordinary skill in the art (who may refer to, for example, the references to the O-RAN standards within this paragraph), and other forms/types of visual representation may be used.

Figure 15B:
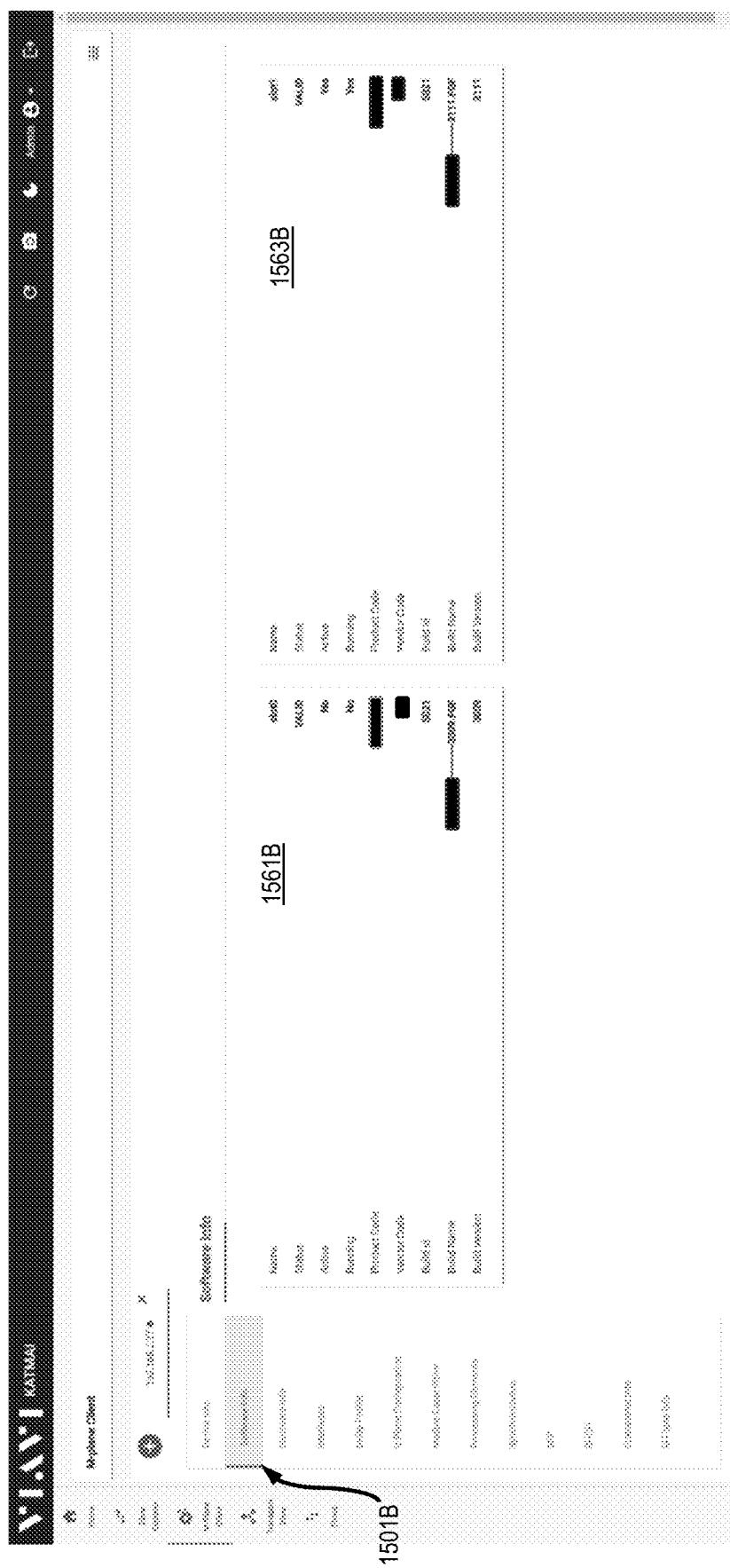

FIG. 15B is a screenshot of a visual representation on the Browser/GUI 430 illustrating a Software Info view 615B of the M-Plane Client GUI according to an example. In FIG. 15B, Software Info is selected in menu 1501B, and the software information is shown for each slot in a block 1561B (for slot0) and a block 1563B (for slot1). Generally speaking, the Software Info view 615B may relate to software information as defined and explained in Sect. 8 of the O-RAN FH M-Plane standard (such as discussed in, e.g., Sect. 8.4: Software inventory and Annex D.3: Operations folder, particularly Annex D.3.3 describing the o-ran-software-management.yang module). In some examples, the real-time O-RAN FHA/GUI 150 may obtain the software management information using an inventory request over the software-slot container from the O-RU being tested/analyzed. For each software slot (i.e., an independent storage location for a single software build), each block 1561B/1563B may include the Name (of the slot, as set by the vendor), Status (VALID/INVALID/EMPTY), Active (Yes/No or TRUE/FALSE), Running (Yes/No or TRUE/FALSE), Product Code, Vendor Code, Build Id, Build Name, and/or Build Version. In some examples, other information besides that shown in FIG. 15B may be shown, as would be understood by one of ordinary skill in the art (who may refer to, for example, the references to the O-RAN standards within this paragraph), and other forms/types of visual representation may be used.

Figure 15C:
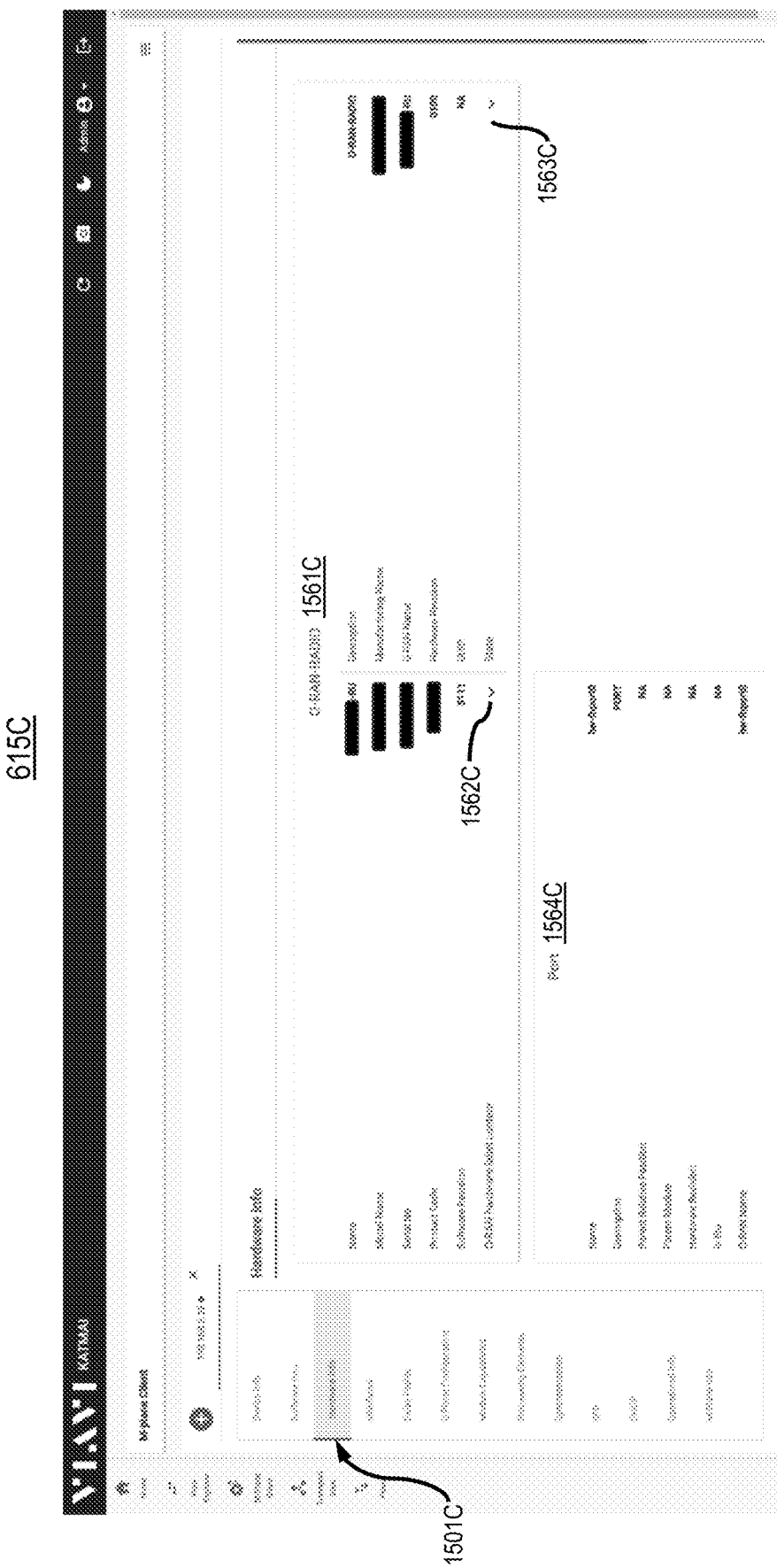

FIG. 15C is a screenshot of a visual representation on the Browser/GUI 430 illustrating a Hardware Info view 615C of the M-Plane Client GUI according to an example. In FIG. 15C, Hardware Info is selected in menu 1501C, and the O-RAN Radio information of the O-RU being tested/analyzed is shown in a block 1561C and the Port information of the O-RU being tested/analyzed in a block 1564C. Generally speaking, the Hardware Info view 615C may relate to hardware information as defined and explained in, e.g., the O-RAN FH M-Plane standard (such as discussed in, e.g., Sect. 9: Configuration management and Annex D.2: System folder, particularly Annex D.2.3 describing the o-ran-hardware.yang module). For the O-RAN Radio information, the block 1561C may include the Name, Model Name, Serial No., Product Code, Software Revision, Description, Manufacturer Name, O-RAN Name, Hardware Revision, and/or a Universally Unique Identifier (UUID). In some examples, the block 1561C may have additional information about the O-RAN hardware label content which may be shown by selecting an arrow 1562C, and additional information about the (hardware) State which may be shown by selecting an arrow 1563C. For the Port information, the block 1564C may indicate the Name, Description, Parent Relative Position, Parent Module, Hardware Revision, Is Fru, and an O-RAN Name. In some examples, other information besides that shown in FIG. 15C may be shown, as would be understood by one of ordinary skill in the art (who may refer to, for example, the references to the O-RAN standards within this paragraph), and other forms/types of visual representation may be used.

Figure 15D:

FIG. 15D is a screenshot of a visual representation on the Browser/GUI 430 illustrating an Interfaces view 615D of the M-Plane Client GUI according to an example. In FIG. 15D, Interfaces is selected in menu 1501D, and three different interface blocks 1561D, 1563D, and 1565D are shown. Generally speaking, the Interfaces view 615D may relate to the interfaces as defined and explained in, e.g., the O-RAN FH M-Plane standard (such as discussed in, e.g., Sect. 7: O-RU to O-DU interface management, including Sect. 7.1: O-RU interfaces, and Annex D.4: Interfaces folder, particularly Annex D.4.1 describing the o-ran-interfaces.yang module), which may include Ethernet, VLAN, and IP network interfaces. In some examples, the real-time O-RAN FHA/GUI 150 may obtain the specific information on the interfaces from the O-RU being tested/analyzed. Interface block 1561D corresponds to the Ethernet interface for the O-RU on the O-RAN FH link 130 (fhneth0); interface block 1563D corresponds to the VLAN interface for the O-RU on the O-RAN FH link 130 (m-vlan0); and interface block 1565D corresponds to the IP interface for the O-RU on the O-RAN FH link 130 (mplane-ip). In the Interfaces view 615D, the information listed for each interface may include Name, Type, Operating Status, Physical Address, Enabled, O-RAN Interfaces L2 MTU, O-RAN Interfaces Last Cleared, O-RAN Interfaces MAC address, and IPV4 address. In some examples, each of the interface blocks 1561D, 1563D, and 1565D may have additional information about the Interfaces Statistics (such as, e.g., throughput, packet flow, etc.) which may be shown by selecting an arrow 1567D, and additional information about the O-RAN Interfaces Port Reference (such as indicated by, e.g., the port-reference in the YANG model) which may be shown by selecting an arrow 1569D. In some examples, other information besides that shown in FIG. 15D may be shown, as would be understood by one of ordinary skill in the art (who may refer to, for example, the references to the O-RAN standards within this paragraph), and other forms/types of visual representation may be used.

Figure 15E:

FIG. 15E is a screenshot of a visual representation on the Browser/GUI 430 illustrating a Delay Profile view 615E of the M-Plane Client GUI according to an example. In FIG. 15E, Delay Profile is selected in menu 1501E, and four (4) delay profile blocks 1561E, 1563E, 1565E, and 1567E are shown. Generally speaking, the Delay Profile view 615E may relate to the delay profiles discussed and explained in, e.g., the O-RAN FH M-Plane standard (such as discussed in, e.g., Sect. 7: O-RU to O-DU interface management, including, e.g., Sect. 7.7.2: Delay Parameters, and Annex D.6: Radio folder, particularly Annex D.6.2 describing the o-ran-delay-management.yang module), which may vary based on the combination of channel bandwidth and subcarrier spacing (SCS). In some examples, the real-time O-RAN FHA/GUI 150 may obtain the specific delay profiles of the O-RU being tested/analyzed. Each of the delay profile blocks 1561E, 1563E, 1565E, and 1567E may include various parameters for different combinations of bandwidth and SCS; namely, in FIG. 15E, delay profile block 1561E is for a 20 MHz bandwidth with 15 kHz SCS, delay profile block 1563E is for 15 MHz bandwidth with 15 kHz SCS, delay profile block 1565E is for 10 MHz bandwidth and 15 kHz SCS, and delay profile block 1567E is for 5 MHz bandwidth and 15 kHz SCS-many more delay profiles are possible, as would be understood by one of ordinary skill in the art. In each of the delay profile blocks 1561E, 1563E, 1565E, and 1567E, various parameters for the C/U-Plane may be included, such as, e.g., T2a min up, T2a max up, T2a min cp dl, Tcp adv dl, Ta3 min, Ta3 max, T2a min cp ul, and/or T2a max cp ul. In some examples, other information besides that shown in FIG. 15E may be shown, as would be understood by one of ordinary skill in the art (who may refer to, for example, the references to the O-RAN standards within this paragraph), and other forms/types of visual representation may be used.

Figure 15F:
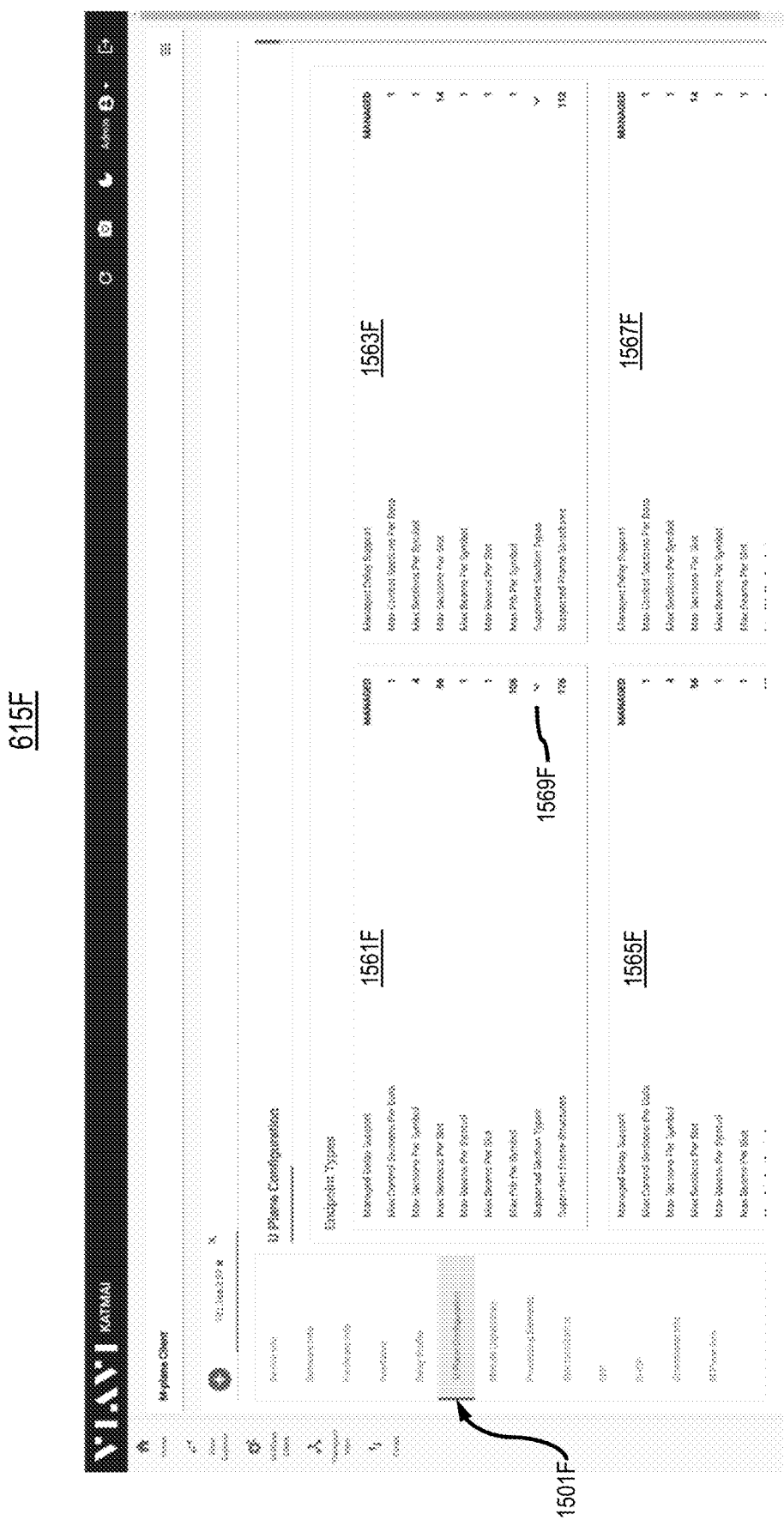

FIG. 15F is a screenshot of a visual representation on the Browser/GUI 430 illustrating a U-Plane Configuration view 615F of the M-Plane Client GUI according to an example. In FIG. 15F, U-Plane Configuration is selected in menu 1501F, and four (4) endpoint type blocks 1561F, 1563F, 1565F, and 1567F are shown. Generally speaking, the U-Plane Configuration view 615F may relate to the U-Plane configuration as described in, e.g., the O-RAN FH C/U/S-Plane standard and the O-RAN FH M-Plane standard (such as discussed in, e.g., Sect. 7: O-RU to O-DU interface management, Sect. 15: Details of O-RU operations, particularly Sect. 15.2: User plane message routing, and Annex D.3: Operations folder, particularly Annex D.3.8 describing the o-ran-uplane-config.yang module). In this context, each "endpoint" may refer to an individual antenna at the O-RU and/or a similar endpoint as further defined by beamforming and other RF transmission/reception characteristics. In some examples, each of the endpoint type blocks 1561F, 1563F, 1565F, and 1567F may include, e.g., Managed Delay Support, Max Control Sections per Data, Max Sections Per Symbol, Max Sections Per Slot, Max Beams Per Symbol, Max Beams Per Slot, Max Prb Per Symbol, and/or Supported Frame Structures. In some examples, each of the endpoint type blocks 1561F, 1563F, 1565F, and 1567F may have additional information about the Supported Section Types (that are supported by the endpoint and/or extensions supported by the endpoint) which may be shown by selecting an arrow 1569F. In some examples, other information besides that shown in FIG. 15F may be shown, as would be understood by one of ordinary skill in the art (who may refer to, for example, the references to the O-RAN standards within this paragraph), and other forms/types of visual representation may be used.

Figure 15G:

FIG. 15G is a screenshot of a visual representation on the Browser/GUI 430 illustrating a Module Capabilities view 615G of the M-Plane Client GUI according to an example. In FIG. 15G, Module Capabilities is selected in menu 1501G, and two (2) band number blocks 1561G and 1563G are shown. Generally speaking, the Module Capabilities view 615G may relate to the module capabilities as described in, e.g., the O-RAN FH M-Plane standard (such as discussed in, e.g., Annex D.6: Radio folder, and particularly Annex D.6.1 describing the o-ran-module-cap.yang module). In some examples, each band number block 1561G/1563G may correspond to a frequency band as defined under 3GPP and/or other international standards (although there are variations per standard and/or technology), as would be understood by one of ordinary skill in the art. Accordingly, band number block 1561G represents the O-RU's capabilities in band number 71, and the band number block 1563G represents the O-RU's capabilities in band number 26. In some examples, each of the band number blocks 1561G and 1563G may include, e.g., Band Number, Max Supported Frequency-dl, Min-Supported Frequency-dl, Max Supported Bandwidth-dl, Max Supported Carriers-dl, Max Carrier Bandwidth-dl, Min Carrier Bandwidth-dl, Max Supported Frequency-ul, Min-Supported Frequency-ul, Max Supported Bandwidth-ul, Max Supported Carriers-ul, Max Carrier Bandwidth-ul, Min Carrier Bandwidth-ul, Max Number Component Carriers, Max Number Bands, Max Number Sectors, and/or Max Power per Antenna. In some examples, other information besides that shown in FIG. 15G may be shown, as would be understood by one of ordinary skill in the art (who may refer to, for example, the references to the O-RAN standards within this paragraph), and other forms/types of visual representation may be used.

Figure 15H:
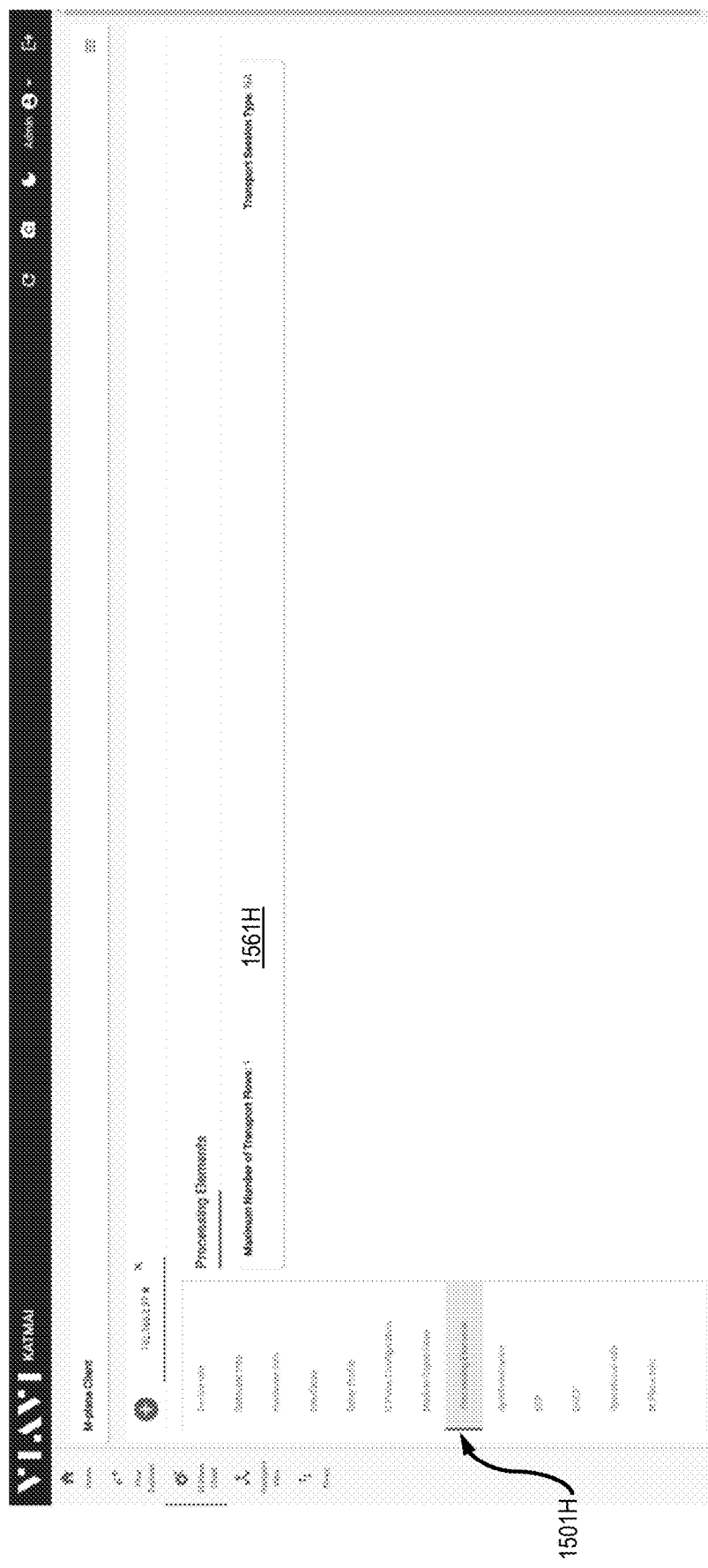

FIG. 15H is a screenshot of a visual representation on the Browser/GUI 430 illustrating a Processing Elements view 615H of the M-Plane Client GUI according to an example. In FIG. 15H, Processing Elements is selected in menu 1501H, and a processing element block 1561H is shown. Generally speaking, the Processing Elements view 615H may relate to the module capabilities as described in, e.g., the O-RAN FH M-Plane standard (such as discussed in, e.g., Sect. 7.5: Definition of processing elements, discussing the processing-elements container, Sect. 19.4.2, Annex A.1, Annex D.3 Operations folder, particularly Annex D.3.7 and D.3.8, and Annex D.4: Interfaces folder, particularly Annex D.4.2 describing the o-ran-processing-elements.yang module). Although processing element block 1561H may only show the number of transport flows, in other examples, much more information besides that shown in FIG. 15H may be shown, as would be understood by one of ordinary skill in the art (who may refer to, for example, the references to the O-RAN standards within this paragraph), and other forms/types of visual representation may be used.

Figure 15I:
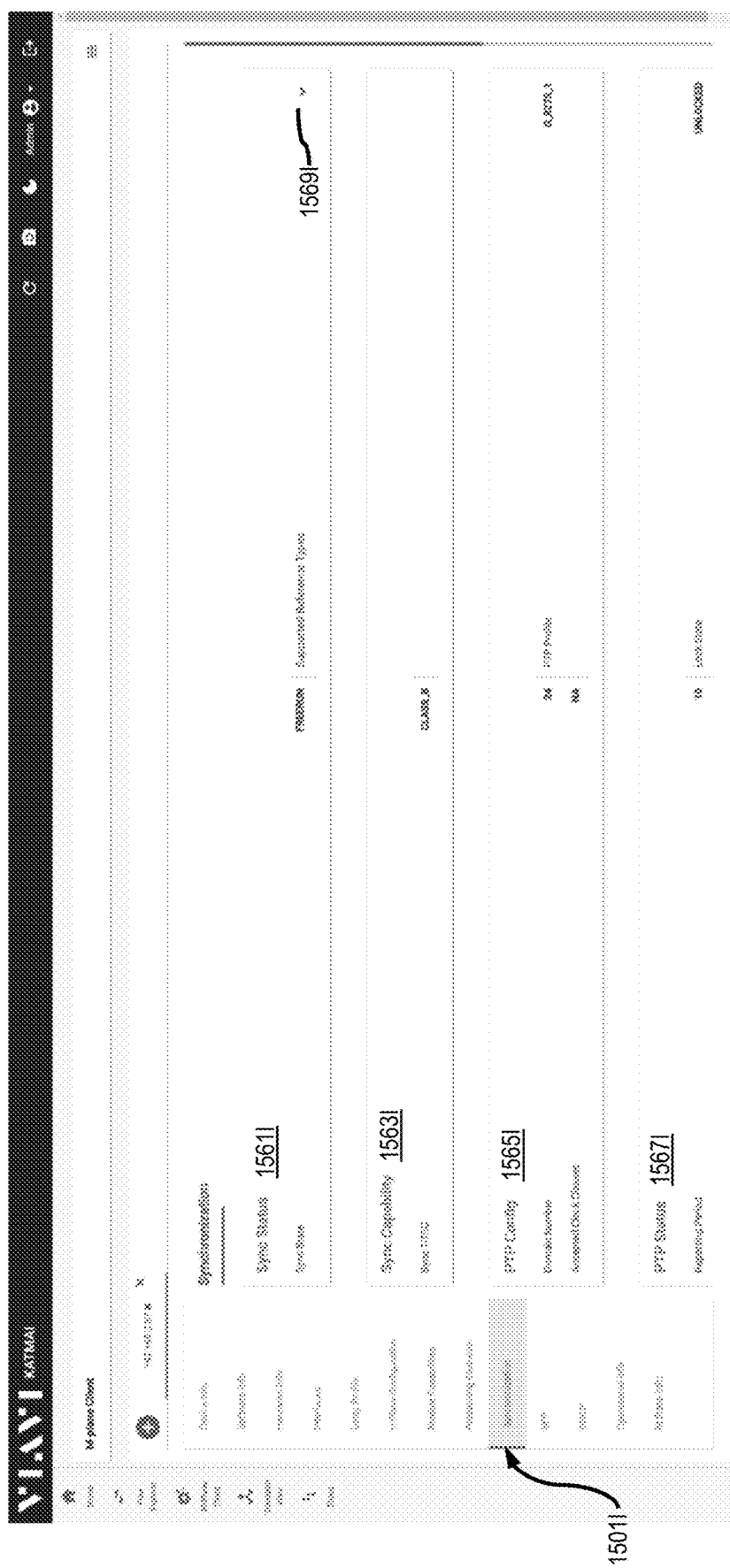

FIG. 15I is a screenshot of a visual representation on the Browser/GUI 430 illustrating a Synchronization view 6151 of the M-Plane Client GUI according to an example. In FIG. 15I, Synchronization is selected in menu 15011, and a Sync Status block 15611 shows the Sync Status, a Sync Capability block 15631 shows Sync Capability, a PTP Configuration block 15651 shows PTP Configuration, and block 15671 shows PTP status. Generally speaking, the Synchronization view 6151 may relate to the synchronization information as described in, e.g., the O-RAN FH M-Plane standard (such as discussed in, e.g., Sect. 13: Synchronization aspects and Annex D.5: Sync folder, particularly Annex D.5.1 describing the o-ran-sync.yang module). In FIG. 15I, the Sync Status block 15611 shows the Sync State; the Sync Capability block 15631 shows the Sync T-TSC, the PTP Configuration block 15651 shows the Domain Number, Accepted Clock Classes, and PTP Profile; and the PTP status block 15671 shows the Reporting Period and Lock State. In some examples, the Sync Status block 15611 may have additional information about the Supported Reference Types (as shown in the format of the o-ran-sync.yang module) which may be shown by selecting an arrow 1569I. In some examples, other information besides that shown in FIG. 15I may be shown, as would be understood by one of ordinary skill in the art (who may refer to, for example, the references to the O-RAN standards within this paragraph), and other forms/types of visual representation may be used.

Figure 15J:
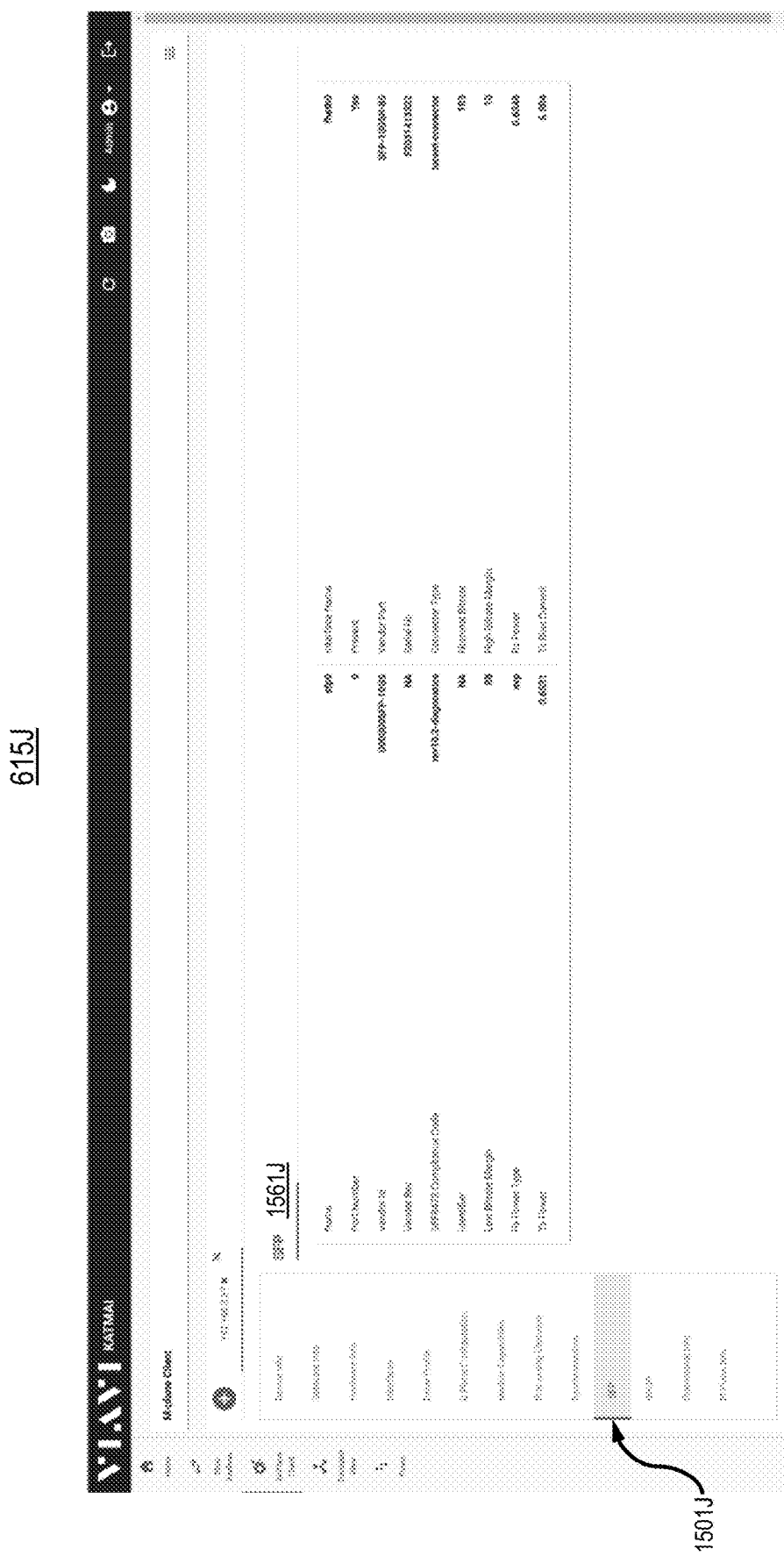

FIG. 15J is a screenshot of a visual representation on the Browser/GUI 430 illustrating an SFP view 615J of the M-Plane Client GUI according to an example. In FIG. 15J, SFP is selected in menu 1501J, and an SFP block 1561J shows information concerning the SFP of the O-RU. Generally speaking, the SFP view 615J may relate to the O-RU's fronthaul link interface information as described in, e.g., the O-RAN FH M-Plane standard (such as discussed in, e.g., Sect. 7.2: Transceiver and Annex D.4: Interfaces folder, particularly Annex D.4.3 describing the o-ran-transceiver.yang module). In some examples, the SFP block 1561J may include, e.g., the Name, Port Number, Vendor Id, Vendor Rev, SFF8472 Compliance Code, Identifier, Low Bitrate Margin, Rx Power Rx Type, Tx Power, Interface Name, Present, Vendor Part, Serial No., Connector Type, Nominal Bitrate, High Bitrate Margin, Rx Power, and/or Tx Bias Current. In some examples, other information besides that shown in FIG. 15J may be shown, as would be understood by one of ordinary skill in the art (who may refer to, for example, the references to the O-RAN standards within this paragraph), and other forms/types of visual representation may be used.

Figure 15K:
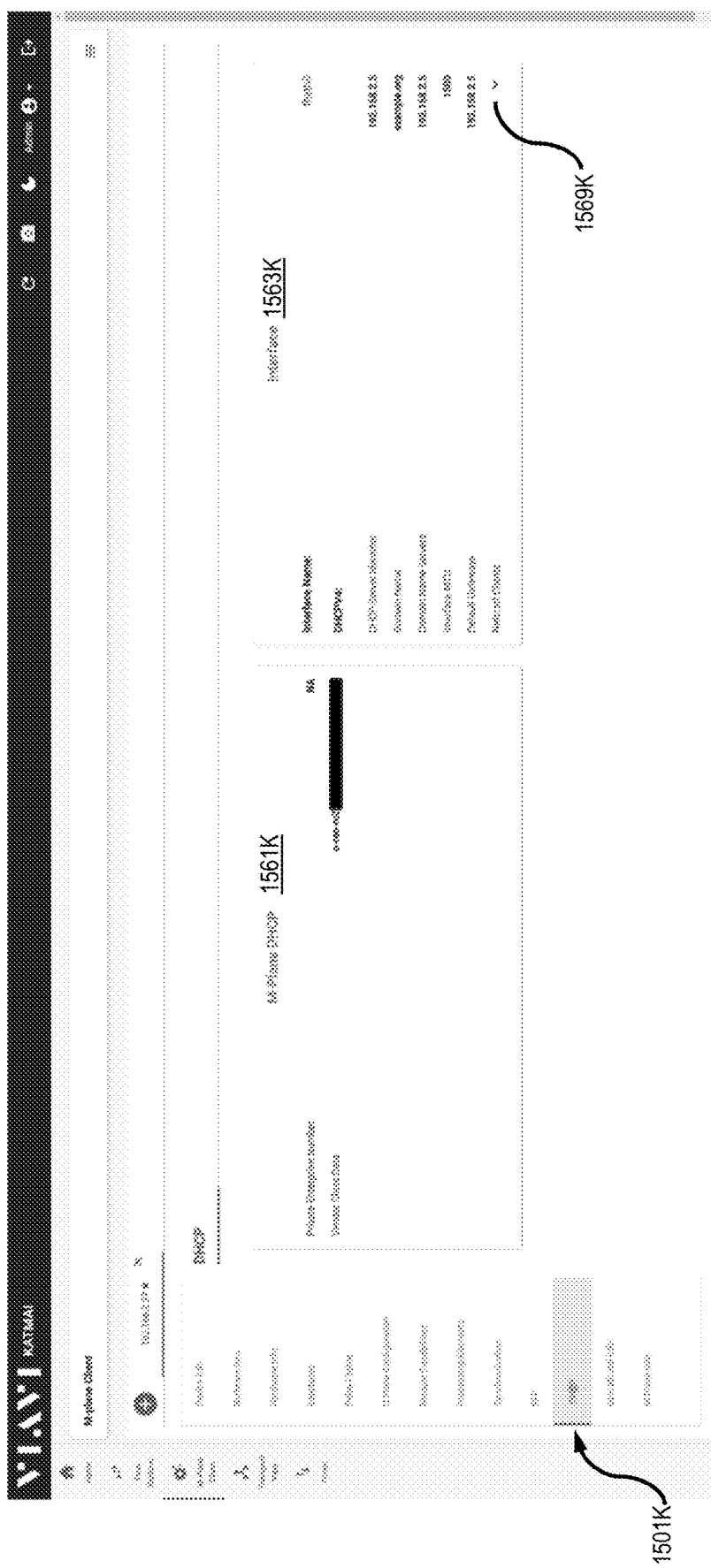

FIG. 15K is a screenshot of a visual representation on the Browser/GUI 430 illustrating a DHCP view 615K of the M-Plane Client GUI according to an example. In FIG. 15K, DHCP is selected in menu 1501K, and a M-Plane DHCP block 1561K shows information regarding the M-Plane DHCP and a DHCP Interface block 1563K shows information regarding the (DHCP) Interface. Generally speaking, the DHCP view 615K may relate to information regarding the O-RU's DHCP as described in, e.g., the O-RAN FH M-Plane standard (such as discussed in, e.g., Sect. 6.2: Management plane transport aspects, Sect. 6.3: NETCOF call home to O-RU controller(s), Sect. 6.4: NETCONF connection establishment, and Annex D.4: Interfaces folder, particularly Annex D.4.5 describing the o-ran-dhcp.yang module). In some examples, the M-Plane DHCP block 1561K may include, e.g., the Private Enterprise Number and/or Vendor Class Data, while the DHCP Interface block 1563K may include, e.g., the DHCP Server Identifier, the Domain Name, the Domain Name Servers, the Interface MTU, and/or the Default Gateways. In some examples, the DHCP Interface block 1563K may have additional information about the NETCONF Clients (as shown in the format of the o-ran-dhcp.yang module) which may be shown by selecting an arrow 1569K. In some examples, other information besides that shown in FIG. 15K may be shown, as would be understood by one of ordinary skill in the art (who may refer to, for example, the references to the O-RAN standards within this paragraph), and other forms/types of visual representation may be used.

Figure 15L:
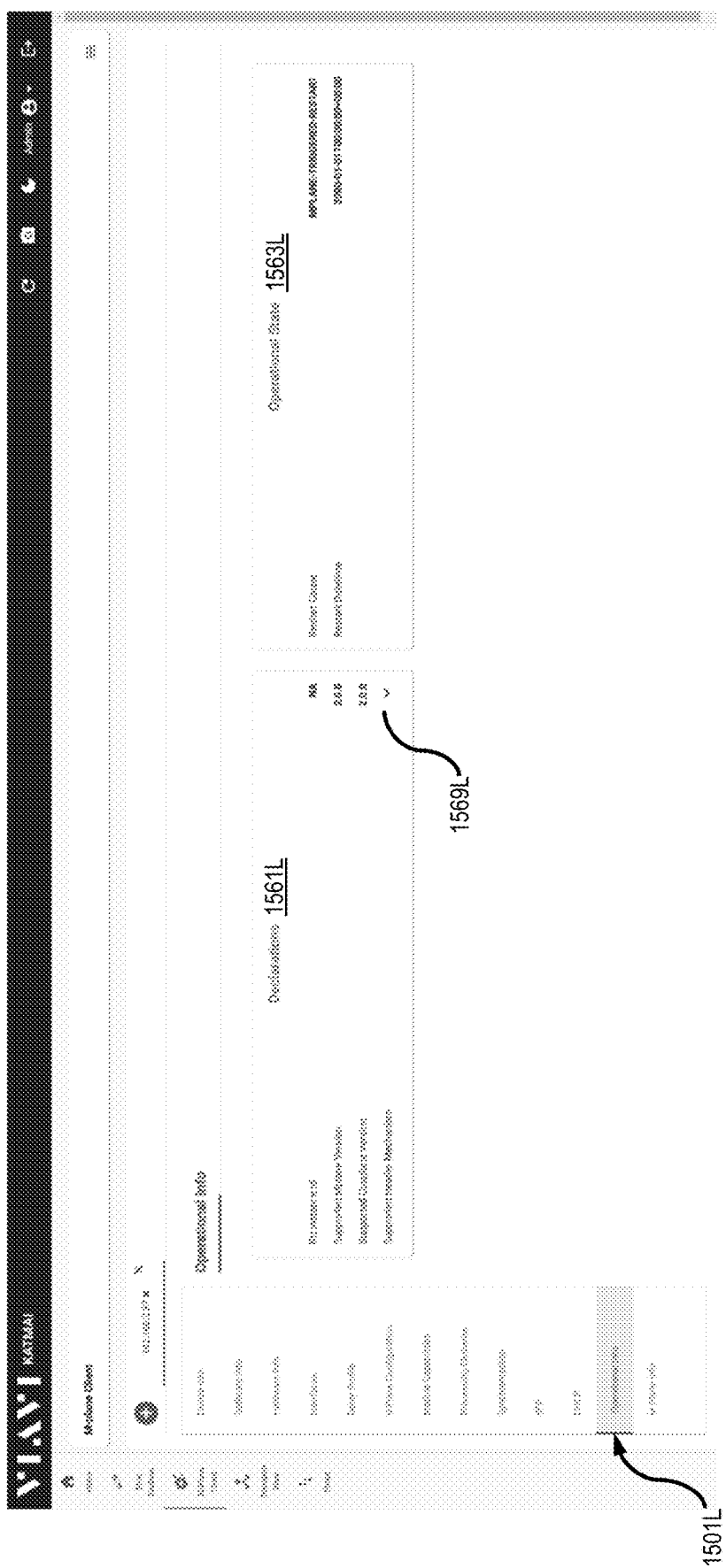

FIG. 15L is a screenshot of a visual representation on the Browser/GUI 430 illustrating an Operational Info view 615L of the M-Plane Client GUI according to an example. In FIG. 15L, Operational Info is selected in menu 1501L, and a Declarations block 1561L and an Operational State block 1563L are shown. Generally speaking, the Operational Info view 615L may relate to operational information regarding the O-RAN FH link 130 as described in, e.g., the O-RAN FH M-Plane standard (such as discussed in, e.g., Sect. 15: Details of O-RU operations, and Annex D.3: Operations folder, particularly Annex D.3.1 describing the o-ran-operations.yang module). In some examples, the Declarations block 1561L may include, e.g., the RU instance id, the Supported M-Plane Version, and/or the Supported C/U/S-Plane Version, while the Operational State block 1563L may include, e.g., the Restart Cause and/or the Restart Date/Time. In some examples, the Declarations block 1561L may have additional information about the Supported Header Mechanism(s) (as shown in the format of the o-ran-operations.yang module) which may be shown by selecting an arrow 1569L. In some examples, other information besides that shown in FIG. 15L may be shown, as would be understood by one of ordinary skill in the art (who may refer to, for example, the references to the O-RAN standards within this paragraph), and other forms/types of visual representation may be used.

Figure 15M:
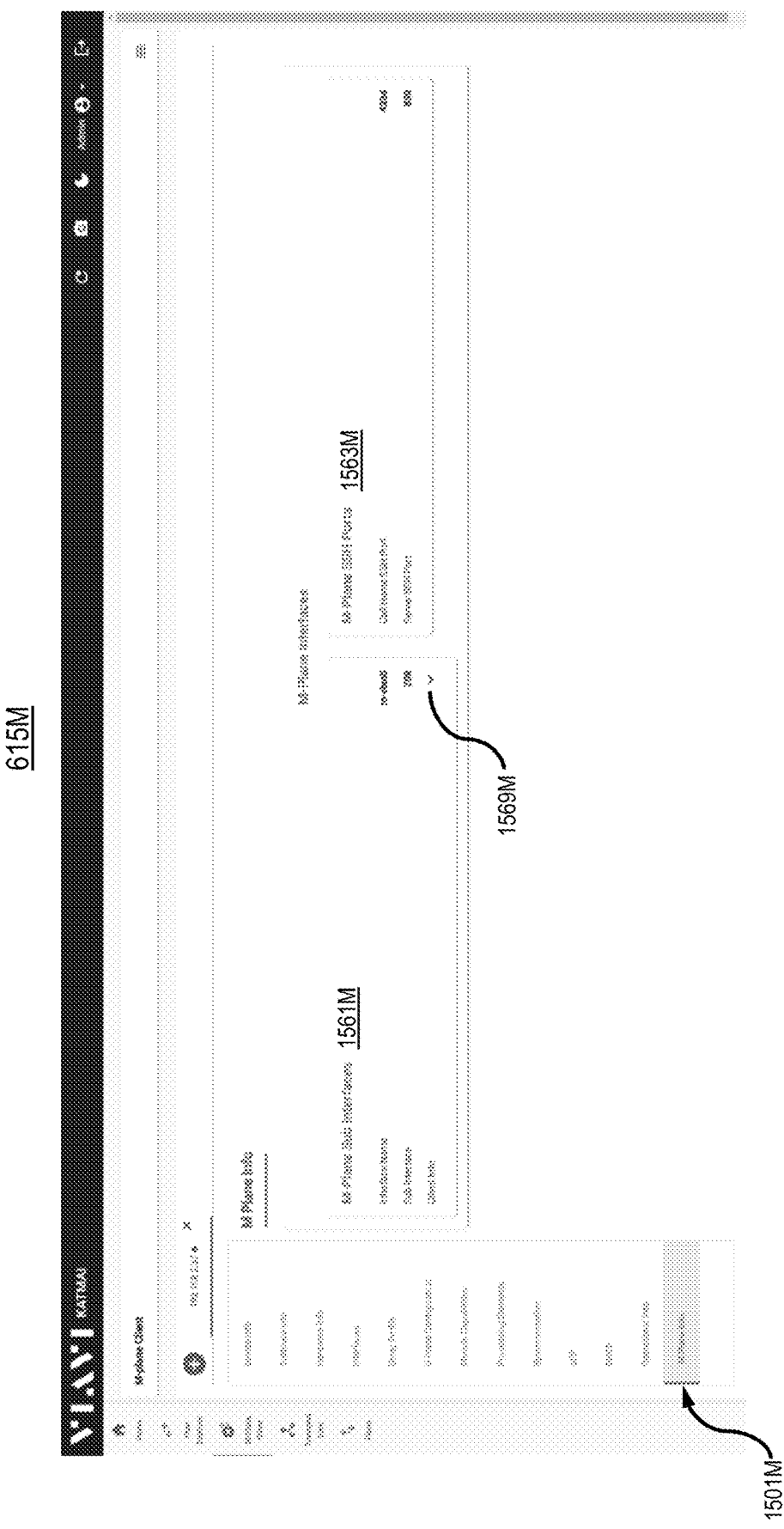

FIG. 15M is a screenshot of a visual representation on the Browser/GUI 430 illustrating an M-Plane Info view 615M of the M-Plane Client GUI according to an example. In FIG. 15M, M-Plane Info is selected in menu 1501M, and an M-Plane Sub Interfaces block 1561M and an M-Plane SSH Ports block 1563M are shown. Generally speaking, the M-Plane Info view 615M may relate to interface information regarding the M-Plane as described in, e.g., the O-RAN FH M-Plane standard (such as discussed in, e.g., Sect. 15: Details of O-RU operations, and Annex D.4: Interfaces folder, particularly Annex D.4.4 describing the o-ran-mplane-int.yang module). In some examples, the M-Plane Sub Interfaces block 1561M may include, e.g., the Interface Name and/or the Sub Interface, while the M-Plane SSH Ports block 1563M may include, e.g., the Call Home SSH Port and/or the Server SSH Port. In some examples, the M-Plane Sub Interfaces block 1561M may have additional information about the Client Info (as shown in the format of the o-ran-mplane-int.yang module) which may be shown by selecting an arrow 1569M. In some examples, other information besides that shown in FIG. 15M may be shown, as would be understood by one of ordinary skill in the art (who may refer to, for example, the references to the O-RAN standards within this paragraph), and other forms/types of visual representation may be used.

In some examples, the functionalities/applications of the O-RAN FHA SW 400, such as the Flow Explorer GUI 650 with its O-DU, O-RU, C/U-Plane, and M-Plane views as shown in FIGS. 8A-8D, the C/U-Plane Timing Analysis GUI shown in FIGS. 9A-9C, the RE Statistics GUI 610 of FIG. 10A, the S-Plane Analysis GUI 611 of FIG. 11, the Live Transport view 612 of FIG. 12, the M-Plane Analysis GUI of FIG. 13A, the Flow GUI 614 of FIG. 14, and/or the M-Plane Client GUI of FIGS. 15A-15M and may be based on received data from the O-RAN FHA HW 300 (e.g., the Flow Tracker 370 and/or any of the hardware packet analyzers 330). Using the functionalities/applications of the O-RAN FHA SW 400 such as the Flow Explorer GUI 650 with its O-DU, O-RU, C/U-Plane, and M-Plane views as shown in FIGS. 8A-8D, the C/U-Plane Timing Analysis GUI shown in FIGS. 9A-9C, the RE Statistics GUI 610 of FIG. 10A, the S-Plane Analysis GUI 611 of FIG. 11, the Live Transport view 612 of FIG. 12, the M-Plane Analysis GUI of FIG. 13A, the Flow GUI 614 of FIG. 14, and/or the M-Plane Client GUI of FIGS. 15A-15M, a user of the real-time O-RAN FHA/GUI 150 may analyze and determine whether the packet traffic flow, components, etc. of the O-RAN FH link 130 are within the specifications of the O-RAN standard. Thus, for example, when connecting an O-DU 120 of one vendor to an O-RU 140 of another vendor over the O-RAN FH link 130, a user of a real-time O-RAN FHA/GUI 150 according to examples of the present disclosure may determine if O-DU 120 and O-RU 140 are truly interoperable according to the specifications of the O-RAN standard.

As stated above, any of the GUIs, views, and screens shown in FIGS. 8A-14 may show other parameters, measurements, characteristics, and/or qualities of the O-RAN FH link 130, any O-DUs, O-RUs, and/or other components connected to the O-RAN FH link 130, any packet traffic flow on the O-RAN FH link 130, etc., as would be understood by one of ordinary skill in the art, such as, for example, the parameters, measurements, characteristics, and/or qualities in the O-RAN FH C/U/S-Plane standard, the O-RAN FH M-Plane standard, the O-RAN FH IoT standard, any other O-RAN standard, any O-RAN-related standard (such as, e.g., eCPRI; IEEE 802.3 and/or 1588; ITU G.8260, G.8261, G.8262, G.8264, G.8271, G.8272, G.8273, and/or G.8275; and 3GPP TS 36.141, 36.213, 38.133, 38.211, and/or 38.323). For example, functionalities/applications provided by examples of the present disclosure may measure, analyze, and present for visual representation any of the parameters, measurements, characteristics, and/or qualities of 5G/6G technology, such as, e.g., PKIs, numerology, beamforming, Multiple Input Multiple Output (MIMO), etc., as would be understood by one of ordinary skill in the art.

Figure 16:
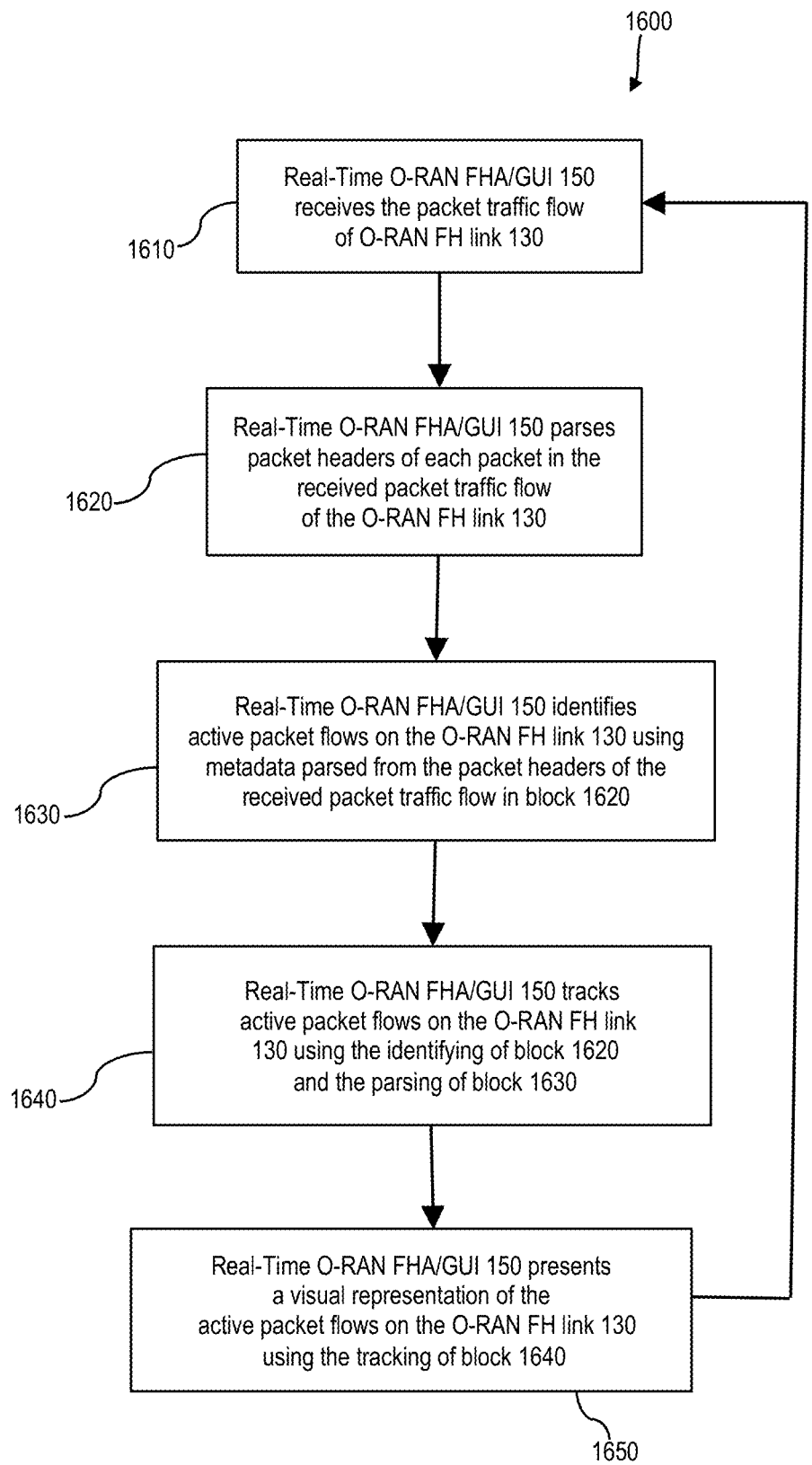
FIG. 16 illustrates a flowchart of a method for analyzing packet flow traffic on an O-RAN FH link by a real-time O-RAN FHA/GUI, according to an example.

FIG. 16 illustrates a flowchart of a method for analyzing packet flow traffic on the O-RAN FH link 130 according to an example. A method 1600 shown in FIG. 16 is provided by way of example and may only be one part of an entire process, as would be understood by one of ordinary skill in the art. The method 1600 may further omit parts of any process, procedure, ongoing operation, method, etc., involved in O-RAN FH link 130 analysis not germane to examples of the present disclosure, as would be understood by one of ordinary skill in the art. Each block shown in FIG. 16 may further represent one or more steps, processes, methods, or subroutines, as would be understood by one of ordinary skill in the art. In some examples, the processes in the blocks of FIG. 16 may overlap and/or may occur substantially simultaneously. For the sake of convenience and ease of explanation, the blocks in FIG. 16 may refer to the components shown in the other figures described herein; however, the method 1600 is not limited in any way to the components, apparatuses, and/or constructions described and/or shown in any of the other figures herein.

At block 1610, a real-time O-RAN FHA/GUI 150 according to an example of the present disclosure may receive the packet traffic flow of the O-RAN FH link 130 (or "the OFH packet traffic flow"). In some examples, the O-RAN FHA HW 300 of the real-time O-RAN FHA/GUI 150 receives the packet flow traffic from the O-DU 120 and the O-RU 140 via the inputs 305.

At block 1620, the real-time O-RAN FHA/GUI 150 may parse packet headers of each packet in the received packet traffic flow of the O-RAN FH link 130. In some examples, the Parser 320 of the O-RAN FHA HW 300 may parse metadata from the packets in the received packet traffic flow of the O-RAN FH link 130.

At block 1630, the real-time O-RAN FHA/GUI 150 may identify active packet flows on the O-RAN FH link 130 using metadata parsed from the packet headers of the received packet traffic flow in block 1620. In some examples, the real-time O-RAN FHA/GUI 150 may identify packet flows according to the communication plane (i.e., the C-, U-, S-, and M-Planes), packet type, traffic direction (e.g., UL or DL), and/or other suitable indicia, as would be understood by one of ordinary skill in the art. In some examples, the Flow Tracker 370 of the O-RAN FHA HW 300 may recognize and identify specific packet flows by the parsed metadata, such as, e.g., the source address, the destination address, the MAC address (such as, e.g., the Ethernet MAC address, the IP MAC address, etc.), the VLAN tag and ID, the EtherType, the eCPRI Message Type, the eAxC ID, data direction, source IP address, destination IP address, and/or one or more other unique indicia (including, e.g., an arbitrarily assigned hash value), as would be understood by one of ordinary skill in the art.

At block 1640, the real-time O-RAN FHA/GUI 150 may track active packet flows on the O-RAN FH link 130 using the identifying of block 1620 and the parsing of block 1630. In some examples, the Flow Tracker 370 of the O-RAN FHA HW 300 may track active packet flows by (i) entering and initializing newly recognized/identified active packet flows for tracking, (ii) maintaining/updating statistics/tracking data for existing packet active flows with real-time metadata received from the Parser 320 (such as, for example, packet type, traffic direction, etc., and/or calculated data from added timing information); and (iii) deleting/dropping inactive and/or stopped packet flows when those packet flows cease. In some examples, components of the O-RAN FHA SW 400 may keep track of which flows are "live" or "active" by recording (and/or monitoring) the added timing information, i.e., the timestamp of the last time a flow was detected and/or reported by the Flow Tracker 370, and comparing the current time with the last recorded timestamp. In such examples, the deleting/dropping of inactive and/or stopped packet flows may be implemented as part of the next block, 1650, rather than in this block. In some examples, the real-time O-RAN FHA/GUI 150 may provide a unique indicia for each active packet flow, such as, for example, an arbitrarily generated hash value.

At block 1650, the real-time O-RAN FHA/GUI 150 may present a visual representation of the tracked active packet flows based on the tracking in block 1640. In some examples, the Browser/GUI 430 of the O-RAN FHA SW 400 may present the visual representation of the tracked active packet flows using, for example, the Flow Explorer GUI of FIGS. 6A-E, the C/U-Plane Timing Analyzer GUI of FIGS. 9A, 9B, and 9C, and/or the method for analyzing packet flow traffic and presenting a visual representation described in reference to FIG. 5. In some examples, the Browser/GUI 430 of the O-RAN FHA SW 400 may use an API to query, access, and/or generate appropriate data for the presented visual presentation using one or more MFEs in the MFE layer 420, one or more services in Service layer 410, and components in the O-RAN FHA HW 300, such as, e.g., the Flow Tracker 370 and/or one or more hardware packet analyzers 330. In some examples, the O-RAN FHA SW 400 may retrieve the real-time data for the visual representation periodically or continuously from the O-RAN FHA HW 300. In some examples, the presented visual presentation may include, for one or more of any entity involved in the O-RAN FH link 130 (such as, O-DU 120, O-RU 140, etc.), for example, the current reception bandwidth, the current transmission bandwidth, the transmission bandwidth usage, the reception bandwidth usage, and/or current analytical measurements concerning the early, late, and/or on-time downlink U-Plane packets, the early, late, and/or on-time uplink U-Plane packets, the early, late, and/or on-time uplink C-Plane packets, and/or any other timing parameters concerning any other packet type.

As mentioned above and indicated by the arrow from block 1650 back to block 1610 in FIG. 16, blocks 1610, 1620, 1630, 1640, and 1650 may be continuously performed (and thus be performed roughly/approximately simultaneously as well). In some examples, blocks 1610, 1620, 1630, and 1640 may be continuously performed roughly/approximately simultaneously in real-time by components in the O-RAN FHA HW 300, while the O-RAN FHA SW 400 continuously performs block 1650 roughly/approximately in near-real-time, using data generated by the O-RAN FHA HW 300 in blocks 1610-1640. Accordingly, a user of the real-time O-RAN FHA/GUI 150 according to examples of the present disclosure may use the presented visual representation of the active packet flows from block 1650 of FIG. 16 to validate operability/interoperability of the O-RAN FH link 130. As discussed above, in some examples, the presented visual representation may include, for example, any of the Flow Explorer GUI 650 with its O-DU, O-RU, C/U-Plane, and M-Plane views as shown in FIGS. 8A-8D, the C/U-Plane Timing Analysis GUI shown in FIGS. 9A-9C, the RE Statistics GUI 610 of FIG. 10A, the S-Plane Analysis GUI 611 of FIG. 11, the Live Transport view 612 of FIG. 12, the M-Plane Analysis GUI of FIG. 13A, the Flow GUI 614 of FIG. 14, and/or the M-Plane Client GUI of FIGS. 15A-15M and may be based on received data from the O-RAN FHA HW 300 (e.g., the Flow Tracker 370 and/or any of the hardware packet analyzers 330). In some examples, the presented visual representation may help the user validate the operability/interoperability of the O-RAN FH link 130, its O-DUs 120, and its O-RUs 140. In such examples, the presented visual representation may help the user determine if the O-RAN FH link 130 may support a sufficient number of flows for user equipment to communicate with the O-DUs 120 (and thereby connect to the core network).

In some examples, as discussed above, the presented visual representation in block 1650 of FIG. 16 may include, e.g., a visual representation of a transmission window and/or a reception window of packets on any one or more of the C-, U-, S-, and M-Planes; a visual representation at least one of resource allocation or resource utilization per at least one of the O-DU 120, the O-RU 140, and one or more of the active packet flows; a visual representation of Physical Resource Block (PRB) allocation and/or utilization per at least one of the O-DU 120, the O-RU 140, and one or more of the active packet flows; a visual representation of any O-RU 140 connected to any O-DU 120 over the O-RAN FH link 130; and/or a visual representation of usage of extended Antenna-Carriers (eAxC), MIMO, beam-forming, and/or numerology per each O-RU 140 and/or each eAxC Id. In some examples, the presented visual representation in block 1650 of FIG. 16 may include, e.g., any current analytical timing measurements of at least one of a communication plane, a packet type, a traffic direction, an O-RU, an O-DU on the O-RAN FH link 130, an active flow (such as, e.g., statistics/data on early, late, and/or on-time downlink U-plane packets; early, late, and/or on-time uplink U-plane packets; and/or early, late, and/or on-time uplink C-plane packets), and/or the like, as would be understood by one of ordinary skill in the art. In some examples, the presented visual representation may be generated by the O-RAN FHA SW 400 using, at least in part, received data from the O-RAN FHA HW 300 (e.g., the Flow Tracker 370 and/or any of the hardware packet analyzers 330).

In some examples, as discussed above, the O-RAN FHA HW 300 may add a timestamp to each packet of the OFH packet traffic flow, parse metadata from each packet of the OFH packet traffic flow, analyze a plurality of packets in the OFH packet traffic flow using the added timestamp and parsed metadata, and continuously generate one or more analytical timing measurements of the OFH packet traffic flow based on the analyzing, while the O-RAN FHA SW 400 may present a visual representation of the OFH packet traffic flow using the one or more analytical timing measurements being continuously generated by the O-RAN FHA HW 300, where the one or more analytical timing measurements comprise at least one parameter, measurement, quantity, or quality discussed in any O-RAN standard. In some examples, as discussed above, the O-RAN FHA SW 400 may receive user input identifying analytical timing measurements for at least one of an active flow, a communication plane, a packet type, a traffic direction, an O-RU, or an O-DU on the O-RAN FH link 130; the O-RAN FHA HW 300 may perform the identified analytical timing measurements, provided by the O-RAN FHA SW 400; and the O-RAN FHA SW 400 may present a visual representation of the performed identified analytical timing measurements. In some examples, these one or more analytical timing measurements are current analytical timing measurements, i.e., continuously generated and presented to the user in near-real-time.

Figure 17:
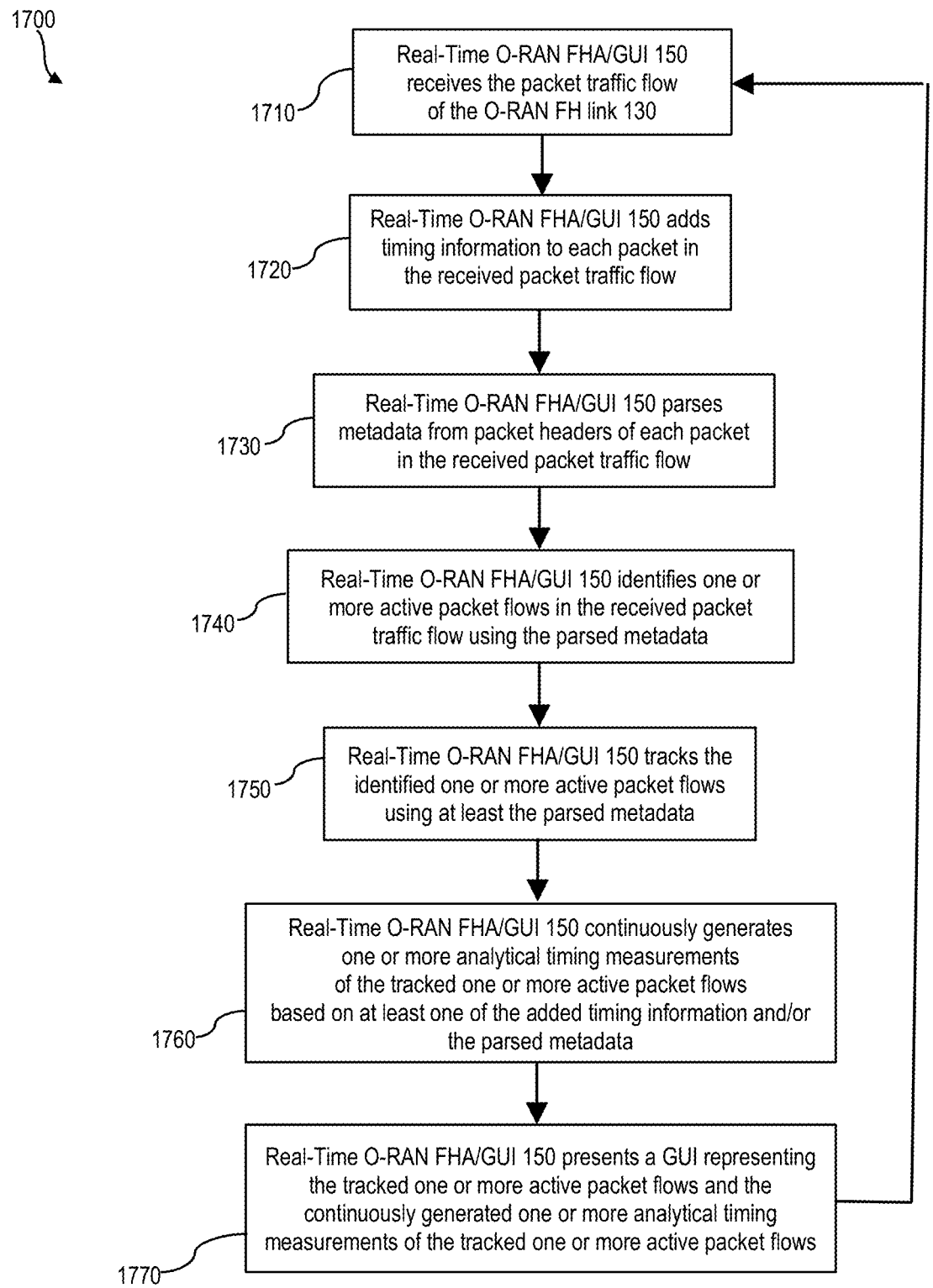
FIG. 17 illustrates a flowchart of another method for analyzing packet flow traffic on the O-RAN FH link a real-time O-RAN FHA/GUI, according to an example.

FIG. 17 illustrates a flowchart of another method for analyzing packet flow traffic on the O-RAN FH link 130 according to an example. A method 1700 shown in FIG. 17 is provided by way of example and may only be one part of an entire process, as would be understood by one of ordinary skill in the art. The method 1700 may further omit parts of any process, procedure, ongoing operation, method, etc., involved in the O-RAN FH link 130 analysis not germane to examples of the present disclosure, as would be understood by one of ordinary skill in the art. Each block shown in FIG. 17 may further represent one or more steps, processes, methods, or subroutines, as would be understood by one of ordinary skill in the art. In some examples, the processes in the blocks of FIG. 17 may overlap and/or may occur substantially simultaneously. For the sake of convenience and ease of explanation, the blocks in FIG. 17 may refer to the components shown in the other figures described herein; however, the method 1700 is not limited in any way to the components, apparatuses, and/or constructions described and/or shown in any of the other figures herein.

At block 1710, the real-time O-RAN FHA/GUI 150 according to an example of the present disclosure may receive the packet traffic flow of the O-RAN FH link 130 (or "the OFH packet traffic flow"). In some examples, the O-RAN FHA HW 300 of the real-time O-RAN FHA/GUI 150 receives the packet flow traffic from the O-DU 120 and the O-RU 140 via the inputs 305.

At block 1720, the real-time O-RAN FHA/GUI 150 may add timing information to each packet of the received OFH packet traffic flow. In some examples, the added timing information may be the timestamps added by the MAC receivers 307 to all of the packets in the O-DU 120 packet flow and the O-RU 140 packet flow using the timing clock signal from the Counter 360.

At block 1730, the real-time O-RAN FHA/GUI 150 may parse metadata from the packet headers of each packet in the received OFH packet traffic flow. In some examples, the Arbiter 310 may first combine the timestamped packets from the MAC receivers 307 into a single stream before the Parser 320 parses metadata from the packets in the single stream. The Parser 320 may then send that metadata to the Flow Tracker 370, which tracks the various flows on the O-RAN FH link 130 in real-time, while also routing the parsed packets to various components on the O-RAN FHA HW 300, including the Counter 360, the hardware packet analyzers 330 (such as, e.g., the Window Estimation hardware packet analyzer 330-A), and the HW/SW interface 390 (for further processing by the O-RAN FHA SW 400).

At block 1740, the real-time O-RAN FHA/GUI 150 may identify active packet flows on the O-RAN FH link 130 using metadata parsed from the packet headers of the received packet traffic flow in block 1730. In some examples, the real-time O-RAN FHA/GUI 150 may identify packet flows according to the communication plane (i.e., the C-, U-, S-, and M-Planes), packet type, traffic direction (e.g., UL or DL), and/or other suitable indicia, as would be understood by one of ordinary skill in the art. In some examples, the Flow Tracker 370 of the O-RAN FHA HW 300 may recognize and identify specific packet flows by the parsed metadata, such as, e.g., the source address, the destination address, the MAC address (such as, e.g., the Ethernet MAC address, the IP MAC address, etc.), the VLAN tag and ID, the EtherType, the eCPRI Message Type, the eAxC ID, data direction, source IP address, destination IP address, and/or one or more other unique indicia (including, e.g., an arbitrarily assigned hash value), as would be understood by one of ordinary skill in the art.

At block 1750, the real-time O-RAN FHA/GUI 150 may track the identified active packet flows on the O-RAN FH link 130 using at least the parsing of block 1730. In some examples, the Flow Tracker 370 of the O-RAN FHA HW 300 may track active packet flows by (i) entering and initializing newly recognized/identified active packet flows for tracking, (ii) maintaining/updating statistics/tracking data for existing packet active flows with real-time metadata received from the Parser 320 (such as, for example, packet type, traffic direction, etc., and/or calculated data from, e.g., the added timing information from block 1720); and (iii) deleting/dropping inactive and/or stopped packet flows when those packet flows cease. In some examples, some of these functions may be performed in the O-RAN FHA SW 400. In some examples, the real-time O-RAN FHA/GUI 150 may track the identified active packet flows on the O-RAN FH link 130 also using the added timing information of block 1720. In some examples, the real-time O-RAN FHA/GUI 150 may provide a unique indicia for each active packet flow, such as, for example, an arbitrarily generated hash value.

At block 1760, the real-time O-RAN FHA/GUI 150 may continuously generate one or more analytical timing measurements of the tracked one or more active packet flows using at least one of the added timing information from block 1720 and/or the parsed metadata from block 1730. In some examples, any one or more of the Flow Tracker 370, the Counter 360, the hardware packet analyzers 330, and/or another component on the O-RAN FHA HW 300 may perform the analysis. Unlike an FHA which captures and then analyzes the captured packet traffic flow of the O-RAN FH link 130, a real-time O-RAN FHA/GUI 150 according to examples of the present disclosure may continuously perform and generate analytical timing measurements in real-time in hardware, thereby providing "live" analytical timing measurements representing the current state of the packet traffic flow on the O-RAN FH link 130, and reflecting changes in the conditions/characteristics of the packet traffic flow on the O-RAN FH link 130 as those changes happen. In some examples, the real-time O-RAN FHA/GUI 150 may use only the parsed metadata to continuously generate the analytical timing measurements, such as where the Flow Tracker 370 may track active packet flows in the received OFH packet traffic flow with only the parsed metadata without necessarily relying on the added timestamps.

At block 1770, the real-time O-RAN FHA/GUI 150 may present a GUI representing the tracked one or more active packet flows and the continuously generated one or more analytical timing measurements of the tracked one or more active packet flows. In some examples, the presented visual representation may include, for example, the O-DU view 608A in FIG. 8A of the Flow Explorer GUI 650, the O-RU view 608B of FIG. 8B of the Flow Explorer GUI 650, the C/U-Plane view 608C of FIG. 8C of the Flow Explorer GUI 650, the S-Plane view 608D of FIG. 8D of the Flow Explorer GUI 650, the O-DU view 609A in FIG. 9A of the C/U-Plane Timing Analysis GUI, the O-RU view 609B in FIG. 9B of the C/U-Plane Timing Analysis GUI, the RE Statistics GUI 610 of FIG. 10A, the S-Plane Analysis GUI 611 of FIG. 11, the Live Transport view 612 of FIG. 12, the M-Plane Analysis GUI of FIG. 13A, the Flow GUI 614 of FIG. 14, and/or the M-Plane Client GUI of FIGS. 15A-15M. In some examples, the presented visual presentation may include, for one or more of any entity involved in the O-RAN FH link 130 (such as, O-DU 120, O-RU 140, etc.), for example, the current reception bandwidth, the current transmission bandwidth, the transmission bandwidth usage, the reception bandwidth usage, and/or current analytical measurements concerning the early, late, and/or on-time downlink U-Plane packets, the early, late, and/or on-time uplink U-Plane packets, the early, late, and/or on-time uplink C-Plane packets, and/or any other timing parameters concerning any other packet type. In some examples, current analytical timing measurements are continuously generated and presented to the user in near-real-time. In some examples, the presented visual representation may be generated by the O-RAN FHA SW 400 using, at least in part, received data from the O-RAN FHA HW 300 (e.g., the Flow Tracker 370 and/or any of the hardware packet analyzers 330).

As mentioned above and indicated by the arrow from block 1770 back to block 1710 in FIG. 17, blocks 1710, 1720, 1730, 1740, 1750, 1760, and 1770 may be continuously performed (and thus may be performed roughly/approximately simultaneously as well). In some examples, blocks 1710, 1720, 1730, 1740, 1750, and 1760 may be continuously performed roughly/approximately simultaneously in real-time by components in the O-RAN FHA HW 300, while the O-RAN FHA SW 400 continuously performs block 1770 roughly/approximately in near-real-time, using data generated by the O-RAN FHA HW 300 in blocks 1710-1760. Accordingly, a user of the real-time O-RAN FHA/GUI 150 according to examples of the present disclosure may use the GUI representing the active packet flows and the continuously generated analytical timing measurements of the tracked active packet flows from block 1770 of FIG. 17 to validate operability/interoperability of the O-RAN FH link 130. As discussed above, in some examples, the GUI may include, for example, any of the Flow Explorer GUI 650 with its O-DU, O-RU, C/U-Plane, and M-Plane views as shown in FIGS. 8A-8D, the C/U-Plane Timing Analysis GUI shown in FIGS. 9A-9C, the RE Statistics GUI 610 of FIG. 10A, the S-Plane Analysis GUI 611 of FIG. 11, the Live Transport view 612 of FIG. 12, the M-Plane Analysis GUI of FIG. 13A, the Flow GUI 614 of FIG. 14, and/or the M-Plane Client GUI of FIGS. 15A-15M. In some examples, the GUI may help the user validate the operability/interoperability of the O-RAN FH link 130, its O-DUs 120, and/or its O-RUs 140. In such examples, GUI may help the user determine if the O-RAN FH link 130 may support a sufficient number of flows for user equipment to communicate with the O-DUs 120 (and thereby connect to the core network).

In some examples, a user of the real-time O-RAN FHA/GUI 150 may provide user input to select one or more selectable parameters which may affect the analytical timing measurements which are continuously generated in block 1760 and/or the visual representation viewed in block 1770. As discussed in reference to the examples described above, such selectable parameters may include, for example, packet type, a source, a destination, a traffic direction, current reception bandwidth, current transmission bandwidth, and/or one of the one or more analytical timing measurements.

In some examples, the user may provide user input to select the one or more selectable parameters by selecting a particular view from the Browser/GUI 430. For example, when the user navigates to the O-DU view 608A in FIG. 8A of the Flow Explorer GUI 650, the user has effectively selected the O-DU as the selectable parameter, and thus the O-DU view 608A shows the current transmission/reception bandwidth of the O-DU, the transmission/reception bandwidth usage of the O-DU over time, identifications of each O-RU presently connected to the O-DU, a breakdown of transmission/reception bandwidth of each connected O-RU, etc. As another example, when the user navigates to the O-RU view 608B of FIG. 8B of the Flow Explorer GUI 650, the user has effectively selected the O-RU as the selectable parameter, and thus the O-RU view 608B shows identifying indicia of the O-RU (e.g. the Ethernet MAC address, the IP address, the VLAN C/U Plane, and VLAN M-Plane of the O-RU), the current transmission bandwidth, the current reception bandwidth, the transmission/reception bandwidth usage of the O-RU over time, etc.

As another example, when the user navigates to the O-DU view 609A in FIG. 9A of the C/U-Plane Timing Analysis GUI, the user has effectively selected the C/U-Plane and the O-DU as the selectable parameters, and thus the O-DU view 609A shows current analytical timing measurements of early, late, and on-time downlink C-Plane packets, uplink C-Plane packets, and downlink U-Plane packets, etc. As another example, when the user navigates to the O-RU view 609B in FIG. 9B of the C/U-Plane Timing Analysis GUI, the user has effectively selected the C/U-Plane and the O-RU as the selectable parameters, and thus the O-RU view 609B shows current analytical timing measurements of early, late, and on-time uplink U-Plane packets and of early, late, and on-time downlink U-Plane packets, etc. In other examples, such current analytical timing measurements may include, e.g., statistics/data concerning early, late, and on-time uplink C-Plane packets, etc., as would be understood by one of ordinary skill in the art.

While specific circuit configurations such as the arrangements of a number of components are shown in conjunction with the figures herein, the illustrated configurations are not intended to be limiting. A real-time O-RAN FHA/GUI 150 in accordance with examples of the present disclosure may be implemented with other configurations and component values using the principles described herein. Moreover, while examples described herein are directed to configurations as shown, it should be appreciated that any of the components described or mentioned herein may be altered, changed, replaced, or modified, in size, shape, and numbers, or material, depending on application or use case, and adjusted for desired analysis or optimal measurement results.

It should be appreciated that the apparatuses, systems, and methods described herein may minimize and/or reduce the timing for performing O-RAN FH link 130 analysis, and thereby facilitate the construction of a more reliable and accurate O-RAN FH link 130, specifically by ensuring the interoperability of different components manufactured by different vendors.

It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the O-RAN FH link 130, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Generally speaking, any one or more of the components and/or functionalities described in reference to any of the figures herein may be implemented by hardware, software, and/or any combination thereof, as described in the above examples of the present disclosure. In some examples, the components and/or functionalities may be implemented by at least one of any type of application, program, library, script, task, service, process, or any type or form of executable instructions executed on hardware such as circuitry that may include digital and/or analog elements (e.g., one or more transistors, logic gates, registers, memory devices, resistive elements, conductive elements, capacitive elements, and/or the like, as would be understood by one of ordinary skill in the art). In some examples, the hardware and data processing components used to implement the various processes, operations, logic, and circuitry described in connection with the examples described herein may be implemented with a general purpose single- and/or multi-chip processor, a single- and/or multi-core processor, a digital signal processor (DSP), an application specific integrated circuit (ASIC), a field programmable gate array (FPGA), or other programmable logic device, discrete gate or transistor logic, discrete hardware components, and/or any combination thereof suitable to perform the functions described herein. A general purpose processor may be any conventional processor, microprocessor, controller, microcontroller, and/or state machine. In some examples, the memory/storage may include one or more components (e.g., random access memory (RAM), read-only memory (ROM), flash or solid state memory, hard disk storage, etc.) for storing data and/or computer-executable instructions for completing and/or facilitating the processing and storage functions described herein. In some examples, the memory/storage may be volatile and/or non-volatile memory, and may include database components, object code components, script components, or any other type of information structure suitable for implementing the various activities and storage functions described herein.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method of analyzing an Open Radio Access Network (O-RAN) fronthaul (OFH) link between an O-RAN Distributed Unit (O-DU) and an O-RAN Radio Unit (O-RU), comprising:
   receiving an OFH packet traffic flow from the O-DU and the O-RU;
   adding timing information to each packet of the OFH packet traffic flow;
   parsing metadata from packet headers of the OFH packet traffic flow;
   identifying one or more active packet flows in the OFH packet traffic flow using the parsed metadata;
   tracking the identified one or more active packet flows using the parsed metadata;
   continuously generating one or more analytical timing measurements of the tracked one or more active packet flows based on the parsing and the added timing information;
   receiving user input selecting at least one selectable parameter, wherein a selectable parameter comprises at least one of the O-DU, the O-RU, a type of packet, a communication plane, a source, a destination, a traffic direction, or at least one of the one or more analytical timing measurements,
      wherein receiving user input comprises receiving user input selecting at least one selectable parameter comprising the O-DU; and
   presenting, using the selected at least one selectable parameter, a visual representation of the tracked one or more active packet flows and the continuously generated one or more analytical timing measurements of the tracked one or more active packet flows,
   wherein the presented visual representation comprises a graphical user interface (GUI) showing a current transmission bandwidth of the O-DU and at least one of current reception bandwidth of the O-DU, transmission bandwidth usage of the O-DU over time, reception bandwidth usage of the O-DU over time, or an identification of each O-RU presently connected to the O-DU.

2. The method of claim 1, wherein the GUI shows, for each of the tracked one or more active packet flows, at least one of a source, a destination, a packet type, a traffic direction, or a unique indicia to identify each of the tracked one or more active packet flows.

3. The method of claim 2, wherein the unique indicia comprises a hash value.

4. The method of claim 1, wherein receiving user input comprises receiving user input selecting the at least one selectable parameter comprising the O-RU, and
   wherein the presented visual representation comprises a graphical user interface (GUI) showing at least one of current transmission bandwidth of the O-RU, current reception bandwidth of the O-RU, transmission bandwidth usage of the O-RU over time, or reception bandwidth usage of the O-RU over time.

5. The method of claim 1, wherein receiving user input comprises receiving user input selecting the at least one selectable parameter comprising a Control Plane (C-Plane) active packet flow, a User Plane (U-Plane) active packet flow, and the O-DU, and
   wherein the presented visual presentation comprises a graphical user interface (GUI) showing at least one of current analytical timing measurements of early, late, and on-time downlink C-Plane packets, current analytical timing measurements of early, late, and on-time uplink C-Plane packets, or current analytical timing measurements of early, late, and on-time downlink U-Plane packets.

6. The method of claim 1, wherein receiving user input comprises receiving user input selecting the at least one selectable parameter comprising a Control Plane (C-Plane) active packet flow, a User Plane (U-Plane) active packet flow, and the O-RU, and
   wherein the presented visual presentation comprises a graphical user interface (GUI) showing at least one of current analytical timing measurements of early, late, and on-time uplink U-Plane packets or current analytical timing measurements of early, late, and on-time uplink U-Plane packets.

7. A real-time Open Radio Access Network (O-RAN) fronthaul analyzer and graphical user interface (FHA/GUI), comprising:
   a hardware accelerator to receive and analyze O-RAN fronthaul (OFH) packet traffic flow of an O-RAN Distributed Unit (O-DU) and an O-RAN Radio Unit (O-RU), comprising:
      a parser to parse metadata from packet headers of the OFH packet traffic flow; and
      a flow tracker to identify and track active packet flows using the parsed metadata; and
   one or more processors and one or more non-transitory computer-readable storage media storing instructions executable by the one or more processors, wherein the one or more processors are to:
      receive data regarding the active packet flows from the flow tracker;
      receive user input selecting at least one selectable parameter, wherein a selectable parameter comprises at least one of the O-DU, the O-RU, a type of packet, a communication plane, a source, a destination, a traffic direction, or one or more analytical timing measurements; and
      generate, using the selected at least one selectable parameter, a graphical user interface (GUI) to display a visual representation of the active packet flows using the received data,
      wherein, when the received user input selects the O-DU as the selected at least one selectable parameter, the visual representation shows a current transmission bandwidth of the O-DU and at least one of current reception bandwidth of the O-DU, transmission bandwidth usage of the O-DU over time, reception bandwidth usage of the O-DU over time, or an identification of each O-RU presently connected to the O-DU.

8. The real-time O-RAN FHA/GUI of claim 7, wherein the hardware accelerator comprises a Field Programmable Gate Array (FPGA).

9. The real-time O-RAN FHA/GUI of claim 7, wherein the hardware accelerator further comprises:

a counter to maintain a clock, wherein timing information is added to each packet of the OFH packet traffic flow using the counter.

10. The real-time O-RAN FHA/GUI of claim 9, wherein the hardware accelerator is further to analyze a plurality of packets in the OFH packet traffic flow using at least one of the added timing information or the parsed metadata and to continuously generate one or more analytical timing measurements of the OFH packet traffic flow based on the analyzing of the plurality of packets; and
wherein the one or more processors are further to:
receive the continuously generated one or more analytical timing measurements from the hardware accelerator; and
generate the GUI to display a visual representation of the OFH packet traffic flow using the continuously generated one or more analytical timing measurements.

11. The real-time O-RAN FHA/GUI of claim 7, wherein the visual representation comprises, for each of the tracked one or more active packet flows, at least one of a source, a destination, a packet type, a traffic direction, or a unique indicia to identify each of the tracked one or more active packet flows.

12. The real-time O-RAN FHA/GUI of claim 11, wherein the unique indicia comprises a hash value.

13. The real-time O-RAN FHA/GUI of claim 7, wherein, when the received user input selects the O-RU as the selected at least one selectable parameter, the visual representation shows at least one of current transmission bandwidth of the O-RU, current reception bandwidth of the O-RU, transmission bandwidth usage of the O-RU over time, or reception bandwidth usage of the O-RU over time.

14. The real-time O-RAN FHA/GUI of claim 7, wherein, when the received user input selects a Control Plane (C-Plane) active packet flow, a User Plane (U-Plane) active packet flow, and the O-DU as the selected at least one selectable parameter, the visual presentation shows at least one of current analytical timing measurements of early, late, and on-time downlink C-Plane packets, current analytical timing measurements of early, late, and on-time uplink C-Plane packets, or current analytical timing measurements of early, late, and on-time downlink U-Plane packets.

15. The real-time O-RAN FHA/GUI of claim 7, wherein, when the received user input selects a Control Plane (C-Plane) active packet flow, a User Plane (U-Plane) active packet flow, and the O-RU DU as the selected at least one selectable parameter, the visual presentation shows at least one of current analytical timing measurements of early, late, and on-time uplink U-Plane packets or current analytical timing measurements of early, late, and on-time uplink U-Plane packets.

16. A real-time Open Radio Access Network (O-RAN) fronthaul analyzer and graphical user interface (FHA/GUI), comprising:
a Field Programmable Gate Array (FPGA) to receive and analyze O-RAN fronthaul (OFH) packet traffic flow of an O-RAN Distributed Unit (O-DU) and an O-RAN Radio Unit (O-RU), comprising:
a parser to parse metadata from packet headers of the OFH packet traffic flow;
a counter to maintain a clock, wherein timing information is added to each packet of the OFH packet traffic flow using the counter; and
a flow tracker to identify and track active packet flows using at least one of the parsed metadata and the added timing information,
wherein the FPGA is further to analyze a plurality of packets in the OFH packet traffic flow using the added timing information and the parsed metadata and to continuously generate one or more analytical timing measurements of the OFH packet traffic flow based on the analyzing; and
one or more processors and one or more non-transitory computer-readable storage media storing instructions executable by the one or more processors, wherein the one or more processors are to:
receive the continuously generated one or more analytical timing measurements from the FPGA;
receive user input selecting at least one selectable parameter, wherein a selectable parameter comprises at least one of the O-DU, the O-RU, a type of packet, a communication plane, a source, a destination, a traffic direction, or one or more analytical timing measurements; and
generate, using the selected at least one selectable parameter, a graphical user interface (GUI) to display a visual representation of the active packet flows using the received continuously generated one or more analytical timing measurements,
wherein, when the received user input selects the O-DU as the selected at least one selectable parameter, the visual representation shows a current transmission bandwidth of the O-DU and at least one of current reception bandwidth of the O-DU, transmission bandwidth usage of the O-DU over time, reception bandwidth usage of the O-DU over time, or an identification of each O-RU presently connected to the O-DU.

* * * * *